United States Patent [19]
Engdahl et al.

[11] Patent Number: 5,956,324
[45] Date of Patent: *Sep. 21, 1999

[54] PERFORMANCE MONITORING AND TEST SYSTEM FOR A TELEPHONE NETWORK

[75] Inventors: Thomas L. Engdahl; Paul R. Hartmann, both of Escondido; Kevin Pope, Poway; Kevin Cadieux, Escondido, all of Calif.

[73] Assignee: Applied Digital Access, Inc., San Diego, Calif.

[ * ] Notice: This patent is subject to a terminal disclaimer.

[21] Appl. No.: 08/960,775

[22] Filed: Oct. 30, 1997

Related U.S. Application Data

[63] Continuation of application No. 08/118,443, Sep. 7, 1993, Pat. No. 5,691,976, which is a continuation-in-part of application No. 07/862,470, Apr. 2, 1992, abandoned.

[51] Int. Cl.⁶ ............................... H04J 1/16; H04J 3/14; G01R 31/08; G06F 11/00
[52] U.S. Cl. ........................ 370/242; 370/362; 370/248
[58] Field of Search ............................ 370/242, 248, 370/362, 250, 241, 244, 252, 522, 535; 371/20.1; 379/9, 1, 10, 14, 15

[56] References Cited

U.S. PATENT DOCUMENTS

| | | | |
|---|---|---|---|
| 4,716,561 | 12/1987 | Angell et al. | 370/376 |
| 4,993,013 | 2/1991 | Shinada et al. | 370/242 |
| 5,018,135 | 5/1991 | Ashi et al. | 370/535 |
| 5,138,616 | 8/1992 | Wagner, Jr. et al. | 371/5.1 |
| 5,166,925 | 11/1992 | Ward | 370/250 |

*Primary Examiner*—Douglas W. Olms
*Assistant Examiner*—David R Vincent
*Attorney, Agent, or Firm*—Knobbe, Martens, Olson & Bear, LLP

[57] ABSTRACT

A DS3 level access, monitor and test system for a telephone network. The system provides selective, and hitless, bit overwrite in any of the embedded DS1, DS0 and subrate channels in a DS3 signal. Multiple DS0 and subrate channels can be tested via the asynchronous time slot interchange in conjunction with the recombiner of the present invention. The present invention further includes a lookahead reframer for framing to the DS3 signal. The present invention also includes a facilities data link (FDL) handler for capturing the FDL channel data in every DS1 channel in a DS3 signal. A high speed bit-for-bit compare is interfaced to a protect path to provide 1:1 fault protection in the system of the present invention. Full time performance monitoring on DS1 and DS3 signals is performed by a shared resource. The system of the present invention provides an integrated approach to synchronization measurement and relative synchronization.

29 Claims, 29 Drawing Sheets

ARCHITECTURE

PERFORMANCE MONITORING AND TEST SYSTEM FOR A TELEPHONE NETWORK

RELATED APPLICATION

This application is a continuation of U.S. patent application Ser. No. 08/118,443, filed Sept. 7, 1993 now U.S. Pat. No. 5,691,976, which was a continuation-in-part of U.S. patent application Ser. No. 07/862,470, filed Apr. 2, 1992, now abandoned.

BACKGROUND OF THE INVENTION

1. Field of the Invention

The present invention relates to telephone networks, and more particularly to a system and method for accessing, monitoring and testing a telephone network.

2. Description of the Related Technology

The telephone industry has changed drastically since the divestiture of the Bell System. Today, seven regional Bell Operating Companies (RBOCs) and independent telephone companies provide local telephone service within 166 Local Access Transport Areas (LATAs). These companies are forced to rely on interexchange carriers such as AT&T, MCI and Sprint for transmission of calls from one LATA to another. The responsibility for quality and performance of the telephone circuit is thus split between local telephone companies and interexchange carriers.

RBOCs are under pressure for financial performance as independent companies. With rates restricted by utility commissions, and facing rising costs and new competition with restrictions on transmission of calls beyond LATA boundaries, telephone companies find themselves faced with rapid introduction of new technology, smarter business customers, and antiquated network maintenance systems.

Demand for information transmission increased dramatically during the 1980s. At the beginning of the decade most data transmission systems interfaced a predominantly analog network through relatively low speed modems. Those desiring "high speed" transmission generally opted for the 56 kbps rate of the digital data system (DDS).

Considerable pressure for increases in such transmission rates came from the desire to take advantage of the increasing capabilities and computation speeds of computers and other business systems. Improvements in transmission technology during the decade fueled the momentum of the increase in transmission rates. The replacement of copper cables with glass fiber expanded the transmission capacity of outside plants many times over. At the same time, improvements in electronics and coding algorithms yielded terminal equipment designed to take advantage of the enormous increase in bandwidth which accompanied the conversion to fiber optics.

In the absence of a standard, virtually all lightwave vendors chose DS3 (44.736 Mbps) as the interface between the lightwave terminal and the network. FIG. 1 illustrates the prior art North American Digital Hierarchy having a DS0 (64 kbps) level 102, a DS1 (1.544 Mbps) level 104, a DS2 (6.312 Mbps) level 106 and a DS3 (44.736 Mbps) level 108. This hierarchy is defined by ANSI T1.102-1987—"Digital Hierarchy, Electrical Interfaces", The American National Standards Institute, Inc., New York, 1987. DS2 is important as a link between DS1 and DS3. Even though there is little growth in DS2 as a transport medium, the DS2 level exists in every muldem (multiplexer/demultiplexer) or other network element which must interface DS1 and DS3 signals. Although DS0 is essentially confined to digital signals, reference to analog voice frequency signals is included in FIG. 1 because of widespread interfacing of such signals to the DS1 level of hierarchy by digital channel banks.

The transition of telecommunications into the 1990s will thus occur with the DS3 rate used almost universally for interfaces within the network. DS1 transmission between customers and operating companies is now commonplace, and an ever increasing number of customers are seeking to interface with service providers and with other end users at even higher rates. The DS2 rate, seemingly a logical intermediate step between DS1 and DS3, has proved to be uneconomical for transport except in certain special cases. Thus, DS3 is proving to be the underlying building block for high bandwidth, light signals.

FIG. 2 is a prior art, simplified model of a lightwave network 120 showing four example network carriers (Carrier A, Carrier B, Carrier C and Carrier D) and how a DS0 level line 130, a DS1 level line 132, a DS3 level line 134 and a fiber optic (light) line 136 are used to interconnect a customer X 140 to a customer Y 142. The equipment at the customer premise or site 140 and 142 could be, for example, a telephone, a facsimile modem or a data modem.

A multiplexer/demultiplexer or channel bank 144 is used to multiplex 24 DS0 level signals on the line 130 into one DS1 level signal on the line 132. In this model 120, a M1/3 muldem 146 is used to multiplex 28 DS1 level signals on the line 132 into one DS3 level signal on the line 134. The DS3 level signals on the line 134 are further combined by Carrier A using a lightwave transport multiplexer 122 into a fiber optic signal on the line 136. In this model 120, three Central Offices 152, 154 and 156 are used, with the middle Central Office 154 having three carriers cross-connected at the DS3 level by use of a cross-connect 158.

A long distance call from customer X 140 to customer Y 142 involves many levels of multiplexing and many transport carrier handoffs. Carrier A is the local operating company of customer X 140, and owns Central Offices 152 and 154. Carrier B and Carrier C are long distance carriers, and Carrier D is the local operating company that owns Central Office 156 and services customer Y 142.

A call from customer X 140 to customer Y 142 involves three central offices and three transport carriers. As the call traverses the network 120, it may be processed by several network elements, such as channel banks 144, M1/3 muldems 146, 128, and lightwave transport multiplexers 122, 126 with each element having its own surveillance techniques. Maintenance and billing problems are not uncommon with this interaction.

Most network elements incorporate some form of monitoring, test, and control of the data that they process. However, none of these options supports the continuous monitor or test access of DS3 and all embedded channels.

Although the cost of bandwidth has plummeted to the extent that it no longer worries facility planners as it did in previous decades, the move to DS3 is not without its costs. Chief among them are the lack of convenient and economical test access to lower rate channels embedded in the DS3 bit stream and the lack of surveillance systems designed to take advantage of the performance data embedded in the DS3 formatted signal.

DS3 (and to a lesser extent DS1) signals carry large amounts of data per unit time and represent a considerable financial investment on the part of the end user, for whom bandwidth is not as inexpensive as it has become for the operating company facility planner. The operating company using DS3 runs the risk of a substantial outage in the case of a crippling impairment or total failure of such high-speed digital facilities. Those who manage the DS3 facilities of both end users and service providers are thus quite interested in the performance of the digital links in their networks. They are not satisfied to let the performance information embedded in the bit streams they deal with simply pass on by without extracting data which can be quite useful in managing the network and in minimizing the costly impact of service outages.

It is possible to acquire a DS3 signal at the monitor jack of a DSX-3 cross-connect panel and demultiplex from the DS3 whatever subsidiary signals are desired. Such signals may then be patched into portable test equipment or routed to test systems for analysis. There are many test sets available which will analyze signals extracted at any rate from DS0 to DS3. This technique, however, requires manual access to implement the patching and allows the use of the test and/or surveillance equipment on only one DS3 at a time. Portable test arrangements of this type do not generally allow the insertion of test signals or data into outgoing channels of a DS3 bit stream without interrupting the other services carried by the same DS3.

A digital cross-connect system (DCS) might be considered for use as a test access vehicle in the DS3 network. The versatile and sophisticated switching capabilities of the DCS make it a costly access. There are, in addition, impairments associated with the use of DCS which make it inadvisable to scatter such systems throughout the network at all points requiring surveillance or test access. Among the impairments introduced by a DCS are delay, a certain amount of which is necessary to synchronize incoming and outgoing frame structures, and robbed-bit writeover distortion, the latter difficulty occurring only when switching down to the DS0 rate is provided.

To improve service while cutting costs, RBOCs have turned from portable test equipment in the hands of field craftspeople, to permanently installed test systems connected to a central network management center; and from repair actions in response to a trouble report from customers, to proactive network performance monitoring and preventative maintenance. Existing equipment available to telephone companies provides only a small portion of the functionality needed by telephone companies and is quite expensive.

Consequently, there is a need for DS3 surveillance and testing using a system which is essentially transparent to in-service DS3 lines and paths, which provides non-intrusive surveillance and performance monitoring, which can provide intrusive test access when required and which is economical enough to install at all points requiring DS3 surveillance or test access. There is also a need for network managers to have access to comprehensive performance data embedded in the DS3 format in order to make informed decisions about the operations of their DS3 networks.

SUMMARY OF THE INVENTION

The present invention provides an integrated access, performance monitoring and test system to help companies efficiently manage their high speed telecommunications network. The access system allows telephone companies to continuously monitor the performance of all circuits from their network management center, identifying degradation of service before a service-affecting outage occurs. All DS3 signals passing through the system are monitored for performance indicators specified by Bellcore transmission requirements.

The presently preferred access system is essentially transparent to the DS3 network except for the injection of an absolute delay of less than 10 microseconds unless transmitting an alarm signal. The system interacts with circuits embedded in the DS3 signal by transmitting outgoing information on any such circuit without affecting transmission on the other circuits of the DS3.

In one aspect of the invention, there is a telephone network, a DS3 signal access system comprising means for identifying a bit in the DS3 signal, means for generating a selected bit and a combiner for substituting the identified bit with the selected bit in the DS3 signal.

In another aspect of the present invention, there is a system for accessing a plurality of embedded channels in a DS3 signal, the system comprising a demultiplexer for extracting at least one of the DS2 channels in the DS3 signal, an asynchronous time slot interchange for communicating at least one of the DS0 channels in the DS2 channel into an asynchronous time slot on a bus and means for selectively inserting data from the bus into the DS3 signal.

BRIEF DESCRIPTION OF THE DRAWINGS

FIG. 10b is a block diagram of the DAI M23 Demultiplexer subcircuit shown in FIG. 10a;

FIG. 10c is a block diagram of the DAI M12 Demultiplexer subcircuit shown in FIG. 10a;

FIG. 10d is a block diagram of the DAI DS1 Monitor subcircuit shown in FIG. 10a;

FIG. 10e is a block diagram of the DAI Recombiner subcircuit shown in FIG. 10a;

FIG. 10f is a block diagram of the DAI Processor Interface subcircuit shown in FIG. 10a;

FIG. 15a is a block diagram of the lookahead framer portion of the DAI M23 Demux shown in FIG. 10b and FIG. 15b is a diagram associated with a pyramid shift register of FIG. 15a;

FIG. 21b is a block diagram of the TSI Facilities Data Link (FDL) subcircuit shown in FIG. 21a;

FIG. 21c is a block diagram of the TSI Frequency Counter subcircuit shown in FIG. 21a;

FIG. 21d is a block diagram of the TSI Subrate Handler subcircuit shown in FIG. 21a;

FIG. 28 is a block diagram of the bit for bit compare portion of the DAI circuit shown in FIG. 10a.

DETAILED DESCRIPTION OF THE PREFERRED EMBODIMENTS

Reference is now made to the drawings wherein like numerals refer to like parts throughout.

For convenience, the following description will be outlined into the following four principal sections: System Overview, The DS3 Drop and Insert (DAI) Circuit, The Asynchronous Time Slot Interchange (TSI) Circuit and The Protect Path.

I. SYSTEM OVERVIEW

Figure 1:
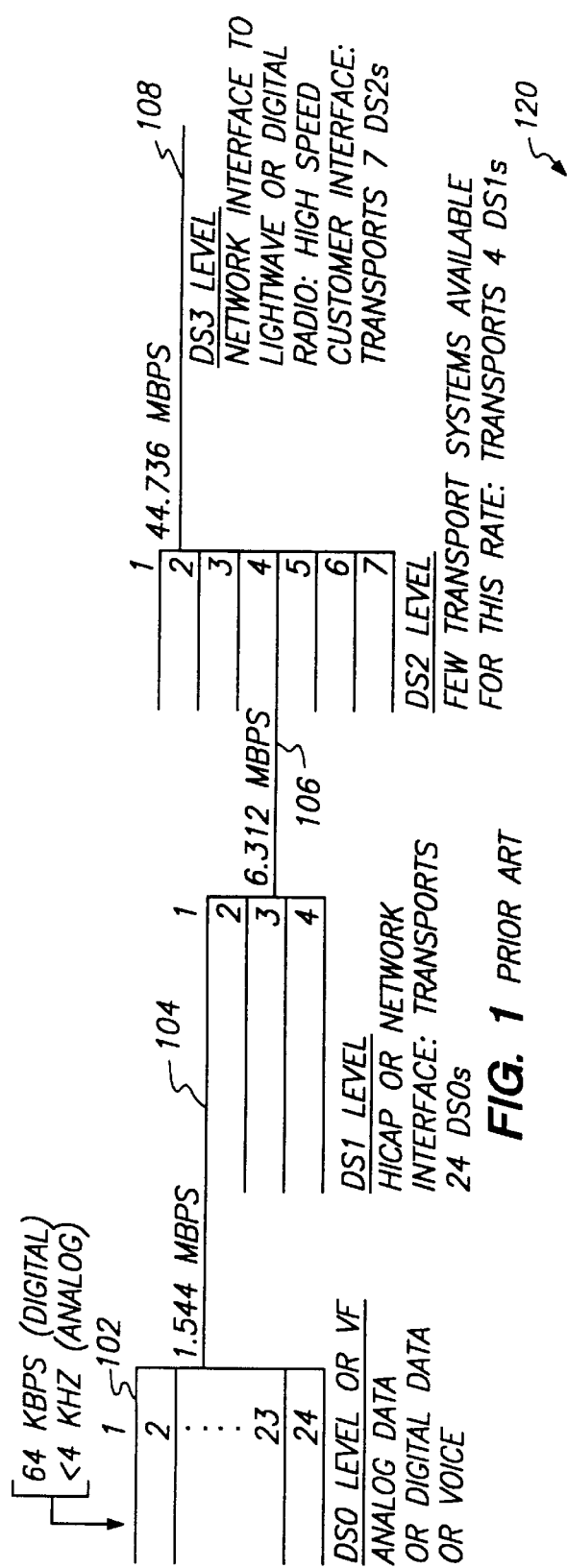
FIG. 1 is a diagram of the North American digital hierarchy used in a telephone network accessed by the present invention.
Figure 2:
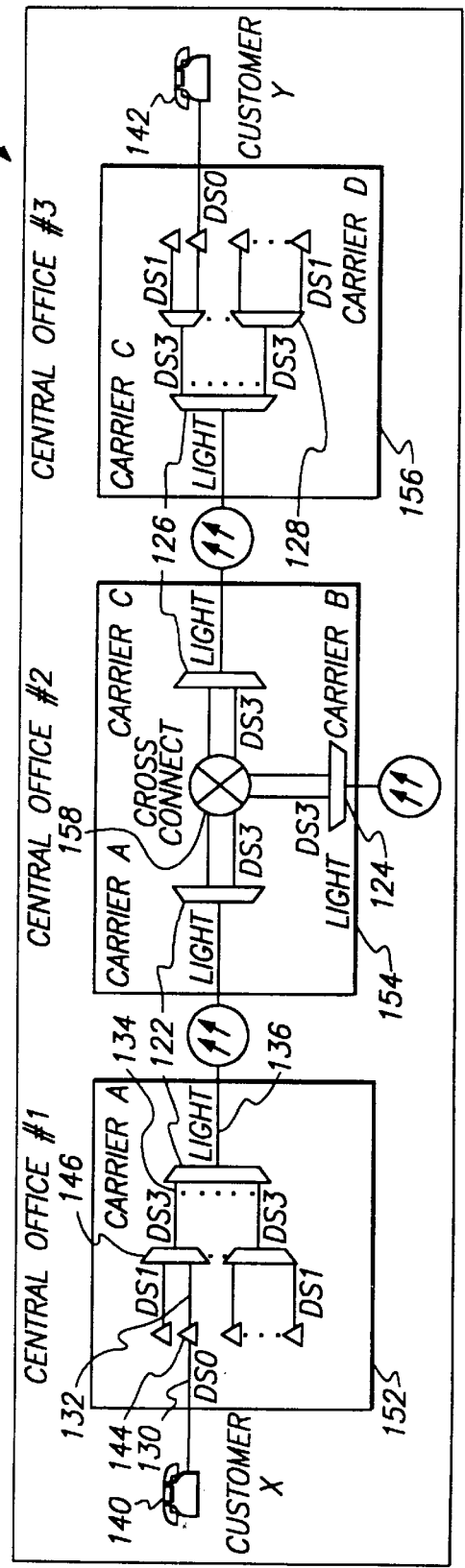
FIG. 2 is a block diagram of an exemplary simplified network model.
Figure 3:
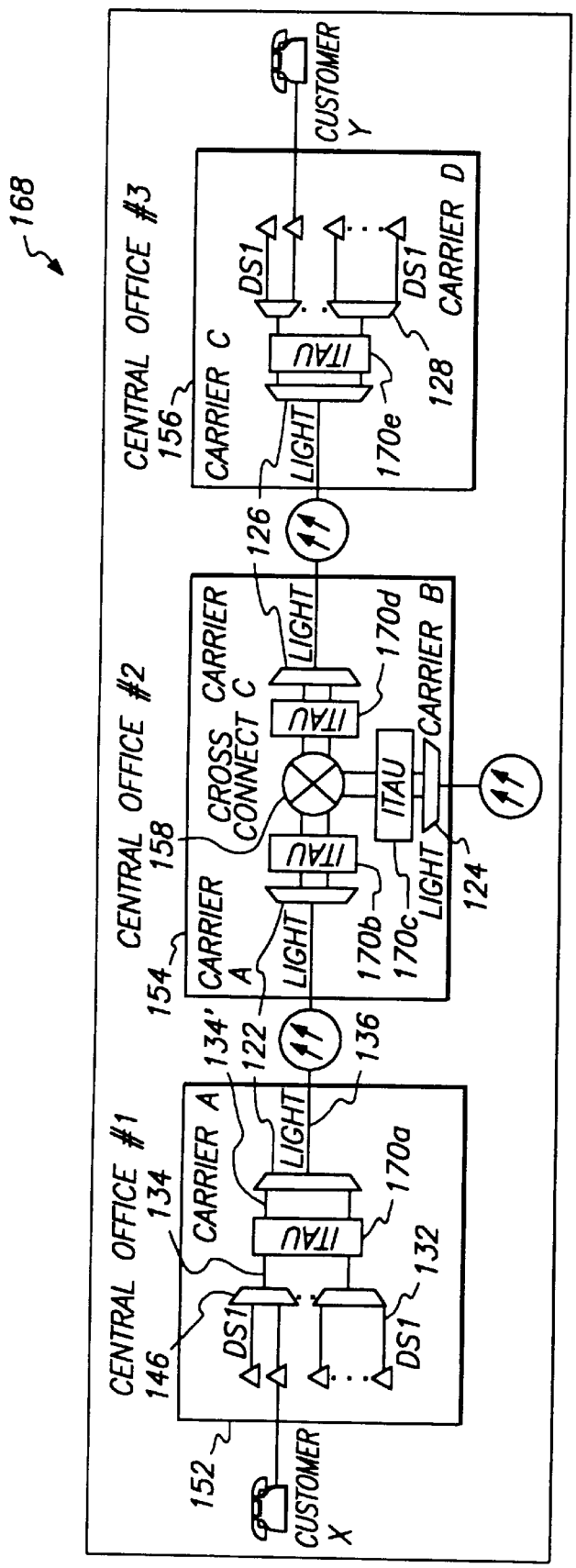
FIG. 3 is a block diagram of an exemplary simplified network model having a set of DS3 signal access systems of the present invention shown as Integrated Transport Access Units (ITAUs)

As shown in FIG. 3, the DS3 signal access, monitor and test system 170, also referred to as an Integrated Transport Access Unit (ITAU), is installed as an integral part of the fiber optic and microwave radio transmission systems of the Regional Bell Operating Companies (RBOCs) and long distance carriers. The simplified network model 120 of FIG. 2 is enhanced in FIG. 3 by the addition of the DS3 signal access system 170 at several example positions in the network model 168. At Central Office 152, the DS1 signals 132 are multiplexed by the M1/3 muldem 146 into the DS3 signal 134 which becomes the input for the access system 170a. The access system 170 can accept the range from one DS3 signal up to a maximum of 96 DS3 signals as inputs, with the number of output DS3 signals being the same number as input signals. Actually, the access system 170 is bi-directional and the network itself is bi-directional in order to handle two-way voice or data communication.

The access system 170a outputs, including the DS3 level line 134', are combined by Carrier A using a lightwave transport multiplexer 122 into a fiber optic signal on the line 136 or alternatively, into a microwave signal by other known means to be transmitted to Central Office 154. At Central Office 154, for example, Carrier A demultiplexes the fiber optic signal 136 into multiple DS3 level signals, via the demultiplexer 122, which are used as inputs to another access system 170b. Similarly, Carrier B and Carrier C can provide DS3 level signals to access systems 170c and 170d, respectively. The outputs of the three access systems 170b, 170c and 170d cross-connect at the point 158. A final access system 170e could be installed as shown in Central Office 156 between Carrier C and Carrier D.

Interfacing at the DS3 rate, the access system 170 is capable of regeneration of DS3 data, and provides one-for-one protection, using a protection path scheme, to guarantee high reliability as will be shown hereinbelow. Delay through the access system 170 is nominal (less than 10 microseconds) so that the system can be used at multiple network locations, as shown in FIG. 3, with minimal effect on the end to end DS3 path delay.

The access system 170 provides continuous performance monitoring of the DS3 channel 146 and all embedded DS1 circuits 132. As an embedded maintenance system, performance information is monitored and collected without invoking data disruptions. The access system 170 provides access to any embedded channel in the DS3 bit stream without causing service disruptions to the other channels, i.e., hitless access.

The access system 170 supports simultaneous, hitless access to: multiple DS1 signals for High Capacity Digital Service (HICAP or HCDS) testing; multiple embedded DS0 and subrate channels for testing and measurement of voice frequency (VF), digital data service (DDS), and signalling; and DS1 and DS0 craftsperson interface for test access digroup (TAD) and facility access digroup (FAD). Subrate channels are subchannels of the DS0 DDS network for data applications such as a modem. Subrate DS0 A can have one subcustomer, while subrate DS0 B can have multiple customers, depending on the data rate used.

Transport carriers, such as carriers 122, 124, 126 and 128, have the freedom to place the access system 170 anywhere in the network. Applications for the access system 170 include use at the boundary between two carriers, for special services and DDS hubs, and at manned, unmanned or remote central offices. Control center interface with the access system 170 is provided through industry standard operational support system (OSS) communication protocols as will be explained below.

Figure 4:
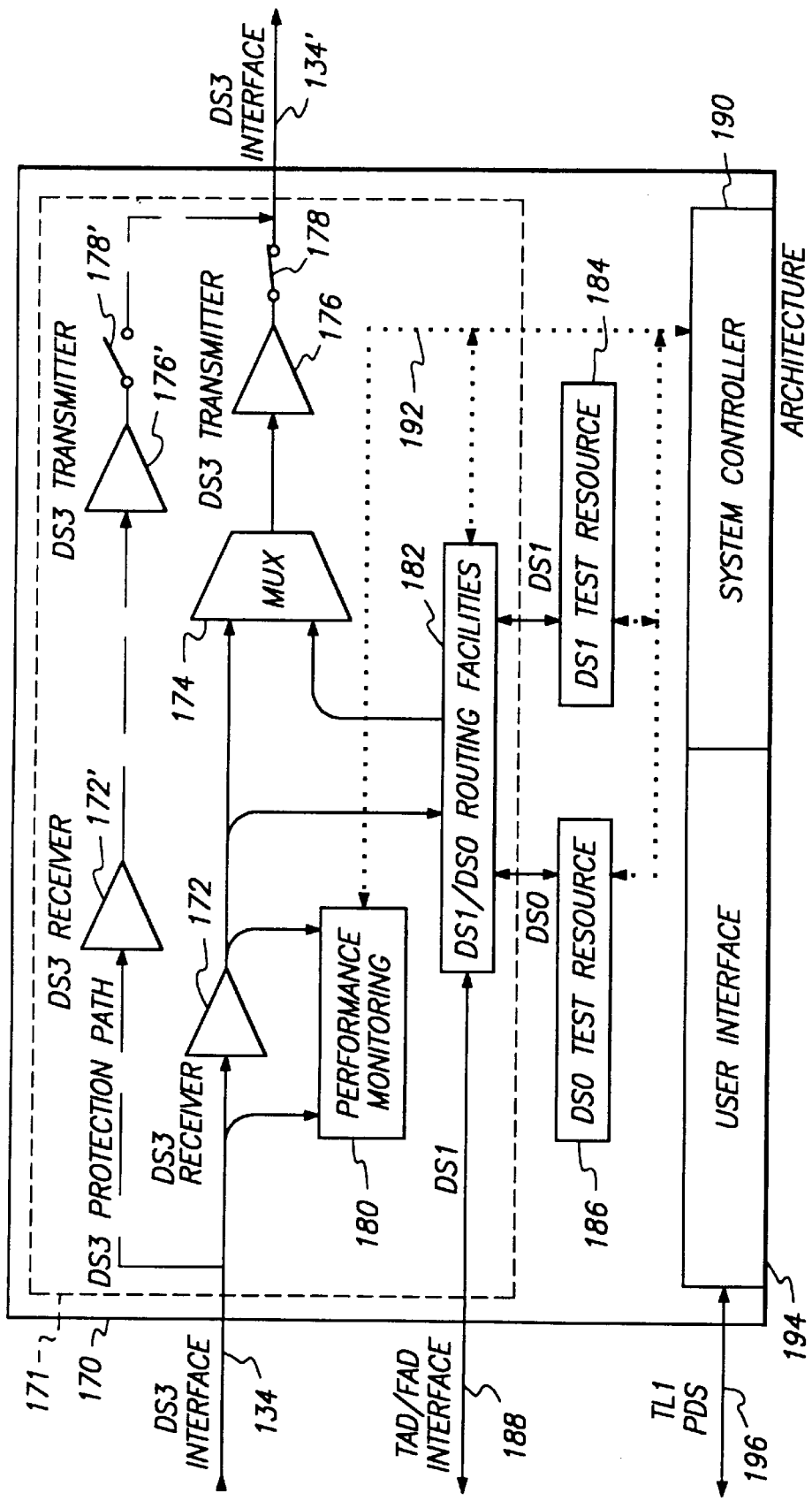
FIG. 4 is a functional block diagram of the presently preferred access system architecture according to the present invention.

FIG. 4 is a functional block diagram illustrating the architecture of the presently preferred access system 170. The access system 170 of the present invention connects in-line to as many as 48 bi-directional DS3 signals or 96 one-way DS3 signals, such as, for example, the DS3 signal fed across the line 134, to provide: continuous non-intrusive performance monitoring of DS3 and embedded DS1 channels; non-intrusive performance monitoring of DS0 and embedded channels, on demand; hitless access to multiplexed DS1, DS0 and subrate channels; intrusive or non-intrusive testing of DS1, DS0 and subrate channels; and an Operations System (OS) interface for reporting and control.

In general, the performance monitoring function stores notable events and calculates statistics such as error rates. Among others, the parameters and events monitored at the DS3 level by the access system 170 include: frame format, bipolar violations (BPV) and loss of signal (LOS). DS3 level statistics, including, for example, frame format status, F bit error count and frame parity error count, are stored and reported to the OS. Similarly, DS1 level performance monitoring and statistics, and TAD/FAD performance monitoring are stored in memory by the system 170.

The access system 170 also provides hitless monitor or split access to all DS1, DS0 and subrate channels in support of pre-service testing, verification or sectionalization of faults, and verification of repairs. A monitor access permits the system 170 to "listen" to the accessed channel as it passes through the system undisturbed. Establishing or tearing down a monitor access does not cause disruption to the channel or to other components of the bit stream. A split access. breaks the normal through path of the channel and the received data from each direction has data inserted into the outgoing transmit channels.

Lastly, the access system 170 provides non-intrusive test capabilities for extracting DS1, DS0 and subrate channels from received DS3 and DS1 bit streams without affecting the transmission of the same information through the system. Intrusive testing allows the writing of information into outgoing DS1, DS0 and subrate channels embedded in the DS3 bit stream. For example, intrusive tests include HCDS and DDS reconfiguration commands, looping commands, test patterns and voice frequency test tones, and complex waveforms such as those required for P/AR tests.

Again referring to FIG. 4, the DS3 signal received on the line 134 is fed through a receiver or regenerator 172, which outputs a DS3 signal having the same digital information, then through a combiner 174, and through a transmitter or regenerator 176. A primary path relay 178, shown to be closed, allows the DS3 signal to be output from this primary path across the output line 134'. Simultaneously, the incoming DS3 signal is fed through two regenerators 172', 176', but a second relay, termed the protect path relay 178' is open thus preventing this protect path from feeding its DS3 signal to the output line 134'. The relays 178, 178' are operated cooperatively, as will be further discussed below, to apply the signal from only one of the two paths to the output line 134' thus providing fail-safe transmission of the DS3 signal through the access system 170.

The performance monitoring functions of the access system, as discussed hereinabove, are conducted in the functional block indicated in FIG. 4 at 180, which receives the DS3 signal from the primary path. Access and test functions are accomplished by feeding the DS3 signal from the primary path to a DS1/DS0 router 182 which selectively routes embedded channel data to one or more DS1 test resources 184 or DS0 test resources 186. Since DS1 and DS0 test systems are well-known, the function of the test resources 184, 186 will not be further discussed herein. A TAD/FAD interface line 188 for carrying a DS1 signal also connects to the router 182 so that the access system 170 can be used as a remote test unit or as a local test unit for bit streams demultiplexed from incoming DS3 signals with external test equipment. Note that tests requiring bit overwrite communicate data via the router 182 to the combiner 174 where bits are selectively overwritten in the DS3 signal.

Performance monitoring, access and test are controlled by a system controller 190 via a High Level Data Link Control (HDLC) bus or link 192 connected to the performance monitor 180, DS1/DS0 router 182 and the DS1 and DS0 test resources 184, 186. The system controller 190 also communicates with a user interface subsystem 194 that provides communication to an OS (not shown) across a line 196 for control from remote locations. The user interface decodes messages sent in Transaction Language 1 (TL1), generally used by modern mechanized systems, or Program Documentation System (PDS) formats. Man-Machine Language (MML) is used to interface with craft technicians. Thus, a local telephone company, e.g., Bell South, or interexchange carrier, e.g., MCI, can gain immediate access to the DS3 and embedded channels by using the access system 170 of the present invention.

Figure 5:
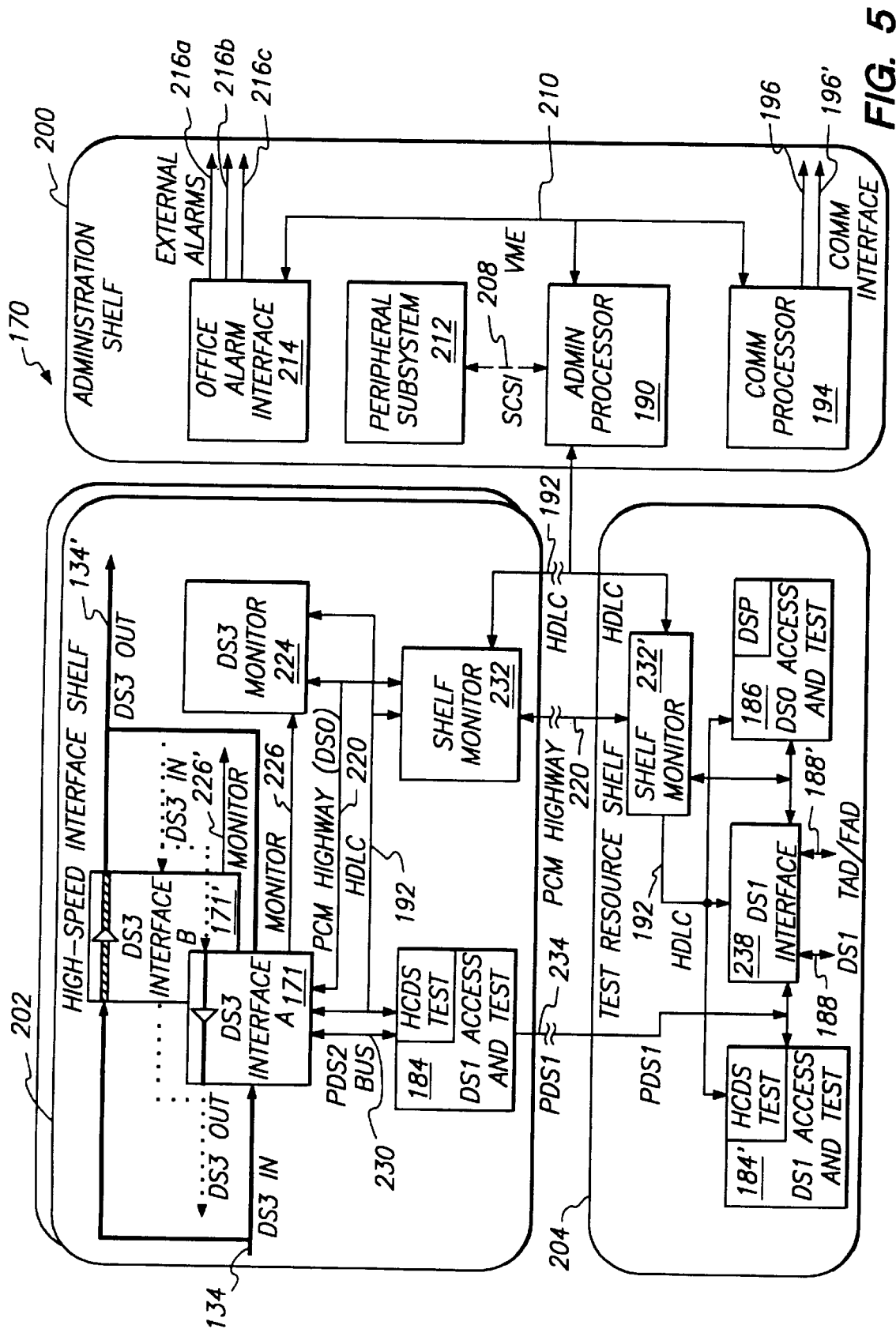
FIG. 5 is a system block diagram of the access system shown in FIG. 4.

FIG. 5 is a system block diagram of the presently preferred access system 170. The access system 170 integrates monitor, access, and test functions into one system consisting of three shelves of hardware. A fully configured access system 170 supporting 48 DS3s would be housed in two equipment bays, each bay supporting 5 shelves; one Administration Shelf 200, eight High Speed Interface Shelves 202, and one Test Resource Shelf 204. The access system 170 is designed for operation in a central office environment.

The access system 170 is modular in design, supporting the network as it expands and enabling easy integration of hardware and software capabilities. Each hardware module contains a processor complex, which will be described hereinbelow, that provides data collection, control, and communication to the central administration processor 190. Design of the access system 170 was based on the philosophy that the addition of a network maintenance element should not degrade network reliability. To achieve this goal, the access system 170 carefully monitors its circuitry and software functionality. The access system 170 is protected by redundancy to an extent that causes the system to substantially exceed industry goals for network reliability. In order to further enhance access system 170 reliability, each DS3 path is protected by a bypass repeater providing a one-to-one redundancy, which is automatically switched into service if the normal path through the access system 170 should fail to pass any of several stringent internal diagnostic tests.

Administration Shelf

As shown in FIG. 5, the Administration Shelf 200 contains the central computing elements and memory storage resources. This shelf also provides resources for intershelf communication and communication with support and management centers or personnel. Internal communication is in multiple serial communication protocols "Electronic Industries Association (EIA) 232" and "EIA 423". External interface language formats include TL1, PDS and MML. The Administration Shelf 200 is the source of system generated office alarms including audible, visual, and telemetry, as well as displays. The Administration Shelf 200 contains four hardware modules as described below.

The Administration Processor module 190 is the central system controller. It provides inter-shelf communication via the HDLC link 192 and communication with external interfaces through the Communication Processor module 194 described below. It uses serial interfaces for internal system control: a Small Computer System Interface (SCSI) interface 208 for control of peripherals such as the hard disk drive (not shown), and a VersaModule Eurocard (VME) data bus interface 210 to communicate with other VME standard modules. The SCSI interface 208 connects the Administration Processor module 190 to a Peripheral Subsystem 212, and the VME interface connects module 190 to the Communication Processor module 194 and a Office Alarm Interface Module 214.

The Peripheral Subsystem 212 consists of a 1.44 megabyte floppy disk drive, a 105 megabyte hard disk drive, a 60 megabyte optional tape drive, and a Peripheral Module, none of which are shown on FIG. 5. These components store surveillance data and record user activity.

The Communication Processor module 194 provides the communication interface 196 to external Operations System (OS) or test system control centers (not shown). Interfaces are via TL1 or PDS. The electrical protocols are serial "EIA 232" or "EIA 423". Craft interface is MML with a user friendly overlay. Other communication 196' external to the system is done with TL1 and PDS using serial interface electrical protocols based on Consultative Committee for International Telephony and Telegraphy (CCITT) standard X.25.

The Office Alarm Interface Module 214 generates audible 216a, visual 216b, and telemetry 216c alarms for critical, major, and minor office alarms. It also receives and converts a DS1 based Building Integrated Timing Source (BITS) clock (not shown), providing clock and frame for internal synchronization. The BITS clock is a clock reference for an entire Central Office.

High Speed Interface Shelf

Each High Speed Interface Shelf 202 supports the capability to interface up to six bidirectional DS3 signal lines 134. Up to eight shelves can be provisioned to support a total of 48 DS3s per system. Each DS3 path 134 is supplied with one-for-one protection. Continuous performance monitoring at the DS3 rate of DS3 and DS1 parameters, hitless access to DS1 and all embedded DS0 channels, and drop and insert of DS1 and DS0 channels into a DS3 bit stream are provided. HCDS testing capability is provided for the proprietary formatted DS1 data that is available. Formatted DS0 data can be transported via a PCM Highway 220 to the Test Resource Shelf 204 for testing. The High Speed Interface Shelf 202 contains four hardware modules as described below.

A set of DS3 Interface modules (two modules are shown in FIG. 5) 171 and 171' interface the digital DS3 bit stream 134 and provide resources to demultiplex the DS3 into component DS1, DS0, and subrate channels. The DS3 Interface modules 171 and 171' connect to a Shelf Monitor module 232 and a DS3 Monitor module 224 via the PCM Highway 220. The DS3 Interface modules support DS3 regeneration circuity with drop and insert capability at DS1, DS0 and subrate digital levels. Full framing and continuous performance monitoring information is collected and reported at DS3 and DS1 levels. The module 171 contains DS3 protection and regeneration circuitry, providing one-for-one next-card protection for the DS3 bit stream on the adjacent module 171'.

The Shelf Monitor module 232 interconnects the DS3 Interface modules 171 and 171', the DS3 Monitor module 224 and the DS1 Access and Test module 184 using the HDLC link 192. The Shelf Monitor module 232 serves as the intra-shelf communication interface via the HDLC link 192 to the Administration Processor 190. The module 232 also connects to a Shelf Monitor module 232' on the Test Resource Shelf 204 via the PCM Highway 220. The Shelf Monitor module 232 provides retiming, buffering, and differential to single ended conversions of data and control lines.

The DS3 Monitor module 224 connects to the DS3 Interface modules 171 and 171' via Monitor bus 226 and 226', respectively. The DS3 Monitor module 224 performs fault management on the DS3 Interface modules 171 and 171' by doing a bit for bit compare. Error conditions are reported using the HDLC link 192.

The DS1 Access/Test module 184 connects to the DS3 interface modules 171 and 171' via a Pseudo DS2 (PDS2) Bus 230. The module 184 also connects to the DS3 Monitor 224 via the PDS2 Bus 230 (link not shown). The DS1 Access/Test module 184 provides HCDS testing to the embedded DS1s. This module supports simultaneous HCDS testing of two DS1 channels. DS1 channels can be routed to the Test Resource Shelf 204 for testing via a Pseudo DS1 (PDS1) bus 234. There is one DS1 Access/Test module per High Speed Interface Shelf 202.

Test Resource Shelf

The Test Resource Shelf 204 supports test resource functionality for DS1, and a full range of DS0 and sub-DS0 testing. The TAD 188 and FAD 188' ports also provide interfaces for testing DS1s and DS0s via a DS1 access. The Test Resource Shelf 204 contains four modules as described below.

A DS1 Interface module 238 provides an access system network interface at the DS1 rate that can be configured either as a TAD or FAD port. As a TAD interface 188, the DS1 Interface module 238 demultiplexes an incoming DS1 channel and extracts selected DS0 circuits for testing. Configured as a FAD interface 188', this module 238 receives, transmits, and loops the intact DS1 facility. Performance monitoring and test access supervision are also provided for HCDS testing of DS1s input via the FAD. The DS1 Interface module 238 connects to the DS1 Access and Test modules 184 and 184', the DS0 Access and Test module 186, and the Shelf Monitor module 232'.

The DS1 Access/Test module 184' provides HCDS testing to the embedded DS1s. This module supports simultaneous HCDS testing of two DS1 channels.

The DS0 Access/Test module 186 incorporates digital signal processing (DSP) for DDS and VF testing of DS0 and subrate channels embedded in a DS3 or DS1 bit stream. Each module supports up to six simultaneous tests.

The Shelf Monitor module 232' serves as the intra-shelf communication interface. It provides retiming, buffering, and differential to single ended conversions of data and control lines.

DS3 Interface Module

Figure 6:
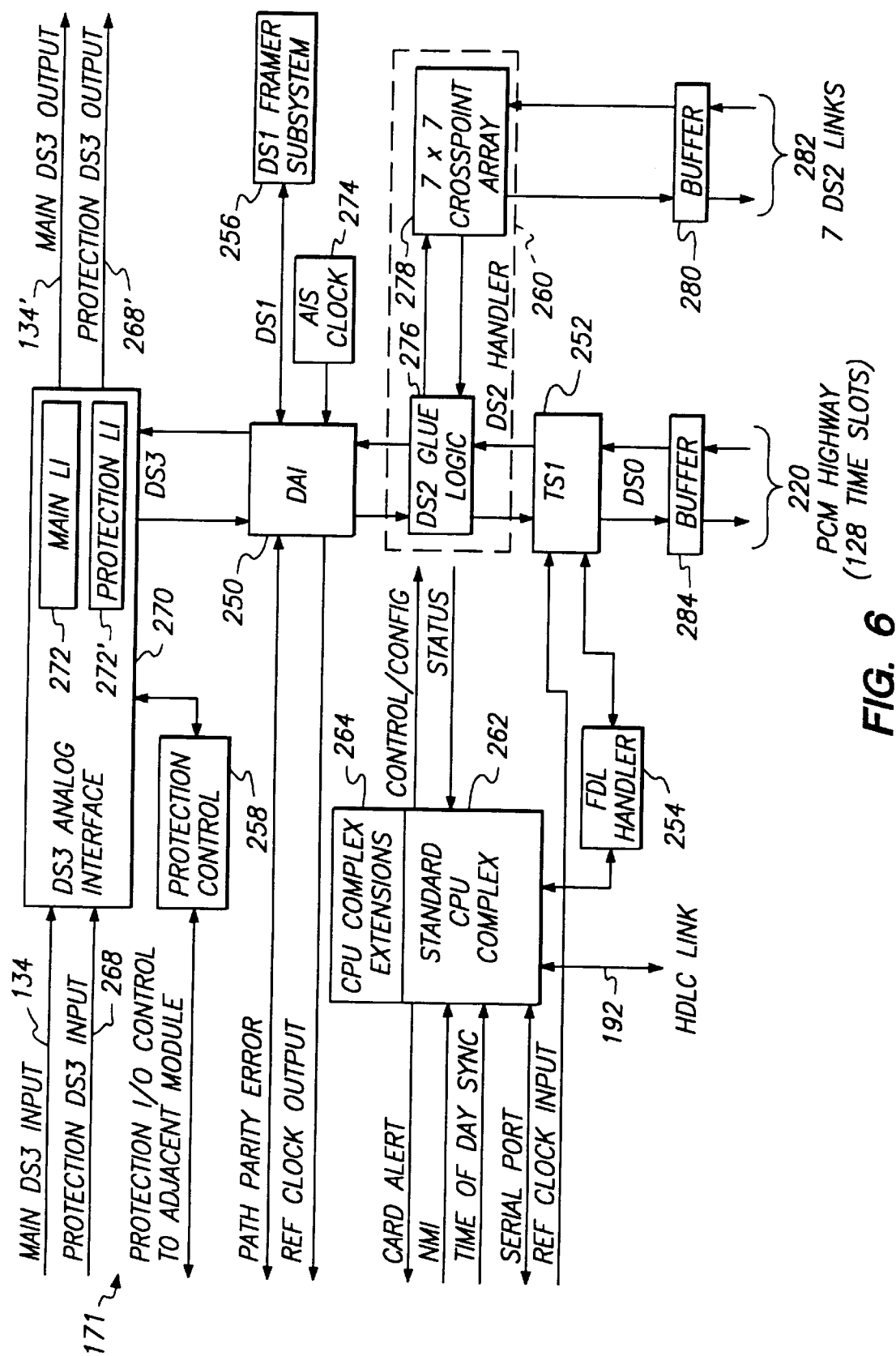
FIG. 6 is a block diagram of the DS3 interface module shown in FIG. 5.

FIG. 6 is the block diagram for the DS3 Interface Module 171, also referred to as the DS3 Module, in the access system 170. Each DS3 Module 171 provides a complete receive and transmit interface for a single DS3 signal 134. The access system 170 provides the capacity for up to 96 DS3 Modules providing service for 48 through DS3s. A one-for-one protection scheme is implemented with each DS3 Module containing a redundant path for the adjacent DS3 Module of the DS3 Module pair 171 and 171'.

The DS3 Module provides drop and insert capability at all rates from DS3 to DS0B. Specifically, up to 4 DS0B subrate channels or 24 full DS0 channels can be inserted without any restrictions on which DS1s or DS2s they come from. All insertion is hitless so that no other channels are affected when the insertion is initiated, during insertion, or when it is terminated.

The DS3 Module also provides for the drop and insert of DS2 bits. Either an entire DS2 bit stream or any subset of the bit stream, including individual DS1 channels 132, can be overwritten. The capability also exists for overwriting the DS3 control bits. All insertion takes place at the DS3 rate so that any bits that are not inserted upon simply pass through the module unaffected.

In addition, the DS3 Module 171 continuously monitors the performance of the DS3 signal 134, all 7 embedded DS2s, and all 28 embedded DS1s 132. A variety of frame formats are supported including C-Bit Parity at the DS3 rate and Superframe (SF), Extended Superframe (ESF), T1 Data Multiplexer (T1DM), and SLC-96 at the DS1 rate.

The DS3 Module 171 can be broken down into the following subsystems: a DAI circuit 250, a TSI circuit 252, a FDL Handler 254, a DS1 Framer 256, a Protection subsystem 258, a DS2 Handler 260, and a CPU complex 262 along with its extensions 264. Each of these subsystems is described below. Refer to the block diagram in FIG. 6 for an overview of all the DS3 Module subsystems and interfaces.

The main DS3 input 134 and a protection DS3 input 268 enter the DS3 module 170 at a DS3 Analog Interface block 270. Within the DS3 Analog Interface block 270 are a main DS3 Linear Interface (LI) circuit 272 and a protection DS3 LI circuit 272'. The LI circuits 272 and 272' perform analog to digital (TTL standard logic level) conversion on input signals 134 and 268, and digital to analog level conversion on output signals 134' and 268'.

The DS3 Analog Interface block 270 connects to the Protection Control 258, which further connects to the Protection Control on the adjacent module 171. The block 270 also has a bidirectional connection to the DAI circuit 250 at the DS3 level.

The DAI circuit 250 connects bidirectionally to the DS1 Framer Subsystem 256 at the DS1 level. An Alarm Indication Signal (AIS) clock source 274 feeds the DAI circuit 250. The DAI circuit 250 also has a bidirectional connection to a block of DS2 Glue Logic 276 within the DS2 Handler 260. The DS2 Glue Logic 276 connects bidirectionally to a 7×7 Crosspoint Array 278, also within the DS2 Handler 260, which further connects a buffer 280. The buffer 280 provides seven bidirectional DS2 links 282 that leave the DS3 module 171.

The DS2 Glue Logic 276 also has a bidirectional connection to the TSI circuit 252, which then further connects to a buffer 284 at a bidirectional DS0 level. The buffer 284 then connects to the bidirectional PCM Highway 220. The TSI circuit 252 has a bidirectional connection to the FDL Handler 254, which then further bidirectionally connects to the Standard CPU Complex 262. The HDLC link 192 also has a bidirectional connection to the Complex 262. The CPU Complex Extensions 264 tie in with the Complex 262 to provide additional I/O capability.

The functionality of the DS3 Module subsystems will now be described below.
DAI Circuit The DAI circuit 250 performs continuous performance monitoring on the DS3 as well as all embedded DS2s and DS1s. In addition the DAI provides for the drop and insert of any DS2 bit via a PDS2 interface to the DS2 Handler 260. The DAI 250 also allows for the drop and insert of any DS3 control bit. A second DS3 interface is provided along with a configurable bit for bit compare circuit, which will be discussed hereinbelow, that allows for the verification of proper DS3 signal flow. At the DS3 level, the DAI 250 supports both Asynchronous Muldem DS1/DS3 (M13) and C-Bit Parity frame formats, which will be discussed below. A more detailed description of the DAI 250 is provided below under the main heading "The DS3 Drop and Insert (DAI) Circuit".
Asynchronous TSI Circuit The main functions of the asynchronous TSI circuit 252 are to multiplex/demultiplex DS1 signals and to perform switching and routing of asynchronous DS0 signals. The TSI 252 supports the drop and insert for up to 24 DS0 channels. Other functions of the TSI 252 include a frequency counter, DS0B subrate handler (4 DS0B channels), PDS2 overwrite control for DS0s, and a Facilities Data Link (FDL) handler for ESF formatted DS1s. The TSI 252 also provides support for DDS secondary channel by allowing for "bit 8" drop and insert on up to 24 DS0s. A more detailed description of the TSI 252 is provided below under the main heading "The Asynchronous Time Slot Interchange (TSI) Circuit".
Facilities Data Link (FDL) Subsystem The DS3 Module 171 provides FDL support via dedicated circuitry on the TSI 252 operating in conjunction with an external microcontroller (see FIG. 23). The FDL is a 4 Kbs data stream embedded in ESF formatted DS1 signals.

The TSI 252 continuously extracts FDL bits from each of the 28 DS1s and stores them in an internal buffer. The buffer can hold up to seven FDL bits for each DS1. To prevent buffer overflow, the FDL microcontroller (uC) 254 must poll the TSI at a frequency such that a maximum of seven FDL bits are stored between polling cycles. This can be accomplished using a nominal polling cycle of 1.7 ms since a worst case fast DS1 will produce seven FDL bits in 1.7498 ms.

The FDL uC 254 is an industry standard 8052 running at 20 MHz. The 8052 has 8K bytes of ROM, 256 bytes of RAM, a clock oscillator, 3 timer counters, an interrupt controller, and a 1.66 Mbs serial port. To start the data transfer from the TSI 252 to the FDL uC 254, the FDL uC asserts a FDLDIR signal and waits a minimum of 2 us. This causes the TSI 252 to move the stored FDL bits from the online buffer to the output buffer. To extract the data from the output buffer of the TSI 252, the FDL uC 254 performs 28 consecutive byte read operations from the 8052 serial port. Each byte corresponds to a DS1 channel starting with #1 and ending with #28.

Since all FDL channels can be running at slightly different rates the 28 FDL bytes may not have the same number of valid FDL bits. To determine the number of valid FDL bits contained in each byte, the FDL uC starts at the least significant bit and looks for the first bit position containing a zero. All remaining bits in the byte are valid. For example, if there are seven valid data bits then the least significant bit (lsb) will be zero and the remaining seven bits are interpreted as valid FDL data bits. If the least significant bit is a one and the next bit is a zero then there are six valid FDL bits.

The FDL uC 254 interprets each 4 Kbs FDL bit stream it receives from the TSI 252 for both scheduled and unscheduled performance messages. For scheduled performance report messages, which occur every second, the FDL uC 254 extracts the sixteen bits (two bytes) of information associated with the current second (t0). The other thirteen bytes of the message are discarded. For unscheduled messages, only a yellow alarm is recognized, all other messages are discarded.

Every ten ms, the DS3 Module 68000 processor (available from Motorola), within the Standard CPU Complex 262, reads a sixteen bit word from the FDL uC 254. The sixteen bit words contain the extracted FDL messages along with header information to identify the DS1 channel, the message type (scheduled/unscheduled), and the 8052 internal buffer status. The 68000 can also write eight bit values to the FDL uC 254 for future applications that require configuration data. The interface between the 68000 and the 8052 is implemented with two 8-bit tri-state buffers and an 8-bit register.

The 68000 within the Standard CPU Complex 262 can reset the FDL uC 254 under program control, and a watchdog low speed clock signal is sent from the uC to the 68000 to provide an indication of sanity.

DS1 Framing Subsystem

The DS3 Module 171 provides support for framing on all 28 DS1s in SF, ESF, T1DM, or SLC-96 formats. Framing at the DS1 level is performed by an external microcontroller, within the DS1 Framer Subsystem 256, operating in conjunction with the DAI. The Framer uC is the 8052 (same as FDL uC 254) running at 16 MHz.

The DS1 Framing Subsystem 256 operates on one DS1 signal at a time. The entire DS1 data stream (up to 72 frames) is loaded into a external 16 K×1 RAM by the DAI 250. The Framer uC then examines the RAM to determine where the framing pattern is. The Framer uC then feeds an offset to the DAI to indicate where the framing pattern was found. The RAM address generator of the DAI consists of a 14 bit counter which is implemented, along with some glue logic, in a small Erasable Programmable Logic Device (EPLD), an Intel 5C60/Altera EP600.

DS2 Handler Subsystem

The DS2 Handler Subsystem 260 consists of the circuitry that processes the DS2 level signals that flow between the DAI 250, the TSI 252 and the backplane.

The interface between the DAI 250 and TSI 252 consists of groups of pseudo DS2 (PDS2) signals. "Pseudo" refers to the fact that the signals run at the DS2 rate but the clock is gapped for non-DS1 data bits and all DS1 framing information is provided. The seven groups represent the seven DS2s that are embedded in the DS3. The DAI 250 feeds the inverted DS2 data stream directly to the TSI 252. The DAI 250 also sends out the DS2 clock along with a cycle "block" signal to indicate where the DS2 overhead bits are located. External circuitry is provided to gate the clock with the block signal thus providing a gapped DS2 clock to the TSI 252. The DAI 250 also provides signals used to locate DS1 data bits and frame bits in the DS2 data stream. A two bit value is fed from the DAI 250 to the TSI 252 to indicate which DS1 the current bit on the DS2 data line is associated with. A DS1 multi-frame signal is also provided to the TSI to indicate when the first F-bit of a DS1 multi-frame is currently active on the DS2 data line.

The TSI 252 sends inverted data at the DS2 rate back to the DAI 250 along with an overwrite signal that indicates to the DAI 250 which of the bits coming from the TSI 252 should be overwritten onto the outgoing DS3 data stream. The output data and overwrite signals of the TSI 252 are processed by external circuitry so that they can be de-activated during DS2 overhead bits before being sent onto the DAI 250.

A crosspoint switch array 278 is provided as the interface between the DAI 250 and the DS2 links 282 on the backplane. In this manner any of the seven DS2 signals from the DAI 250 can be connected to any of the seven DS2 links 282 on the backplane. The five signals associated with each of the seven DS2s require five 7×7 crosspoint arrays 278 to provide the switch function. All five crosspoint arrays 278 are configured with the same crosspoints activated since the group of signals for the specified DS2 are always routed together.

After passing through the crosspoint array 278, the DS2 data coming from the DAI 250 is fed through inverting buffers 280 and out onto the backplane. Both the DS2 clock and frame signals coming from the DAI 250 are sent through 7×7 crosspoint arrays 278 and fed through non-inverting buffers 280' (not shown) and out to the backplane.

The DS2 data coming from the backplane is inverted and sent through a 7×7 crosspoint array 278 before being "ORed" with the data coming from the TSI 252 and sent on to the DAI 250. The companion DS2 overwrite signal coming from the backplane is also sent through a 7×7 crosspoint array 278 before being "ORed" with the overwrite signal coming from the TSI 252 and sent on to the DAI 250.

The crosspoint arrays 278 are implemented with 8×8 analog switch devices (Mitel MT8809) that are designed to handle digital signals. Since the DS2 signals are arranged in groups of seven, only the 7×7 portion of the devices is actually used.

DS3 Protection Subsystem

The access system 170 provides a one-for-one protection scheme. Each main DS3 path 134 has associated with it a protection path 268 on the adjacent DS3 Module. Failure conditions on the main path 134 cause the DS3 signal to be switched to the protection path 268. When the failure condition is removed, the signal is switched back to the main path 134.

Several conditions can cause a switch to the protection path. Under hardware control by the Protection Control 258, if there is a power loss or if the output of the DS3 LI circuit 272 has no activity, then a switch is made to the protection path 268. If the 68000 CPU complex watchdog timer times out this will also force a switch to the protection path. In addition under software control the CPU can force a protection switch. The CPU also has the capability of forcing a protection switch off of the main path on the adjacent board. Whenever any of the conditions that caused the protection switch to occur are removed then the DS3 signal is again routed through the main path 134.

There are several status signals available to the CPU to aid it in determining when to invoke a software controlled protection switch. These signals include: loss of activity on main path, loss of activity on protection path for adjacent DS3, loss of signal on main path, loss of signal on protection path for adjacent DS3 signal and loss of signal on main path for adjacent board.

When a protection switch is invoked, the signals are timed so that events take place in the following sequence:

1. Close protection path relay
2. Delay 15 ms
3. Simultaneously enable protection path DS3 LI 272' and disable main path DS3 LI 272
4. Open main path relay When the DS3 signal is switched back to the main path, events take place in the following sequence:

1. Close main path relay
2. Delay 15 ms
3. Simultaneously disable protection path LI 272' and enable main path LI 272
4. Open protection path relay Once a protection switch is invoked, the CPU must force the main path LI 272 output to be enabled so that the activity detector can resume functioning and allow the return to the main path 134 if activity is again detected. Once activity is again detected on the main path LI output, the CPU must relinquish control of the LI output enable (this will result in the LI output being disabled). In order that the activity detector does not immediately flag a loss of activity and prevent switching back to the main path 134, there must be a minimum 30 ms delay in its loss of activity detect time. This allows enough time for the main path LI 272 to be enabled (15 ms after start of switch back to main path). So that a protection switch is not again immediately invoked, the activity detector must have a maximum delay of 5 ms before declaring the presence of activity. A more detailed description of the Protect Path is provided below under the main heading "The Protect Path".

DS3 Path Delay Adjustment

The DS3 signal in the access system 170 goes through the DS3 LI 272 and the DAI 250. In the protection switching scheme there are two parallel paths taken by the DS3 signal: the main path 134 and the protection path 268. A fault on one path results in the DS3 being routed through the other path.

To minimize downstream disruptions to the network, the access system 170 provides hitless switching capability when switching between the two DS3 paths. Normal manufacturing tolerances result in potential delay differences between the main and protection paths that would not allow for hitless switching. To remedy this problem, the delay through all DS3 paths is adjusted to an absolute reference before the modules are placed in service.

Figure 29:
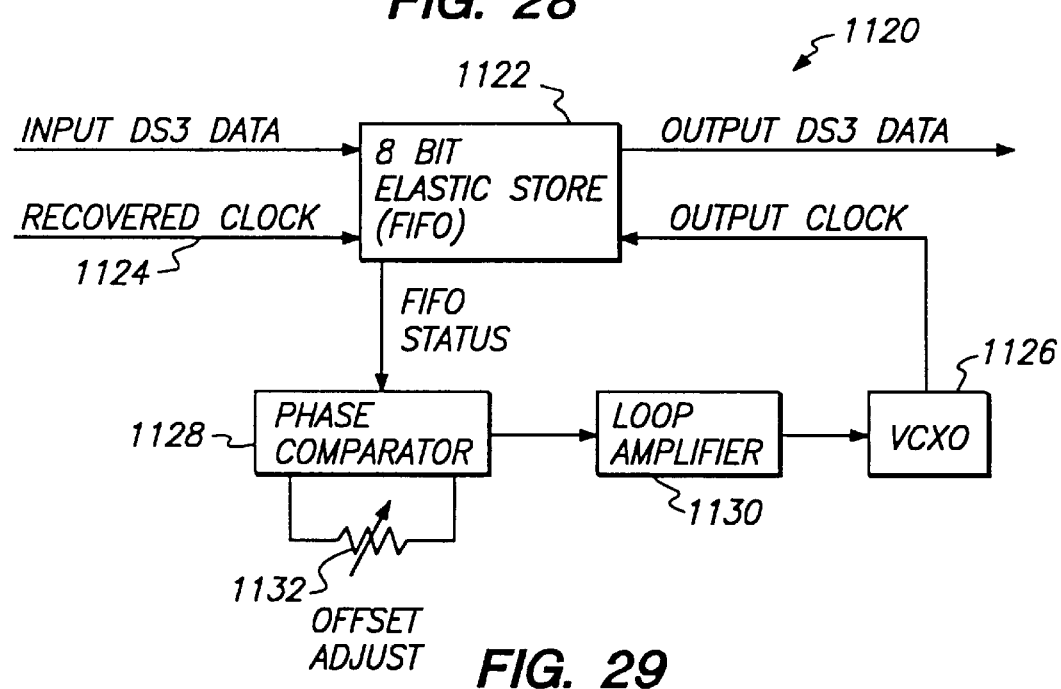
FIG. 29 is a block diagram of the DS3 data path delay adjustment portion of the DS3 Linear Interface (LI) circuit shown in FIG. 6.

A delay adjustment circuit 1120, which is a portion of the preferred DS3 LI 272 and 272', is shown in FIG. 29. The circuit 1120 contains an eight bit elastic store 1122 (a First In, First Out or FIFO structure) in the transmit direction. Input DS3 data is clocked into the elastic store 1122 using a recovered data clock 1124. The recovered data clock 1124 is extracted from the input DS3 data stream through a signal processing circuit which produces current pulses leading to a 44.736 MHz LC tank circuit in another portion of the DS3 LI circuit (not shown). A tank circuit has inductance and capacitance, and is capable of storing electrical energy over a band of frequencies continuously distributed about a single frequency about which the circuit is said to be resonant, or tuned. Output DS3 data is clocked out using an output clock that is generated by a voltage controlled crystal oscillator (VCXO) 1126.

The frequency of the VCXO 1126 is automatically adjusted until it matches the frequency of the incoming data, which has a variance of +/−20 ppm. The automatic frequency adjustment is implemented using a phase comparator 1128 that monitors the status of the elastic store 1122 and a loop amplifier 1130. The status signals include: elastic store less than half full, elastic store more than half full, elastic store reading from last bit and elastic store reading from first bit.

The phase comparator 1128, the loop amplifier 1130 and the VCXO 1126 are used together as a phase lock loop circuit. The phase comparator 1128 output is a smoothed analog, delay error signal connected to the loop amplifier 1130. The loop amplifier output is a DC control signal which provides instantaneous frequency and phase information to the VCXO 1126. The phase comparator 1128 and loop amplifier 1130 adjust the frequency of the VCXO 1126 such that the elastic store 1122 remains in the half full position nominally. In addition, the phase of the VCXO clock 1126 is manually adjusted until the delay through the entire DS3 path is exactly 980 +/−1 nanoseconds. The VCXO offset phase adjustment is controlled by a potentiometer 1132 that is manually adjusted at the time the DS3 module 171 is manufactured to ensure that the input to output DS3 delay is approximately equal to the nominal number of bits desired in the elastic store. Hitless protection is assured by having all DS3 modules 171 adjusted in this manner.

68000 CPU Complex

Referring now again to FIG. 6, the CPU complex on the DS3 Module consists of the "Standard CPU Complex" 262 along with some additional circuitry 264 required by functions particular to the DS3 Module.

The "Standard CPU Complex" 262, which is included in entirety on the DS3 Module, contains the following:

1. 68HC000 microprocessor with clock generator
2. 128K Bytes Electrically Programmable Read-Only Memory (EPROM)
3. 256K Bytes flash memory
4. 256K Bytes Pseudo Static RAM with auto-refresh
5. 2K Bytes Electrically Erasable PROM (EEPROM)
6. Wait state generator/bus error generator
7. Interrupt controller
8. Power on reset circuit
9. Watchdog timer
10. HDLC Serial link controller
11. Multi-function I/O port:
    4 counters
    Universal Asynchronous Receiver Transmitter (UART)
    8 bit I/O port There are four Light Emitting Diodes (LEDs) on the DS3 Module to indicate the following conditions:

1. Unit Fail (Red)
2. CPU in Service (Green)
3. DS3 Main Online (Green)
4. DS3 Protection Online (Amber)

CPU Complex Extensions

The DS3 Module requires additional I/O capability beyond that supplied by the standard CPU complex. This additional capability is provided by the CPU Complex Extensions 264. There are five I/O lines available in the standard CPU complex 262; however, additional I/O is required for the Framer microcontroller (1 status, 3 control), the FDL microcontroller 254 (4 status, 1 control), the DAI 250 (2 status), the DS3 LI protection circuit (13 status, 11 control), DS2 link tri-state enables (7 control), and two additional LEDs. There are no additional chip select requirements beyond that provided by the standard CPU complex 262.

In order to save pins, the DAI 250 requires a multiplexed address/data bus. Circuitry is provided to multiplex the lower eight bits of the 68000 address and data busses together before feeding them to the DAI 250.

DS3 Module Interfaces

All interfaces between the DS3 Module 171 and the rest of the access system 170 are routed over an 140 pin edge connector. The primary interfaces include: the DS3 interface 134, the PCM Highway interface 220, seven DS2 interfaces 282, and the HDLC interface 192. There are several additional interfaces that are also described below.

DS3 Analog Interfaces

There are two paths for DS3 signals passing through the DS3 Module: the main path 134 and the protection path 268. Full performance monitoring and drop and insert capabilities exist for the main path DS3 134 while the protection path 268 basically functions as a repeater with delay inserted to match the main path.

There are three types of DS3 analog interfaces on the DS3 Module: line receivers, line transmitters, and monitor outputs. The line.receivers take the input from the DS3 line 134 and convert it into a TTL level digital signal plus clock. The line transmitters take the TTL signal plus clock and convert it into an analog bipolar DS3 signal 134'. The monitor outputs are similar to the transmitter outputs and are sent over the backplane to the Monitor card.

PCM Highway Interface

The PCM Highway 220 provides the mechanism for routing of DS0s throughout the access system 170. With 128 time slots, the PCM Highway 220 supports transmission of up to 128 bi-directional asynchronous DS0 channels. The PCM Highway 220 is arranged in a master/slave fashion, where masters, such as the DS3 Module 171, transmit onto four Tx lines each supporting 32 times slots, and receive from four Rx lines each supporting 32 time slots.

The master also drives an additional transmit status line which indicates whether or not the associated time slot contains valid data or stuff data in the current frame. Stuff data and bit stuffing will be described hereinbelow. PCM Highway slave devices such as the DSP module receive from the Tx lines and transmit onto the Rx lines, while monitoring the transmit status line in order to extract DS0 timing.

Arbitration of the PCM Highway 220 is controlled by software via proper allocation of time slots among the various master or slave devices throughout the system. A single clock and frame sync signal are fed to all devices on the PCM Highway 220 for synchronization.

In normal operation only one device is driving the PCM Highway 220 during any given time slot. However, due to clock skew and differences in driver and receiver buffer delays there can be bus contention for short periods of time (~50 ns) near the time slot transitions. To resolve this contention issue, open collector drivers (such as 74ALS1005/74ALS1035) are used for transmitting onto the PCM Highway 220. With open collector buffers, contention is not a problem since the buffers sink current in the logic "0" state and are inactive in the logic "1" state. In a case where two or more drivers are active simultaneously, they all will be attempting to bring the line to the same logic "0" level, with no backdriving taking place. Centralized pull-up resistors on the PCM Highway 220 provide default logic "1" levels on inactive lines.

The DS3 Module 171 also outputs five transmit enable signals, one for each of the four Tx lines and one for the transmit status line. These signals indicate when that particular DS3 Module 171 is driving the associated line on the PCM Highway 220.

Figure 7:
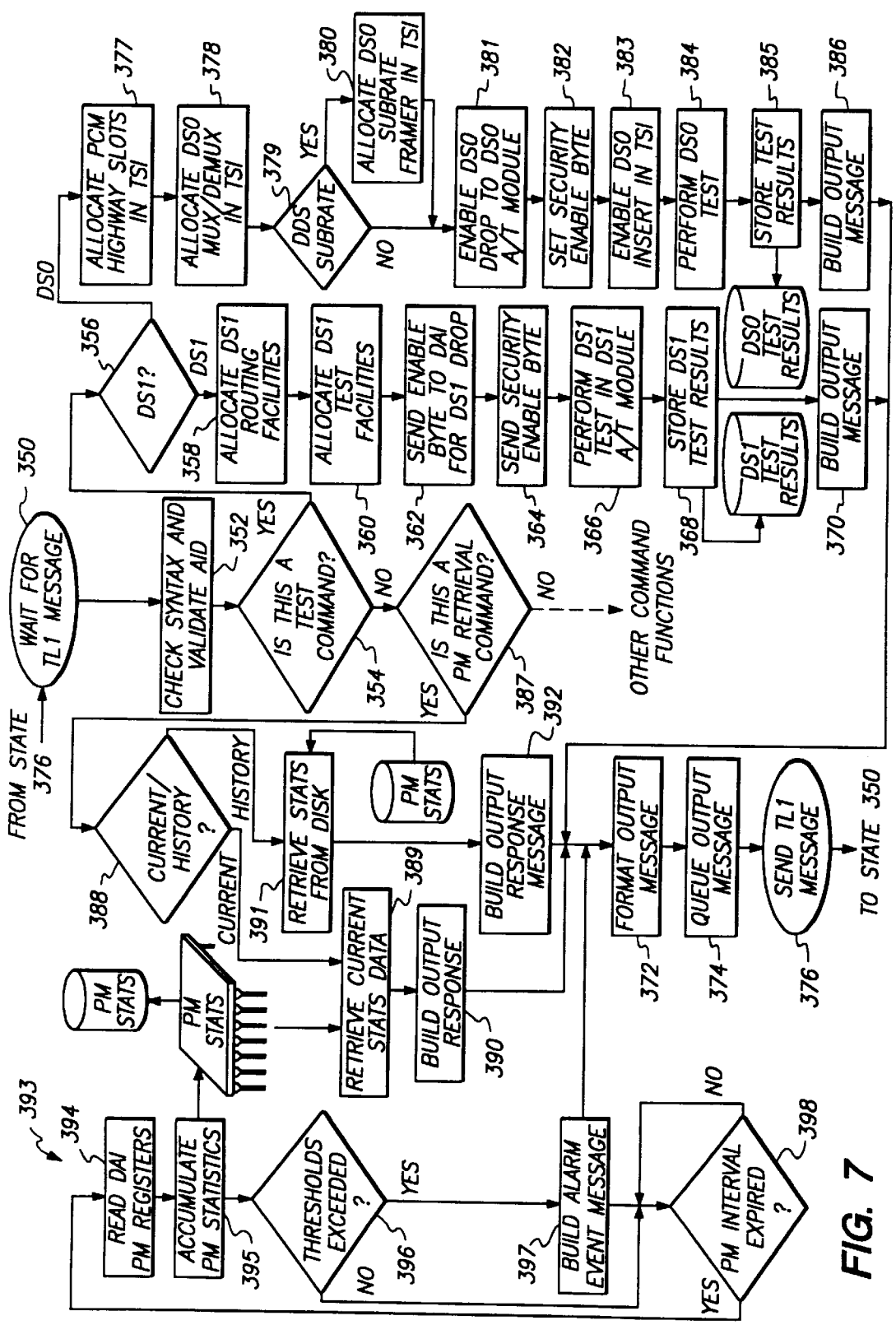
FIG. 7 is an operational flowchart of the access system shown in FIGS. 4 and 5.

FIG. 7 is an operational flowchart for the presently preferred access system 170. A first portion of the system software is message driven, and so, at state 350, waits on a TL1 message at the communications processor 194 (FIG. 5). The message from the OS (not shown), sent across the OS link 196, will contain a command function and an access identification (AID) that are validated at state 352. Proceeding to state 352, the command function is checked for whether a test command has been requested and, if it is, a decision is made at state 356 as to whether the test is a DS1 or DS0 level test. If a DS1 level test has been requested, the test information is forwarded to the administration processor 190 which in turn communicates across the HDLC bus 192 to one of the DS3 interfaces 171 and one of the DS1 test resources 184 to allocate routing and resources (states 358 and 360).

Now the access system 170 is ready to begin the DS1 test. Continuing to states 362 and 364, the access system 170 sends an enable byte and security byte to the DAI circuit 250 to demultiplex the requested DS1 channel from the DS3 bit stream received from the input line 134. The requested DS1 channel is forwarded across the pseudo-DS1 bus 234 to the allocated DS1 test resource (A/T module) 184 where the test is performed at state 366. Moving to state 368, the test results are sent across the HDLC bus 192 to the administration processor 190 where the test results are stored on a disk in the peripheral subsystem 212 and, at state 370, an output message, including the test results, is created by the access system 170.

A final sequence of states is necessary to forward the test results back to the OS. The administration processor 190 communicates the unformatted output message to the communications processor 194 where the message is placed in TL1 format (state 372). The message is then queued for output (state 374) and finally, at state 376, it is transmitted to the OS across the OS link 196. The access system 170 then returns to state 376 to wait on another command message.

Another branch of processing flow occurs if the decision at state 356 is that the command function requests a DS0 level test. At states 377 and 378, PCM Highway slots and DS0 multiplexer/demultiplexer circuits are allocated by commands sent from the administration processor 190 to the TSI circuit 252 on the DS3 interface 171. Moving to state 379, the administration processor 190 allocates the DS0 subrate framer in the TSI circuit 252 (state 380) if a DDS subrate test was requested. Then, states 381–386 are carried out similarly to states 362–370, except that DS0 insert must be enabled in the TSI 252 at state 383 and the DS0 test resource 186 receives the DS0 channel across the PCM Highway 220. From state 372, the results of the DS0 test are forwarded to the OS in the same manner as the DS1 test results.

Returning in the discussion to decision state 354 of FIG. 7, if the command function is not a test command, the communications processor 194 moves to state 387 to test whether the command requests a performance monitoring (PM) data retrieval. PM data is maintained on a continuous basis for the DS3 signal as well as all embedded DS2 and DS1 channels. If the command is not a PM command, then other commands are checked and processed accordingly (not shown). Assuming the command received from the OS is to retrieve PM statistics, a test is made at state 388 to determine whether current or history statistics were requested.

A request for current PM statistics is handled by a request from the administration processor 190 to the DS3 interface 171. The DS3 interface 171 then retrieves current PM statistics from memory and forwards them back to the processor 190 (state 389) where an output message, containing current PM statistics, is constructed (state 390) and communicated back to the OS as before proceeding from state 372.

On the other hand, if history PM statistics were requested, then the administration processor 190 retrieves the PM statistics from a disk that is part of the peripherals subsystem 212 (state 391). An output message, containing history PM statistics, is constructed at state 392 and communicated back to the OS as before proceeding from state 372.

The software for the access system 170 also comprises a performance monitoring (PM) process 393 which is periodically executed in the DS3 interface 171 (FIG. 4). The process 393 begins at state 394 by reading performance monitoring (PM) registers located inside of the DAI circuit 250. PM statistics are accumulated and stored in on-board semiconductor memory at state 395. Moving to state 396, the statistics are tested for whether any thresholds have been exceeded. If a threshold has been exceeded, an alarm/event message is constructed at state 397, forwarded to the administration processor 190, and sent back to the OS, as before, proceeding from state 372. If no threshold is reached, or the alarm/event message has been sent, the PM process 393 terminates. As indicated by state 398, once a PM interval expires, the PM process 393 is restarted.

II. THE DS3 DROP AND INSERT (DAI) CIRCUIT

A. Interfaces

Figure 8:
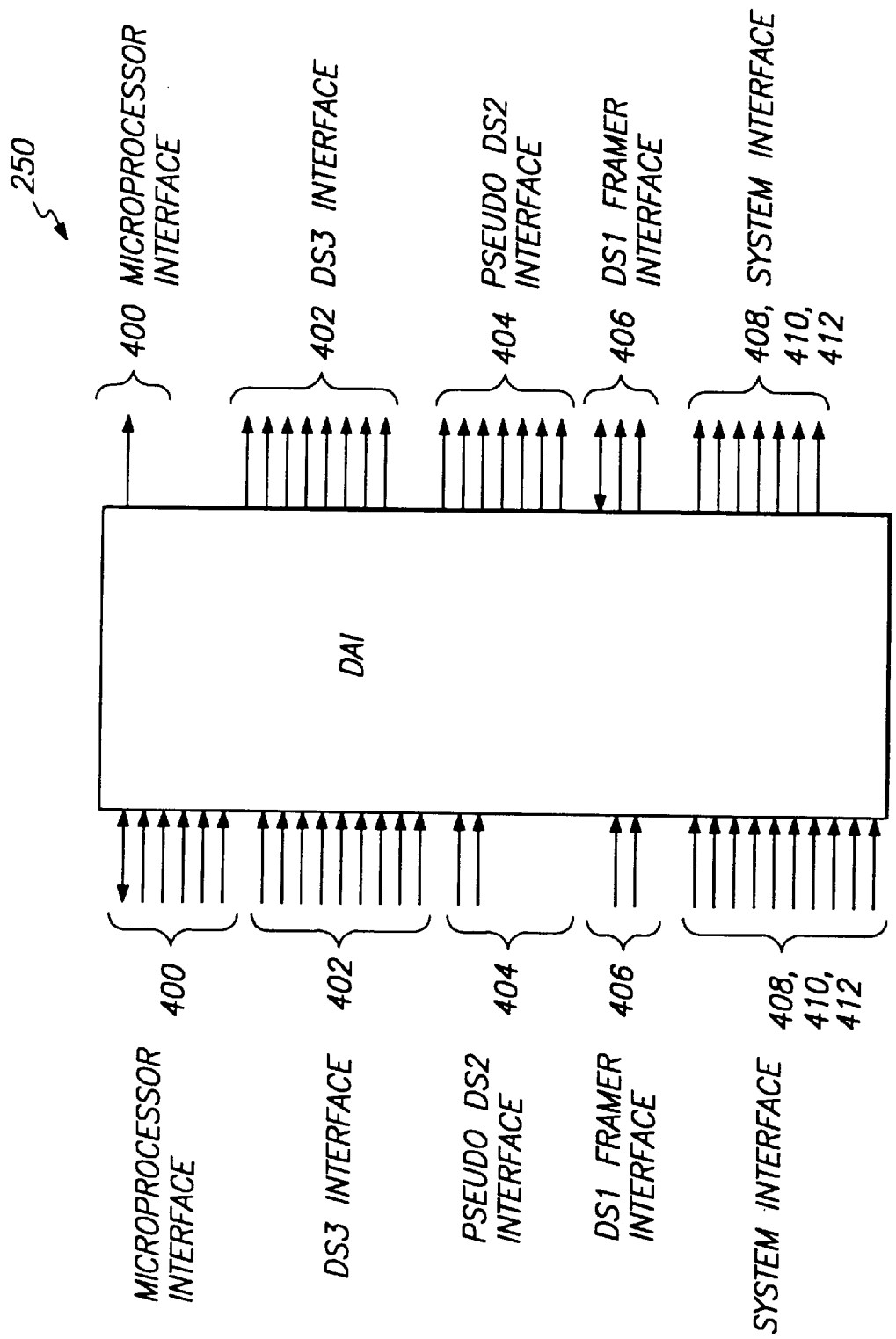
FIG. 8 is an input/output (I/O) diagram of the Drop and Insert (DAI) circuit shown in FIG. 6.

FIG. 8 is an Input/Output diagram for the DAI circuit 250. A description of each I/O pin group is given below.

DS3 Processor Interface

A DS3 Processor Interface 400 is provided to allow the DAI 250 to be configured and for the status that is generated by the DAI to be reported.

DS3 Transceiver Interface

A DS3 Transceiver Interface 402 is provided to allow the DAI 250 to interface to the DS3 Line Interface device which recovers the DS3 clock and converts the DS3 signal 134 into two rail Non-Return-to-Zero (NRZ) data in the receive direction and it converts the two rail NRZ data and clock from the DAI into a DS3 signal 134' in the transmit direction.

Pseudo DS2 Interface

A Pseudo DS2 Interface 404 is provided to allow the capability for an external device to overwrite any information bit in the DS3 signal 134.

DS1 Framer Interface

A DS1 Framer Interface 406 is provided to allow the capability for an external device to synchronize the internal DS1 state counters of the DAI 250 to the 28 internally generated component DS1 channels.

Alternate DAI Interface

An Alternate DAI Interface 408 (shown as part of a system interface 412 in FIG. 8) is provided to allow the capability for the alternate DAI to insert a Far End Block Error (FEBE) in the East to West DS3 signal in response to a parity error in the West to East DS3 signal.

Control Bit Interface

A Control Bit Interface 410 (shown as part of the system interface 412) is provided to allow the capability for an external device to overwrite any control bit in the DS3 signal 134.

System Interface

The System Interface 412 is provided for miscellaneous signals such as clocks, resets, enables, power, ground and alarms.

B. Functionality

Figure 9:
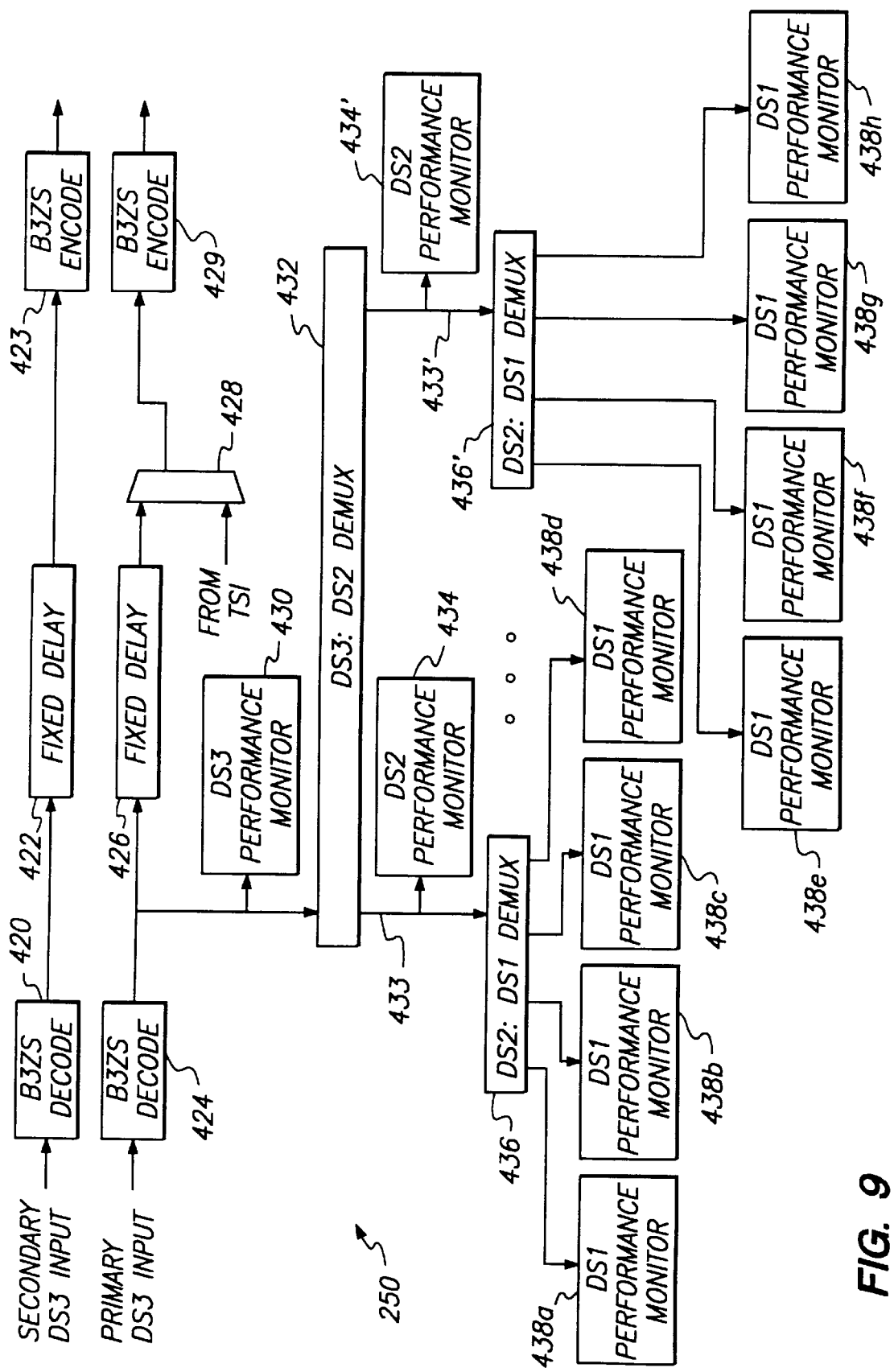
FIGS. 9 is a high level block diagram of the DAI circuit shown in FIG. 8.

The top level block diagram of the DAI circuit 250 is shown in FIG. 9. A secondary DS3 input from the DS3 Analog Interface 270 (FIG. 6) goes to a bipolar with three-zero substitution (B3ZS) Decoder 420, through a fixed delay 422 and exits after encoding by a B3ZS Encoder 423. A primary DS3 input from the DS3 Analog Interface 270 goes to a B3ZS Decoder 424 and through a fixed delay 426 which has a different value than the delay 422. Connected to the delay 426 is a multiplexer 428 which is further connected to a B3ZS Encoder 429, whereupon the signal leaves the DAI circuit 250.

A signal line from the output of the B3ZS Decode 424 connects to a DS3 Performance Monitor 430 and to a DS3 to DS2 demultiplexer 432. The DS3:DS2 demultiplexer 432 has seven output lines of which only the first 433 and last (seventh) 433' are shown in FIG. 9. The first output line 433 connects to a DS2 Performance Monitor 434 and to a DS2 to DS1 demultiplexer 436. The last output line 433' connects to a DS2 Performance Monitor 434' and to a DS2 to DS1 demultiplexer 436'. The DAI circuit 250 has seven DS2 Performance Monitors, like the Monitor 434, and seven DS2:DS1 demultiplexers, like the demultiplexer 436. The DS2:DS1 demultiplexer 436 has four output signals; each output signal is connected to a DS1 Performance Monitor 438a–d. The DS2:DS1 demultiplexer 436' has four output signals; each output signal is connected to a DS1 Performance Monitor 438e–h. Connected to the four output signals of each of the seven DS2:DS1 demultiplexers 436 is a DS1 Performance Monitor 438, for a total of 28 DS1 Performance Monitors in the DAI circuit 250.

The DAI circuit 250 provides performance monitoring of a single direction of a DS3 signal and its constituent channels. Frame Formats supported include M13 Asynchronous, C-Bit Parity, SF, ESF, T1DM, and SLC-96. The M13 Asynchronous format, also known as the DS3 frame format, and the DS3 C-Bit Parity format will be described below in association with FIGS. 12–14.

The DAI circuit 250 provides for the drop and insertion of any of the 4704 information bits in the DS3 signal via the DS2 Interface 404 (FIG. 8), and any of the 56 control bits in the DS3 signal via the Control Bit Interface 412 (FIG. 8).

The DAI circuit 250 provides a second digital DS3 interface along with a configurable bit for bit compare circuit (FIG. 10a, 470) that allows for the verification of the operation of other DAI circuits that are configured identically or for the cycle alignment of two DS3 signals to assure a hitless switch.

Figure 10A:
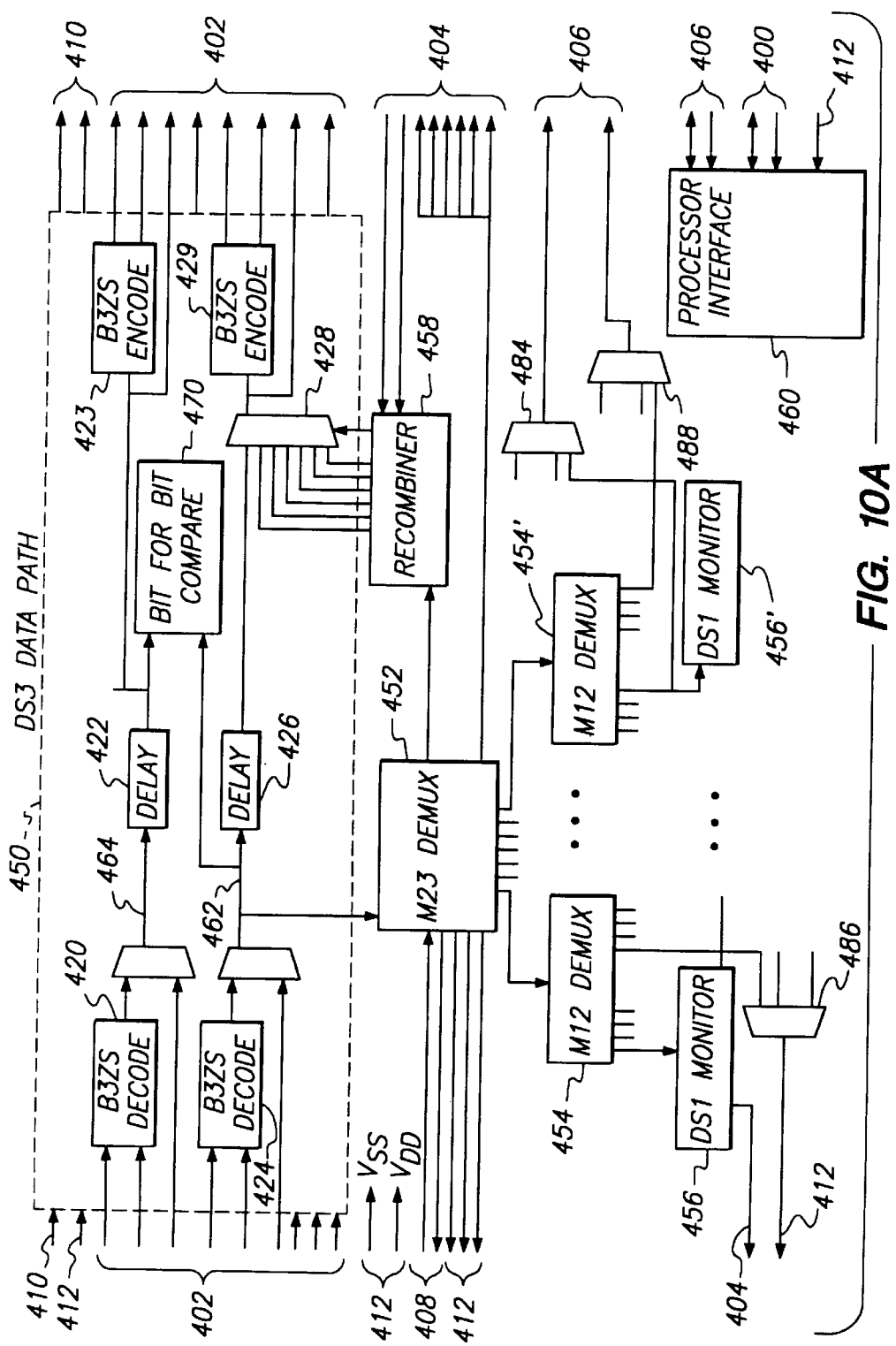
FIG. 10a is a detailed block diagram of the DAI circuit shown in FIG. 8.

The detailed level functional block diagram of the DAI circuit is separated into six different subgroups of circuitry as illustrated in FIG. 10a:

1. DS3 Data Path 450
2. M23 Demux 452 (FIG. 10b)
3. M12 Demux 454 (FIG. 10c)
4. DS1 Monitor 456 (FIG. 10d)
5. Recombiner 458 (FIG. 10e)
6. Processor Interface 460 (FIG. 10f)

1. DS3 Data Path

The DS3 Data Path section 450 of the DAI circuit 250 contains two groups of circuitry, one for the primary path 462 and one for the secondary path 464. The primary path 462 is the path that has the ability to overwrite DS3 data and control bits, while the secondary path 464 has no overwrite capability. There are four main functions that are performed in the DS3 Data Path section:

B3ZS encoding/decoding
Bit for bit compare
DS3 data delay
Overwrite of DS3 data and control bits.

a. B3ZS Encode/Decode

The zero code suppression used at the DS3 level is the bipolar with three-zero substitution (B3ZS) format, well known in telephone network technology. In the B3ZS format, each block of three consecutive zeros is removed and replaced by B0V or 00V, where B represents a pulse conforming with the bipolar rule, 0 is a zero (no pulse) and V represents a pulse violating the bipolar rule. The choice of B0V or 00V is made so that the number of B pulses between consecutive V pulses is odd.

The B3ZS decoders 420 and 424 take the incoming positive rail data and the negative rail data and converts the information into a single NRZ channel. The B3ZS encoders 423 and 429 take the single NRZ channel and converts the information into two NRZ channels, positive rail and negative rail.

b. Bit for Bit Compare

A Bit for Bit Compare circuit 470 connects to the output of the delay 422 and to the input of the delay 426. The Bit for Bit Compare circuit 470 provides the capability to verify the functionality of the DAI 250 while in service, and to verify the alignment of the primary path 462 and secondary, or redundant, path 464 prior to making a "hitless" switch. The Bit for Bit Compare circuit 470 will be further discussed in conjunction with FIG. 28.

c. DS3 Data Delay

The DS3 Data Delay circuitry 422 and 426 provides sufficient processing time for the M23 demultiplexer 452 and M12 demultiplexer 454 to calculate the pointers to the data in the DS3 stream that are used by the recombiner 458 in overwriting individual bits.

d. 7:1 Multiplexer Block

The 7:1 Multiplexer circuitry 428 provides the ability for the recombiner 458 to overwrite the DS3 data in the primary path 462 with data from any of the six sources. The select line for this multiplexer is generated by the recombiner.

2. M23 Demultiplexer

Figure 10B:
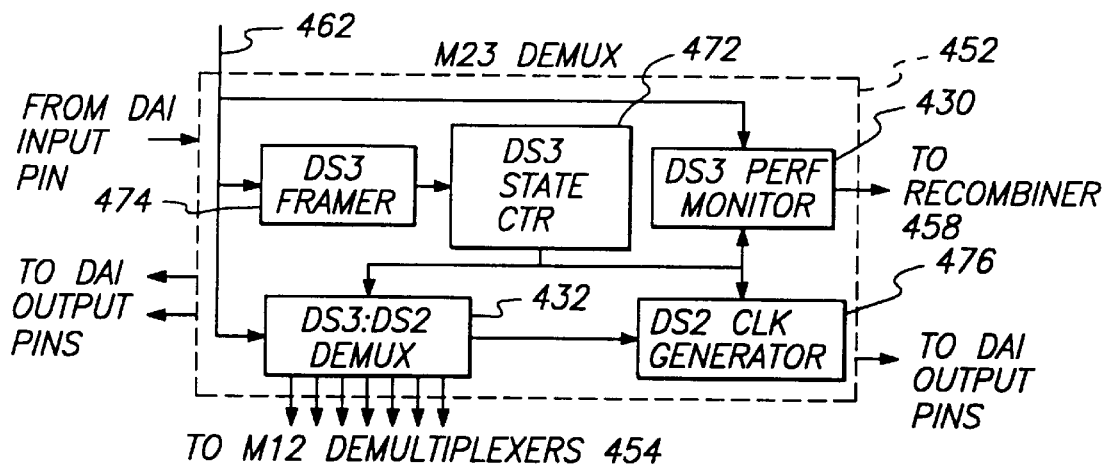
Figure 10C:
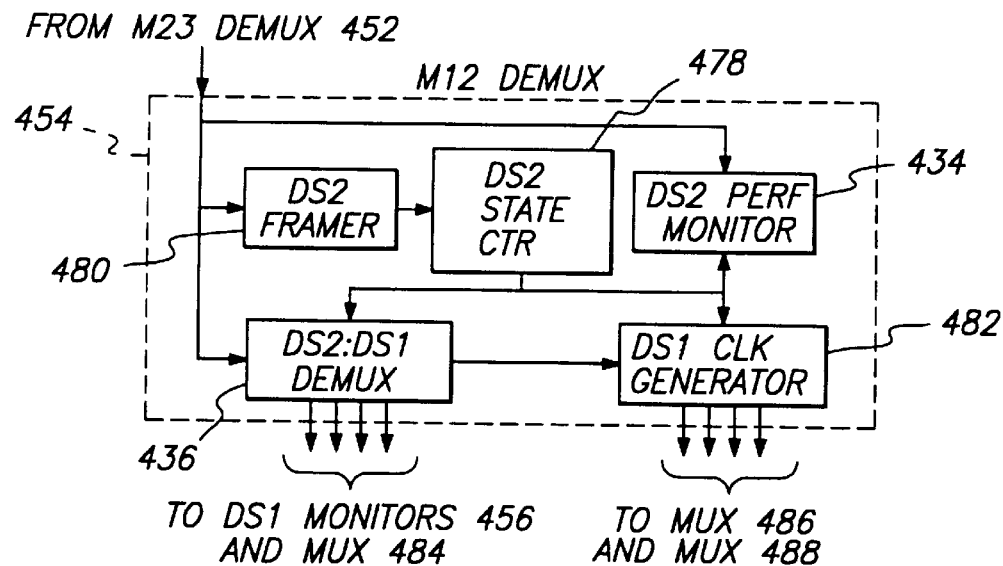

Referring now to FIG. 10*b*, the DS3 primary data path 462 is the main input to the DS3 to DS2 demultiplexer 452. The DS3 Performance Monitor 430 output, within the DS3 to DS2 demultiplexer 452, connects to the recombiner 458 (FIG. 10*e*), while each of the outputs of the DS2 data generator 432, also referred to as the DS3:DS2 demultiplexer in FIGS. 9 and 10, connects to one of the seven M12 demultiplexers 454 (FIG. 10*c*). Other outputs of the demultiplexer 452 connect to the DAI I/O pins as shown in FIG. 10*a*.

Figure 12:
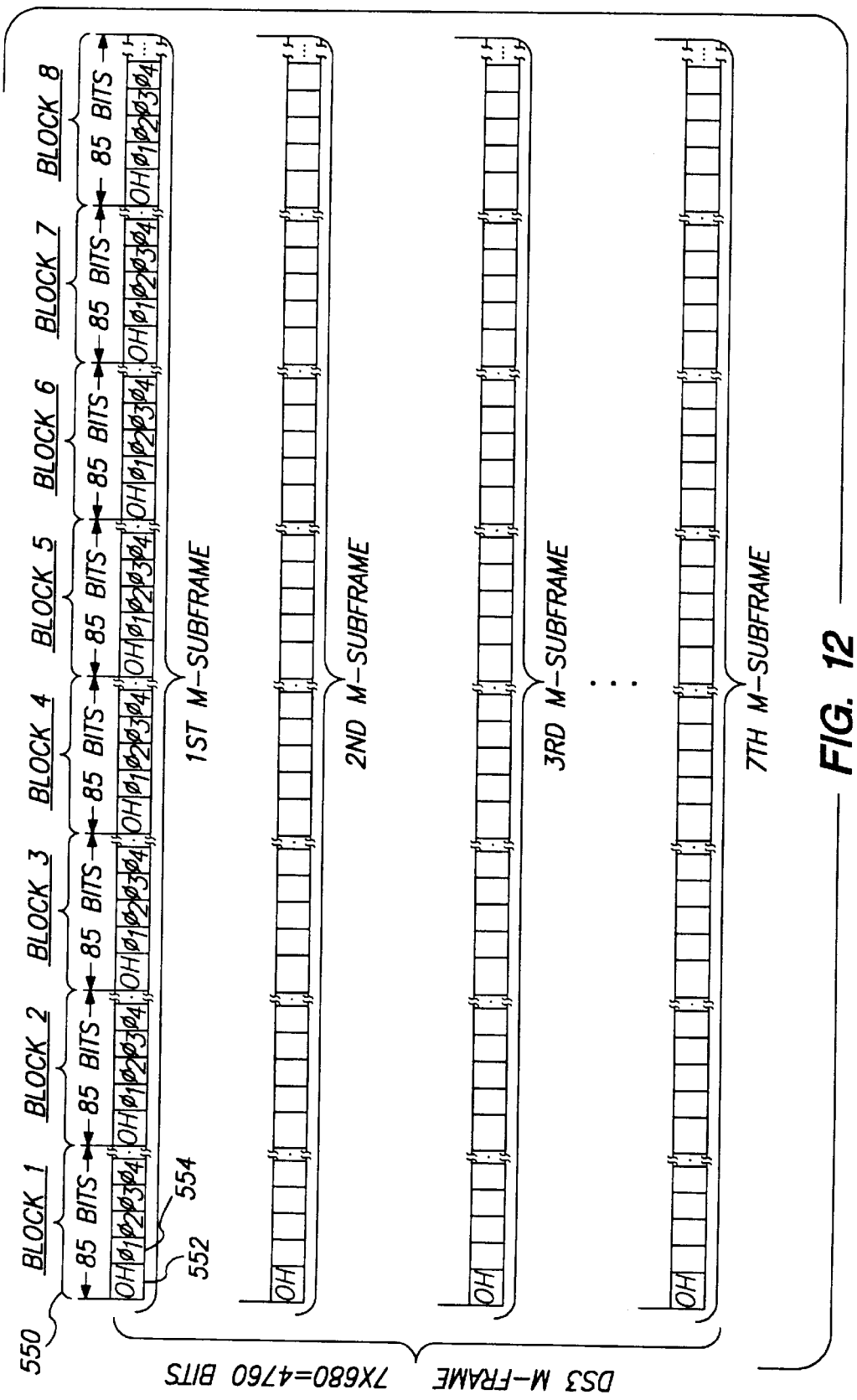
FIG. 12 is a diagram of a DS3 Framing Format for the DS3 level shown in FIG. 1.
Figure 13:
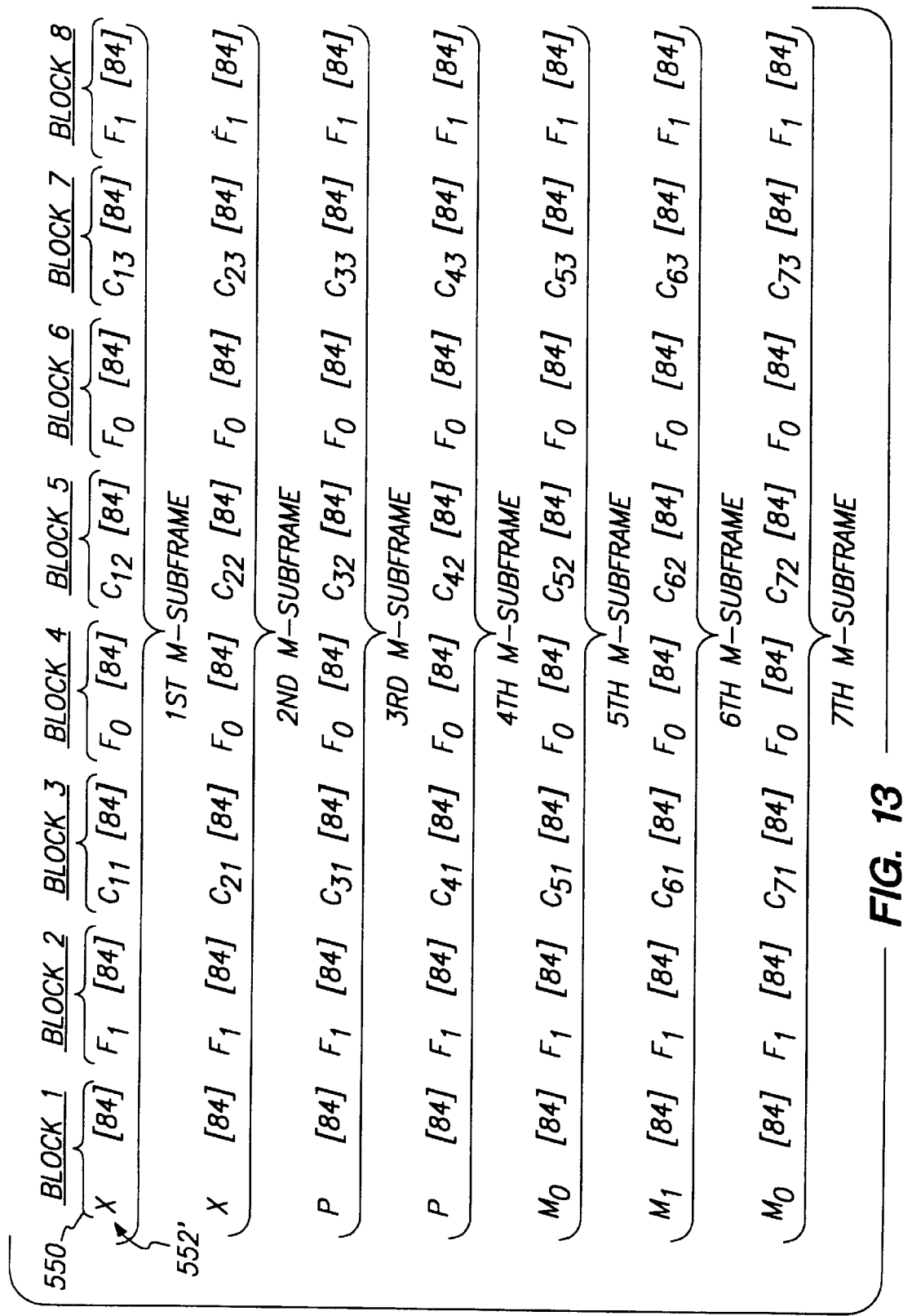
FIG. 13 is a diagram of DS3 Overhead Bits for the DS3 level shown in FIG. 1.

The DS3 to DS2 demultiplexer 452 demultiplexes the DS3 signal into its seven constituent DS2 channels along with their associated gapped clocks. Refer to FIGS. 12 and 13 for the M13 Asynchronous frame format and FIG. 14 for the C-Bit Parity frame format.

The four main functions of the DS3 to DS2 demultiplexer section include:

DS3 Framing

DS2 Clock Generation

DS2 Data Generation

DS3 Performance Monitoring a. DS3 Framing

A DS3 Framer 474 synchronizes a DS3 State Counter 472 to the incoming DS3 signal. The DS3 State Counter 472 provides a pointer that indicates which bit of the DS3 M-frame the incoming DS3 data bit is associated with. The DS3 Framer 474 and DS3 State Counter 472 will be discussed further in reference to FIG. 15*a* and 15*b*.

b. DS2 Clock Generation

A DS2 clock generator 476 uses the timing information from the DS3 State Counter 472 to generate seven 6.312 MHz gapped clocks. The clock pulse associated with a particular data bit is deleted or gapped by several conditions dependant upon the clocks destination.

c. DS2 Data Generation

The DS2 data generator 432 uses the timing information from the DS3 State Counter 472 to generate seven 6.312 MHz serial data streams. The DS2 data channels are synchronous with the associated DS2 gapped clock. No bit inversion is required when demultiplexing from DS3 to DS2.

d. DS3 Performance Monitoring

The DAI circuit 250 monitors the performance of both the standard M13 asynchronous signal format as specified in Bellcore TR-TSY-000009 and the DS3 C-Bit Parity signal format as specified in AT&T PUB 54014.

DS3 performance monitoring parameters that are continuously monitored by the monitor 430 are as follows:

Bipolar Violation Count

Loss Of Signal Status

Loss of Line A Clock Status

Loss of Line B Clock Status

F Bit Error Count

Out-of-Frame Status

Change of Frame Alignment Status

Line Parity Error Count

C-bit Parity Error Count

Far End Block Errors (FEBE) Count

Incoming C-Bit Parity Frame Format Status

Incoming All Ones Status

Incoming Yellow Alarm Status

Incoming Alarm Indication Signal (AIS) Detection Status

Incoming Stuck Stuffing Detection Status

Incoming Idle Signal Status

3. M12 Demultiplexer

There are seven DS2 to DS1 demultiplexers on the DAI circuit 250, one per constituent DS2 channel. Each DS2 to DS1 demultiplexer is alike, and performs the same functions. The first DS2 to DS1 demultiplexer 454 and the last (seventh) DS2 to DS1 demultiplexer 454' are shown in FIG. 10*a*. As described above, each DS2 to DS1 demultiplexer is driven by an output of the DS2 data generator 432 (FIG. 10*b*). Referring now to FIG. 10*c*, outputs of the DS2 to Ds1 demultiplexer 454 are driven by the DS1 data generator 436, also referred to as the DS2:DS1 demultiplexer in FIGS. 9 and 10, and a DS1 clock generator 482. Each DS1 data generator 436 is connected to four DS1 Monitors 456 (FIG. 10*d*), and also provides four outputs that connect to a multiplexer 484 (FIG. 10*a*). Each DS1 clock generator 482 provides four outputs that connect to a multiplexer 486 (FIG. 10*a*) and also connect to a multiplexer 488. Each of the multiplexers 484, 486 and 488 has twenty eight inputs from the seven DS2 to DS1 demultiplexers.

The DS2 to DS1 demultiplexer 454 demultiplexes the DS2 channel into its four constituent DS1 channels along with their associated gapped clocks.

The four main functions of the DS2 to DS1 demultiplexer section include:

DS2 Framing

DS1 Clock Generation

DS1 Data Generation

DS2 Performance Monitoring a. DS2 Framing

A DS2 Framer 480 synchronizes a DS2 State Counter 478 to the incoming DS2 channel. Frame synchronization is obtained by finding a bit position in which the 010101 . . . framing pattern is observed across nine consecutive F bits. The DS2 frame format is specified in Bellcore TR-TSY-000009. There are four subframes per DS2 frame and each subframe contains six blocks or groups of 49 bits. The first bit of each group is a control bit or overhead bit. The control bits associated with groups 3 and 6 are F bits. A serial approach which searches one bit position at a time has a maximum average reframe time (MART) of approximately 6.85 msec for the DS2 framing pattern. Maximum Average Reframe Time is the average time to reframe when the maximum number of bit positions must be examined for the framing pattern. This time must be arrived at statistically, and in the calculation it shall be assumed that the non-frame bits are ones and zeros with equal probability. The requirement for the DS2 rate is a MART of less than 7.0 msec, and consequently the serial search algorithm is used. The algorithm employed has a MART of approximately 6.85 msec.

The algorithm initially assumes that the current state of the State Counter 478 is correct and tries to find the framing pattern in the bit position currently identified by the State Counter as being the F bit location. If a single bit is found that does not correlate with the framing pattern, then the state of the State Counter is retarded by one cycle. By retarding the state counter one cycle at a time and checking the validity of the bits observed, the DS2 Framer 480 will eventually synchronize to the sub-frame.

The next step in the framing process is to acquire multiframe alignment. A shift register (not shown) is used to store the values of all of the four first column (group 1) control bits. These control bits are the M1, M2, M3, and the M4 bits. However, at this point in the framing process it is not known which bit in the shift register corresponds to which control bit. The shift register is searched for the 011 pattern of the M bits. If multiple 011 patterns are found or a 011 pattern does not exist, the framing process begins again. If a single 011 pattern is found, the State Counter is advanced or retarded the correct number of subframes to obtain M-frame alignment.

b. DS1 Clock Generation

The DS1 clock generator 482 uses the timing information from the DS2 State Counter 478 to generate four 1.544 MHz gapped clocks. The clock pulse associated with a particular data bit is deleted or gapped by several conditions dependant upon the clocks destination.

c. DS1 Data Generation

The DS1 data generator 436 uses the timing information from the DS2 State Counter 478 to generate four 1.544 MHz serial data streams. The DS1 data channels are synchronous with the associated DS1 gapped clock. The first and third DS1 channels are inverted, while no inversion is required on channels 2 and 4.

d. DS2 Performance Monitoring

The DAI circuit 250 monitors the performance of the standard DS2 channel format as specified in Bellcore TR-TSY-000009. DS2 performance monitoring parameters that are continuously monitored by the monitor 434 are as follows:

Loss of Signal Status

F Bit Error Count

Out-of-Frame Status

Change of Frame Alignment Status

Incoming Yellow Alarm Status

Incoming Alarm Indication Signal (AIS) Status

4. DS1 Monitor

Figure 10D:
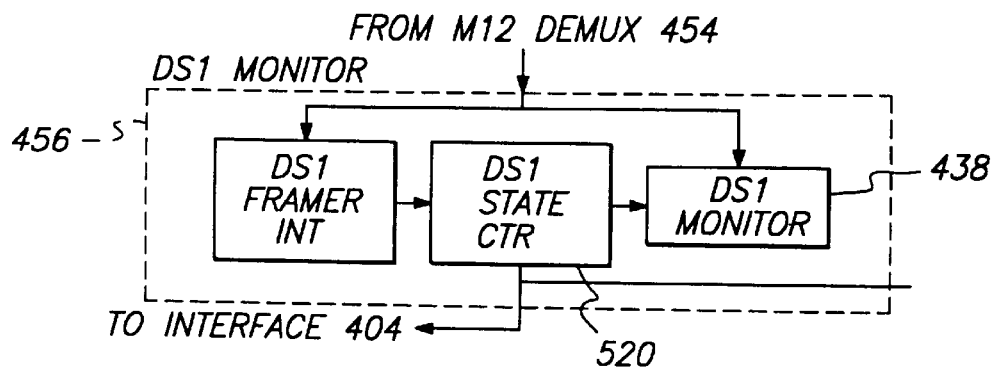

Each DS1 Monitor 456 (FIG. 10*a*) is connected to one of the four outputs of the DS1 data generator 436 (FIG. 10*c*). Since there are a total of seven DS1 data generators in the DAI 250, there are a total of twenty eight DS1 Monitors, but only the first Monitor 456 and the last (28th) Monitor 456' are shown in FIG. 10*a*. Referring to FIG. 10*d*, the following DS1 Monitor functions are described:

a. DS1 State Counter

A DS1 State Counter 520 drives a portion of the interface 404 as described in reference to FIG. 8. The DS1 State Counter 520 is synchronized through the use of the external DS1 Framer Subsystem 256 (FIG. 6).

b. DS1 Performance Monitoring

The DAI circuit 250 monitors the performance of DS1 channels in the Superframe format as specified in Bellcore TR-TSY-000009 and T1C1.2/87-001R3, the Extended Superframe format as specified in Bellcore TR-TSY-000194 and T1C1.2/87-001R3, the T1DM format as specified in Bellcore TA-TSY-000278 and the SLC-96 format as specified in Bellcore TR-TSY-000008. DS1 performance monitoring parameters that are continuously monitored by the monitor 438 are as follows:

Loss of Signal Status

F Bit Error Count

Out-of-Frame Status

Change of Frame Alignment Status

Frame Format Status

Incoming Yellow Alarm Status

Incoming Alarm Indication Signal (AIS) Status

Cyclic Redundancy Check Error Count

5. Recombiner

Figure 10E:
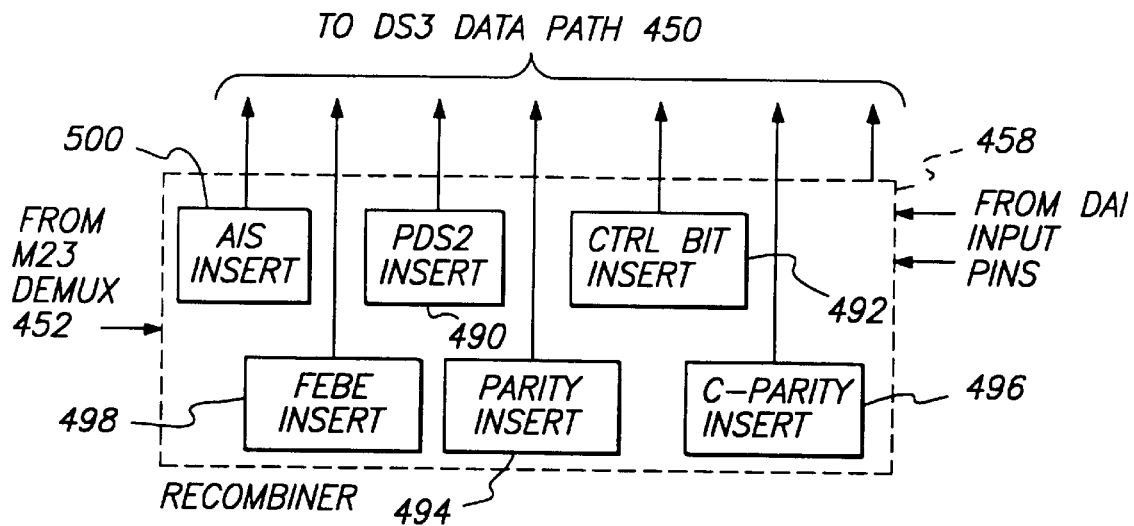
Figure 10F:
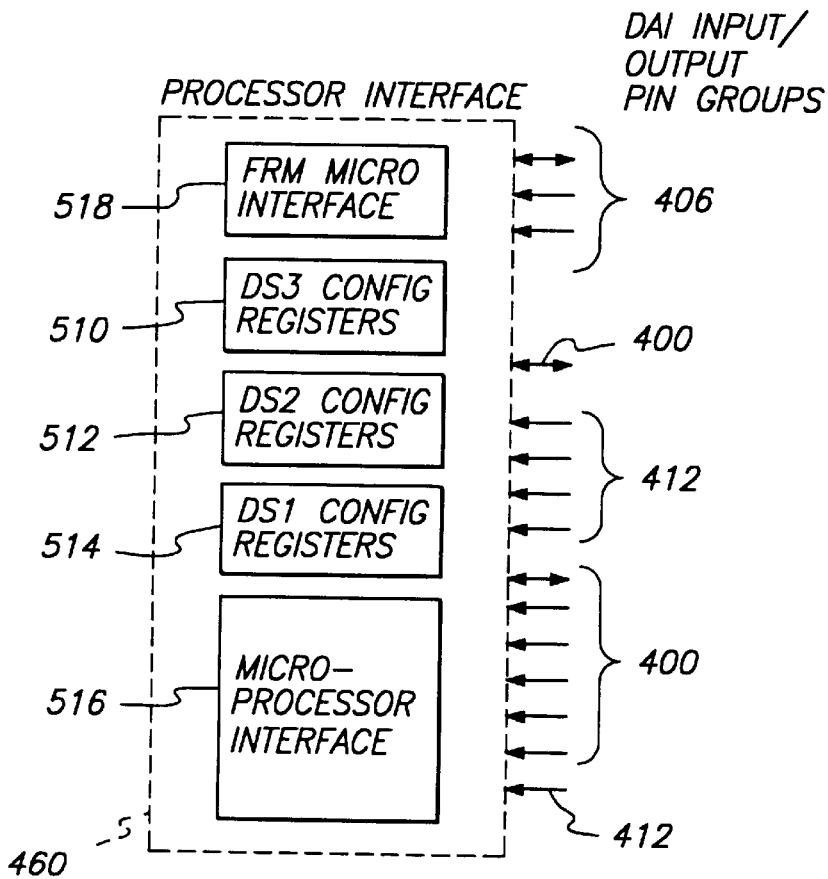

Referring now to FIG. 10*e*, the recombiner 458 provides for the insertion of data into the DS3 data stream or any constituent DS2 or DS1 channel with no blocking. Several interfaces are provided to allow for a variety of methods of overwriting data. Every type of data that can be inserted into the DS3 data stream is individually enabled via software configuration. Inputs to the recombiner 458 are from the DAI input pins of the pseudo DS2 interface 404 (FIG. 8) and from the M23 demultiplexer 452. A pseudo DS2 insert circuit 490, a control bit insert circuit 492, a line parity insert circuit 494, a C-bit parity insert circuit 496, a Far End Block Error circuit 498 and a Alarm Indication Signal insert circuit 500 all provide an output which connects to an input of the 7:1 Multiplexer 428 (FIG. 10*a*).

a. Pseudo DS2 Insert

The pseudo DS2 insertion circuit 490 provides the capability to overwrite any given DS3 information bit on an individual bit by bit basis. Applications for the use of this capability include the hitless overwrite of individual Ds1 channels, DS0 channels, subrate channels, or secondary channels. The PDS2 Insert block 490 is further discussed in conjunction with FIG. 11.

b. Control Bit Insert

The control bit insertion circuit 492 provides the capability to overwrite any of the DS3 control bits.

c. Line Parity Insert

The line parity insertion circuit 494 provides the capability to correct the line parity or to pass the received parity through.

d. C-bit Parity Insert

The C-bit parity insertion circuit 496 provides the capability to modify the C-bit parity in the event of an overwrite taking place or to pass the received parity through.

e. Far End Block Error Insert

The Far End Block Error (FEBE) Insert circuit 498 provides the capability of inserting a FEBE in one direction of the DS3 if in the alternate direction a parity error was detected.

f. Alarm Indication Signal Insert

The Alarm Indication Signal (AIS) insert circuit 500 provides the capability to insert AIS in response to certain trouble conditions detected by the DS3 performance monitoring circuitry.

6. Processor Interface

Referring now to FIG. 10*f*, the DS3 Processor Interface circuitry 460 allows for the configuration of the DAI and for the reporting of status information generated by the DAI. The interface is a general purpose design and can be used with a variety of different processor families. Two separate modes exist for the processor interface:

ASYNCMD In the asynchronous mode, a peripheral generates a data transfer acknowledge signal.

SECMD In the secure mode, the processor must write to the address associated with the next write enable register prior to every write. This feature allows for the filtering of invalid write attempts.

a. Configuration

The DAI has the capability of being configured via the DS3 processor interface. Configuration data is written to a set of specific configuration registers 510, 512 and 514. The capability exists to read the data back to verify that the correct data was written.

Resetting the DAI 250 forces the configuration of the chip into the default mode with all of the overwrite capabilities disabled.

b. Status

The status internally generated by the DAI 250 is read by the DS3 processor via a DS3 processor interface 516. When the DS3 processor 262 (FIG. 6) is reading status information generated by the DAI 250 that requires multiple words to transfer (such as certain counts), the least significant word must be read first and then immediately thereafter the most significant word must be read.

c. DS1 Framing Processor Interface

A DS1 framing processor interface 518 connects to the DS1 framing processor circuitry 256 (FIG. 6) to provide the capability to synchronize the 28 internal DS1 state counters, such as state counter 520, to the respective DS1 channels. The DS1 framing processor 256 operates autonomously by cycling through the 28 DS1 channels, and synchronizing the ones that are identified by the DAI 250 as being OOF. The DS3 Processor 262 configures the DAI 250 by downloading the frame format of all constituent DS1 channels via the processor interface 460. The DAI 250 continuously monitors the framing status of all DS1 channels. Upon detection of an OOF condition on a particular DS1 channel, a corresponding status bit is set.

Figure 11:
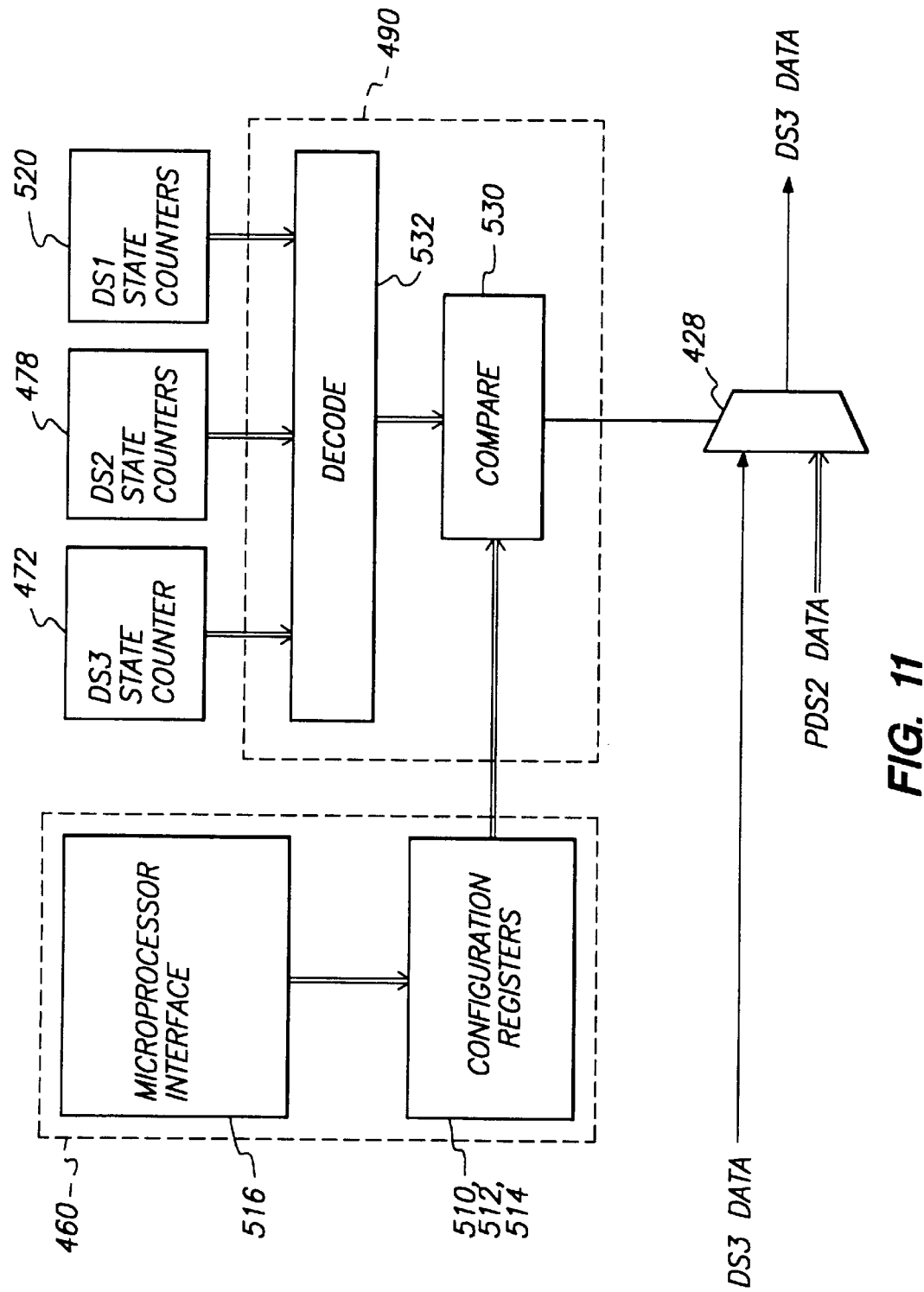
FIG. 11 is a block diagram of the pseudo DS2 insert portion of the DAI recombiner shown in FIG. 10e.

FIG. 11 illustrates how the pseudo DS2 insert circuit 490 (FIG. 10e) connects to the other circuits of the DAI circuit 250. The microprocessor in the CPU complex 262 (FIG. 6) interconnects to the microprocessor interface 516 of DAI 250 to enable the configuration registers 510, 512 and 514 to be written. The outputs of the configuration registers 510, 512 and 514 connect to a compare circuit 530. From the subcircuits 452, 454 and 456 (FIG. 10a), the State Counters 472 (FIG. 10b), 478 (FIG. 10c) and 520 (FIG. 10d), respectively, drive a decode circuit 532. The output of the decode 532 provides the second input to the compare circuit 530. An output of the compare circuit connects to the 7:1 multiplexer 428 (FIG. 10a) as a select line input. Two of the data inputs to the multiplexer 428 are the DS3 data from the output of the delay 426 (FIG. 10a), and the PDS2 data from the PDS2 interface 404 (FIG. 8). The output of the multiplexer 428 is the overwritten DS3 data, if any input other than that from the delay circuit 426 is selected.

The pseudo DS2 insertion circuitry 490 provides the capability to overwrite any given DS3 information bit on an individual bit by bit basis. Applications for the use of this capability include the hitless overwrite of individual DS1 channels, DS0 channels, subrate channels, or secondary channels.

The recombiner 458 takes advantage of the fact that the timing of the demultiplexed channels is identical to that of the multiplexed channels. This timing relationship eliminates the need to provide a complete DS1 to DS2 and DS2 to DS3 multiplexer. Each constituent DS2 and DS1 channel of the DS3 has a state counter that is synchronized with the demultiplexed data. These state counters 478 and 520 are used as pointers to indicate which DS2 and which DS1 channel a given bit in the DS3 data stream is associated with. The microprocessor in the CPU Complex 262 enables the DAI circuit 250 to overwrite a given DS1 channel for example. The values of the state counters are decoded by the decode block 532 every DS3 cycle to determine which DS1 channel the bit is associated with. When the decode of the state counters matches the value enabled via the microprocessor interface 516 by use of the compare block 530, the select line of the multiplexer 428 becomes active which enables the data from the PDS2 Interface to overwrite the particular DS3 data bit.

The DAI circuit 250 provides as outputs the seven DS2 data channels with their respective gapped clocks. In addition a three bit wide data bus is provided with each DS2 to indicate the location of the DS1 framing bits and which DS1 channel any given bit in the DS2 data stream is associated with. Given this information external circuitry can determine exactly which bits are to be overwritten for a given application. By providing seven pseudo DS2 data inputs along with seven overwrite signals as inputs to the DAI circuit 250, any information bit in the DS3 data stream can be overwritten. The overwrite signals are used to indicate which bits in the pseudo DS2 inputs are to be inserted into the DS3 data stream.

Control Bit Insert

The control bit insertion circuitry 492 (FIG. 10e) provides the capability to overwrite any of the DS3 control bits. Seventeen DS3 cycles after a control bit has been clocked out of the DAI circuit 250 via the control bit drop circuitry, the same control bit in the DS3 data stream is overwritten via an externally provided control bit. This overwrite of the DS3 control bits is enabled via software configuration.

Line parity Insert

The line parity insertion circuitry 494 (FIG. 10e) provides the capability to correct the line parity or to pass the received parity through. Three modes exist for line parity insertion:

Mode A Line parity is passed through the DAI circuit 250 regardless of whether or not the parity is correct, and regardless of whether or not an insert is taking place.

Mode B If the Line parity of the incoming signal is in error, then the line parity of the outgoing signal is in error even if an insert is taking place.

Mode C The Line parity of the outgoing signal is correct even if the incoming parity is in error, and even if an insert is taking place.

Each mode is activated via a two bit configuration word.

C-bit Parity Insert

The C-bit parity insertion circuitry 496 (FIG. 10e) provides the capability to modify the C-bit parity in the event of an overwrite taking place or to pass the received parity through. Two modes exist for path parity insertion.

Mode A C-bit Parity is passed through the DAI circuit 250 regardless of whether or not the parity is correct, and regardless of whether or not an insert is taking place.

Mode B If an insert is taking place and the incoming C-bit parity is in error, then the outgoing C-bit parity is in error. If an insert is taking place and the incoming C-bit parity is correct, then the outgoing C-bit parity is correct.

The mode is selected via a configuration bit.

Far End Block Error Insert

The Far End Block Error (FEBE) Insert circuitry 498 (FIG. 10e) provides the capability of inserting a FEBE in one direction of the DS3 if in the alternate direction a parity error was detected. A parity error is defined as either an F bit error, an M bit error or a Line parity error. Refer to Bellcore T1X1.4/89-017 for more details. A FEBE is generated by setting the three C-bits in the fourth subframe of the C-bit Parity M-frame structure to all zeros.

Due to the asynchronous relationship of the DS3 signals there could be up to a whole M-frame of latency between the time a parity error was detected and the time a FEBE is inserted in the opposite direction.

Alarm Indication Signal Insert

The Alarm Indication Signal (AIS) insert circuitry 500 (FIG. 10e) provides the capability to insert AIS in response to certain trouble conditions detected by the DS3 performance monitoring circuitry.

Declaration of a LOS or an OOF has the capability of optionally generating a DS3 Stuck Stuffing Alarm Indication Signal (AIS). The DS3 AIS shall be activated after a delay of approximately 24 to 25 M-frames which is approximately 2.55 msec to 2.66 msec. The requirement is 1.5 to 2 times the maximum average reframe time. Maximum average reframe time is the average time to reframe when the maximum number of bit positions must be examined for the framing pattern. This time is arrived at statistically, and in the calculation it shall be assumed that the "non-frame" bits are ones and zeros with equal probability. The required upper limit for the maximum average reframe time for DS3 is 1.5 msec.

After a LOS or an OOF, a DS3 good signal is declared when valid framing and line parity are found, and the average ones density is at least 33%. A ones density of less than 33% is measured by counting the number of BPVs in between occurrences of DS3 control bits. If the number of BPVs exceeds 8, then the ones density is determined to be less than 33%. DS3 good signal detection time does not exceed 1.5 times the maximum average reframe time. After a DS3 good signal has been identified, AIS is deactivated without delay.

Note that during a LOS condition, a valid DS3 clock is supplied to the DAI 250 in order to assure proper functionality. The DS3 AIS clock rate is generated externally and supplied to the DAI as an input with a clock frequency of 44.736 Mbit/s +/−20 ppm.

FIG. 12 illustrates the format of a DS3 frame, also known as a DS3 M-frame or M13 frame, consisting of 7 subframes. Each subframe has eight groups or blocks 550, wherein each block has a first OverHead (OH) bit 552 followed by 84 DS2 information bits, such as a bit 554 to represent a time slot devoted to DS2 input 1.

FIG. 13 is similar to FIG. 12 but illustrates a set of specific overhead bits for each subframe and each block, of the subframe, of the asynchronous DS3 frame format. For example, the OverHead bit of block one 550 of the first subframe is an X-bit 552'.

Figure 14:
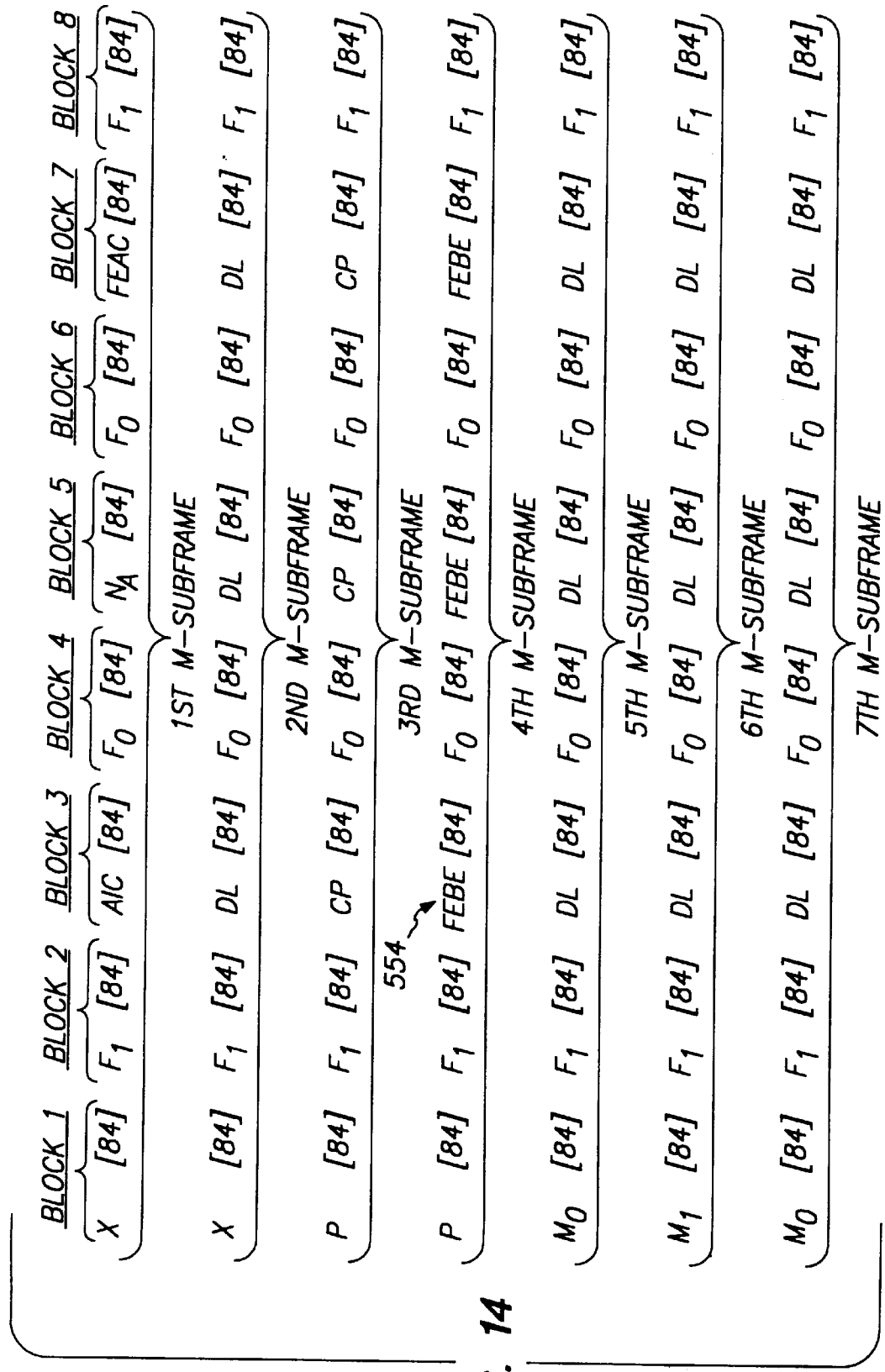
FIG. 14 is a diagram of DS3 C-bit Parity Overhead Bits for the DS3 level shown in FIG. 1.

FIG. 14 is similar to FIG. 12 but illustrates a set of specific overhead bits for each subframe and each block, of the subframe, of the C-bit Parity DS3 frame format. For example, the OverHead bit of block three of the fourth subframe is a FEBE 554.

Figures 15A, 15B:
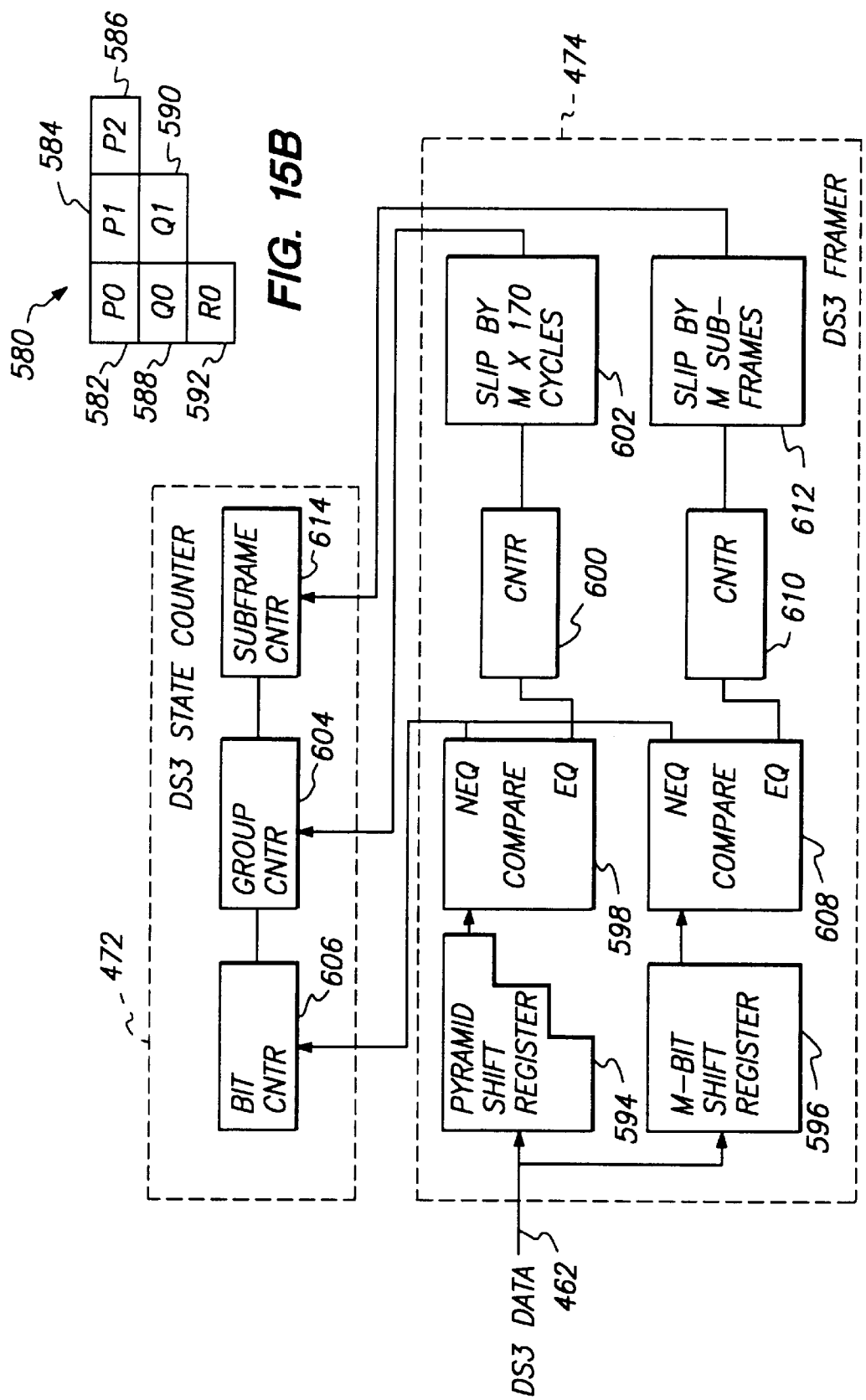

FIG. 15a is a block diagram of the DS3 Framer 474 and the DS3 State Counter 472, both of which are a part of the M23 Demultiplexer 452 shown in FIG. 10b. The DS3 data 462 connects to a Pyramid shift register 594 and to a M-bit shift register 596 in the DS3 Framer 474. The output of the Pyramid shift register 594 connects to a compare circuit 598. The Equal output of the compare 598 connects to a counter 600 which connects to a Slip by Mx170 Cycles block 602 driving a Group counter 604 in the DS3 State Counter 472. The output of the M-bit shift register 596 connects to a compare circuit 608. The Equal output of the compare 608 connects to a counter 610 which connects to a Slip by M Subframes block 612 to drive a Subframe counter 614 in the DS3 State Counter 472. The NotEqual output of the compare 598 and the compare 608 both interconnect a Bit counter 606 in the DS3 State Counter 472.

The DS3 Framer 474 synchronizes the DS3 State Counter 472 to the incoming DS3 signal 462. The DS3 State Counter 472 provides the pointer that indicates which bit of the DS3 M-frame the incoming DS3 data bit is associated with. The synchronization process performed by the DS3 Framer 474 aligns the State Counter 472 with the DS3 M-frame structure of the data stream. Refer to FIG. 13 for the Asynchronous DS3 frame format and FIG. 14 for the C-bit Parity DS3 frame format. There are seven subframes per DS3 frame and each subframe contains eight blocks or groups of 85 bits. The first bit of each group is a control bit or overhead bit. The control bits associated with groups 2 and 8 are F1 bits, and those associated with groups 4 and 6 are F0 bits. Since F1 bits are equal to 1 and F0 bits are equal to 0, the framing pattern 1001 . . . can be found by observing every 170th bit position. Synchronization to this bit pattern constitutes subframe alignment, which is the first step in total synchronization to the DS3 stream.

The standard approach to subframe synchronization is a serial approach. The serial approach to framing observes one bit position until that position is determined to be valid or invalid. Upon determination that the bit position is invalid, the state counter is held constant for one clock cycle which effectively retards the state counter by one cycle or bit position. The new bit position which is adjacent to the previous position is observed for the framing pattern until it is determined to be valid or invalid. This cycle continues until the bit position is found to be valid. This serial approach which searches one bit position at a time has a maximum average reframe time (MART) of approximately 1.9 msec for the DS3 framing pattern. Maximum Average Reframe Time is the average time to reframe when the maximum number of bit positions are examined for the framing pattern. This time is arrived at statistically, and in the calculation it is assumed that the non-frame bits are ones and zeros with equal probability. The requirement for the DS3 rate is a MART of less than 1.5 msec, and consequently, the serial approach implemented does not meet the required MART.

The enhanced approach to subframe synchronization that is implemented in the preferred embodiment is a serial look-ahead approach. Instead of observing a single bit position every 170 bits, N adjacent bits are stored for future use if needed, while the current position is evaluated as before. By storing the value of the adjacent bit positions prior to the time that they are needed, the Framer 474 is essentially looking ahead which reduces the MART. After every 170 bits, a decision is made as to the validity of the current bit position. In the serial approach, when the current bit position is found to be invalid, another decision can't be made for at least 3×170 bits (since 00, 01, 10, and 11 are all valid patterns in the framing pattern 1001 . . . ); however, in the serial look-ahead approach, another decision can possibly be made in 170 bits since two previous values of the new bit position were previously stored. Increasing the number of adjacent bits, N, that are stored for future use decreases the MART but increases the gate count of the framing circuitry. N is selected in order to optimize the circuit for either speed or size. A value of N=3 was implemented in the preferred embodiment and is used for the following illustration. This value provides a MART that meets the specification of 1.5 msec.

A pyramid 580 shown in FIG. 15b illustrates a form of shift register that shifts up or down based upon different criteria, and is the mechanism used to store values of the current bit position as well as bit positions adjacent to the current framing position. Each square in the pyramid represents a storage element. At any given time the Pyramid shift register 594, corresponding to the pyramid 580, contains the value of three consecutive framing bits associated with the current alignment of the State Counter 472 to the DS3 data stream. When the State Counter 472 reaches a new framing bit position, i.e., 170 cycles since the last framing bit position, P1 584 is shifted into P2 586, P0 582 is shifted into P1 584 and the new framing bit is shifted into P0 582. The previous framing bit position −1 which is Q0 588 is shifted into Q1 590 and the current framing bit position −1 is shifted into Q0 588. The current framing bit position −2 is shifted into R0 592. At this time P0 582 is compared to P2 586. If they are different, the current position could still be a valid framing bit position (since the framing pattern is 10011001 . . . ). After another 170 cycles, the above procedure is repeated until seven consecutive comparisons of P0 582 to P2 586 were found to be different, at which time the state of the State Counter 472 is advanced or retarded some multiple of 170 in order to align the State Counter to the groups. At this time subframe synchronization is declared and the first step to total synchronization is complete.

If however, the comparison indicates that the P0 and P2 bits are of the same value, the current bit position is declared as an invalid framing position and the adjacent bit position is selected as the new framing position. The State Counter 472 relationship to the DS3 data stream is modified by retarding the State Counter by one cycle. Q0 used to contain the value of the current framing bit position −1, but due to the adjustment made to the State Counter 472, Q0 actually contains the value of the current framing bit position. Q0 is shifted into P0, Q1 is shifted into P1, and R0 is shifted into Q0. When the State Counter 472 reaches a new framing bit position, i.e. 170 cycles since the last framing bit position, P1 is shifted into P2, P0 is shifted into P1 and the new framing bit is shifted into P0. The previous framing bit position −1 which is Q0 is shifted into Q1 and the current framing bit position −1 is shifted into Q0. The current framing bit position −2 is shifted into R0. At this time P0 is compared to P2. If they are different, the current position could still be a valid framing bit position. After another 170 cycles the above procedure is repeated until seven consecutive comparisons of P0 to P2 were found to be different, at which time the state of the State Counter 472 is advanced or retarded some multiple of 170 in order to align the State Counter to the groups. At this time subframe synchronization is declared and the first step to total synchronization is complete.

The second step of the synchronization process is to find multiframe alignment. The control bits associated with group 1 of subframe 5 and 7 are M0 bits, and the control bit associated with group 1 of subframe 6 is an M1 bit. Since the M1 bit is equal to 1 and the M0 bits are equal to 0, the framing pattern 010 can be found by observing the first control bits of each subframe. Synchronization to this bit pattern constitutes multiframe alignment, which is the second and last step in total synchronization to the DS3 stream. Multiframe alignment is performed by shifting the control bit associated with group 1 of each subframe into a M-bit shift register 596. Since there are seven subframes, the shift register 596 is seven bits long. If the multiframe framing pattern 010 associated with the M bits is found to be valid in two consecutive multiframes, the state of the State Counter 472 is advanced or retarded some multiple of 680 in order to align the State Counter to the subframes. At this time the State Counter 472 is declared as being in frame and the last step to total synchronization is complete. If an F bit error is detected or the M bit alignment pattern is found to be invalid during the multiframe alignment process, the Framer 474 retards the state of the State Counter 472 and the subframe synchronization process starts over again.

III. THE ASYNCHRONOUS TIME SLOT INTERCHANGE (TSI) CIRCUIT

Figure 16:
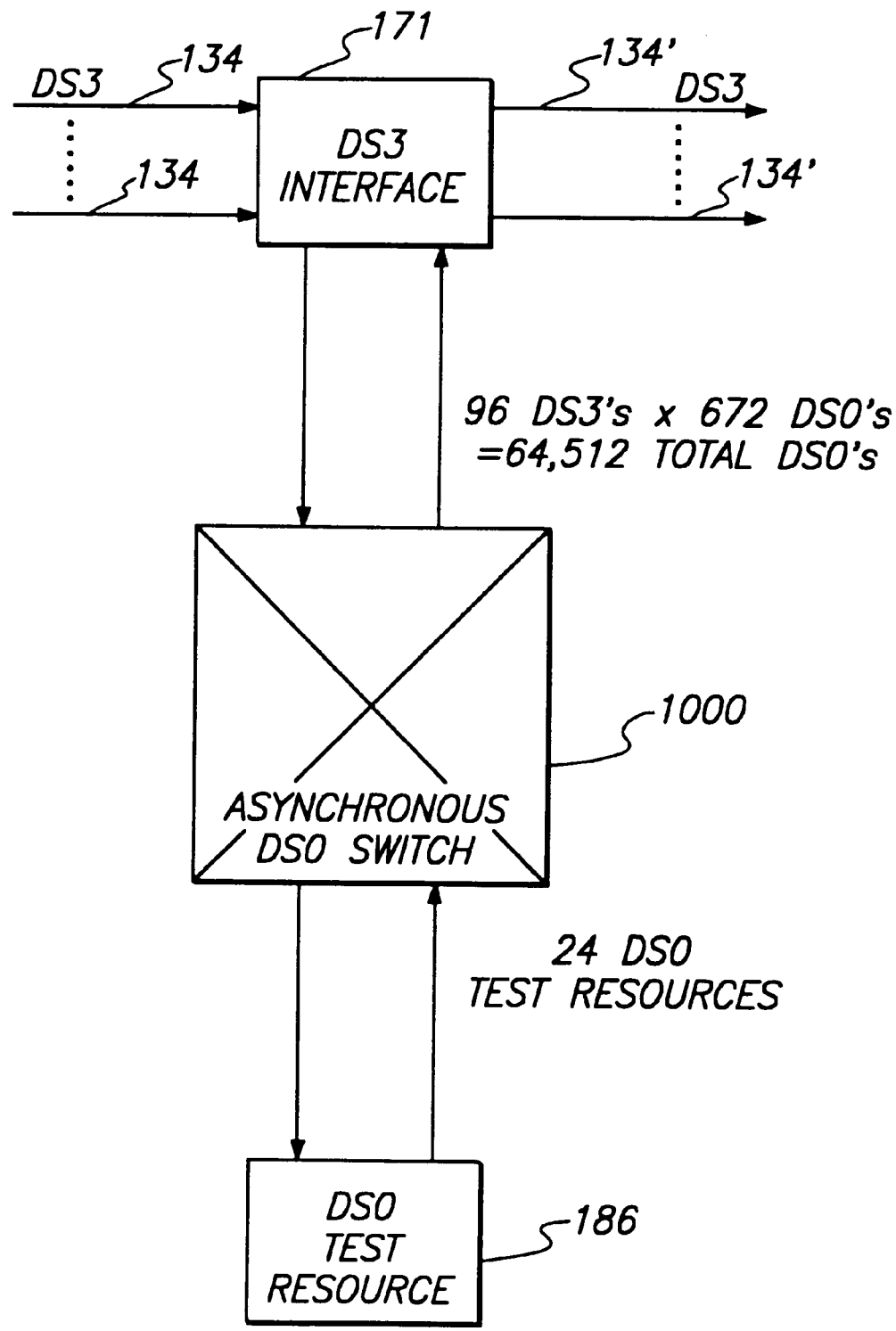
FIG. 16 is a functional block diagram of a portion of the access system shown in FIG. 4.

FIG. 16 illustrates a functional block diagram of an asynchronous DS0 switch 1000 for switching DS0 channels embedded in DS3 signals fed across lines 134, into DS0 test resources 186, and out across lines 134'. In its maximum configuration the presently preferred access system 170 has access to as many as 64,512 DS0's via its 96 DS3 interface modules 171 (96×672=64,512). In addition, there are up to 24 DS0 test resources 186 in the access system 170 that are used for testing the accessed DS0 channels. In order to allow for access to the shared test resources 186, the switching function 1000 is required. The switch architecture must be capable of establishing bi-directional connections between any of the 64,512 accessed DS0 channels and any of the 24 DS0 test resources Conventional switch architectures, such as the Time Slot Interchange implemented by AT&T, require that all accessed DS0 channels be synchronous to a common reference (e.g. Stratum 1 clock). If any of the DS0 channels are not synchronous to the reference, then slips, i.e., a bit is lost, can occur and the DS0 signal is distorted resulting in, for instance, an audible click or a lost data packet. Hence, a functional asynchronous switch 1000 is included in the access system 170 to accommodate asynchronous DS0 channels without introducing distortion.

Figure 17:
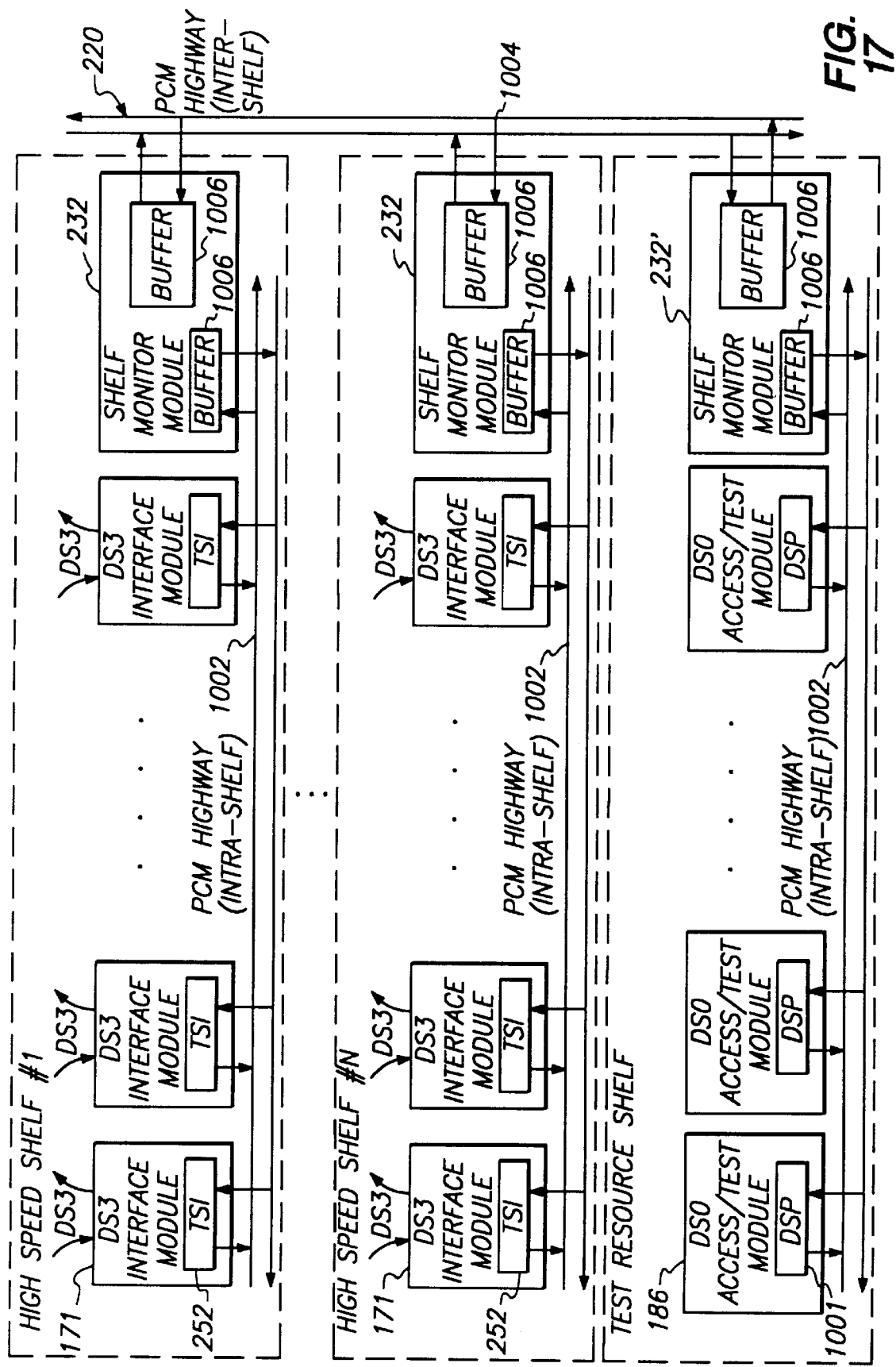
FIG. 17 is a block diagram of the Pulse Code Modulation (PCM) Highway shown in FIG. 5.

Referring now to FIG. 17, the core of the asynchronous switching function 1000 is located in the asynchronous Time Slot Interchange (TSI) circuit 252. The TSI 252 can access all 672 DS0 channels within a given DS3 signal and provides switching capability for up to 24 of the 672 DS0 channels with no restrictions on which DS1 or DS2 channel embeds a DS0 channel. All TSIs 252 in the access system 170 are connected together, along with a digital signal processor (DSP) 1001 in each DS0 test resource 186, over what is referred to as the PCM Highway or PCM bus 220. The TSI 252 provides the switching function and the PCM Highway 220 provides the routing facility for handling up to 128 DS0 channels within the access system 170.

The PCM Highway 220 provides the mechanism for routing DS0 channels throughout the access system 170. The PCM Highway 220 has an intra-shelf portion 1002 and an inter-shelf portion 1004. They are connected together through a set of buffers 1006 on the shelf monitor module 232, 232'. With 128 time slots the PCM Highway 220 supports transmission of up to 128 bi-directional asynchronous DS0 channels. The PCM Highway 220 is arranged in a master/slave fashion, where masters, such as the TSI 252, transmit onto four transmit lines (not shown) each supporting 32 times slots, and receive from four receive lines (not shown) each supporting 32 time slots.

Figure 18:
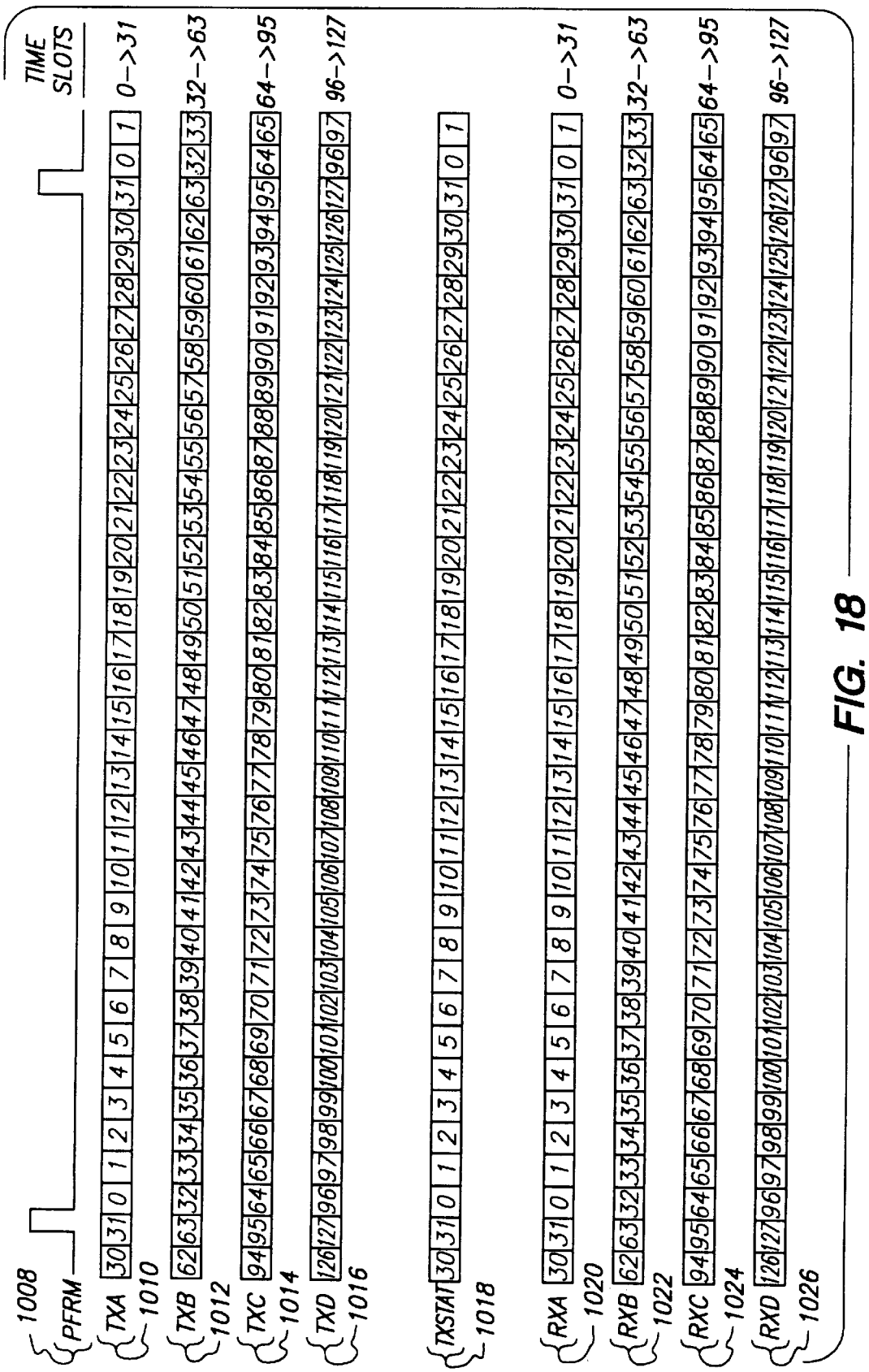
FIG. 18 is a timing/bit format diagram of a set of PCM Highway time slots.

FIG. 18 is a timing/bit position diagram illustrating the relationship among the time slots of the PCM Highway 220. The PCM frame sync signal (PFRM) 1008 aligns the 128 slots to a single frame. FIG. 18 also shows the 32 transmit time slots for each of four signals TXA 1010, TXB 1012, TXC 1014 and TXD 1016, a TXSTAT signal 1018, and the 32 receive time slots for each of four signals RXA 1020, RXB 1022, RXC 1024 and RXD 1026. Each time slot represents the 8 bits of a DS0 which are transmitted serially. To handle asynchronous DS0 channels, the PCM Highway 220 runs at a rate (preferably 11.16 kHz) which is higher than the rate of any incoming DS0 channel (approximately 8 kHz). Since the PCM Highway 220 is running at a rate higher than the data that is being transported, a "stuffing" method has been implemented to allow for cases where there is no valid data to transmit even though the selected time slot is available on the bus 220. The stuffing technique is accomplished by using a transmit status line (indicated by the TXSTAT signal 1018) that is used to indicate whether or not the associated time slot contains valid data or stuff data in the current frame.

Arbitration of the PCM Highway 220 is controlled by software via proper allocation of time slots among the various master or slave devices throughout the access system 170. A single clock and frame sync signal are fed to all devices to synchronize the PCM Highway 220.

The TSI 252 drives the transmit status line (TXSTAT signal 1018) based on an internal scanning method that is described below. PCM Highway slave devices, such as the DSP 1001 in the DS0 test resource 186 (FIG. 17), receive from the lines that the TSI 252 transmits onto, and transmit onto the lines that the TSI 252 receives from. In addition, the DSP 1001 in the DS0 test resource 186 monitors the transmit status signal 1018 in order to extract DS0 timing.

Figure 19:
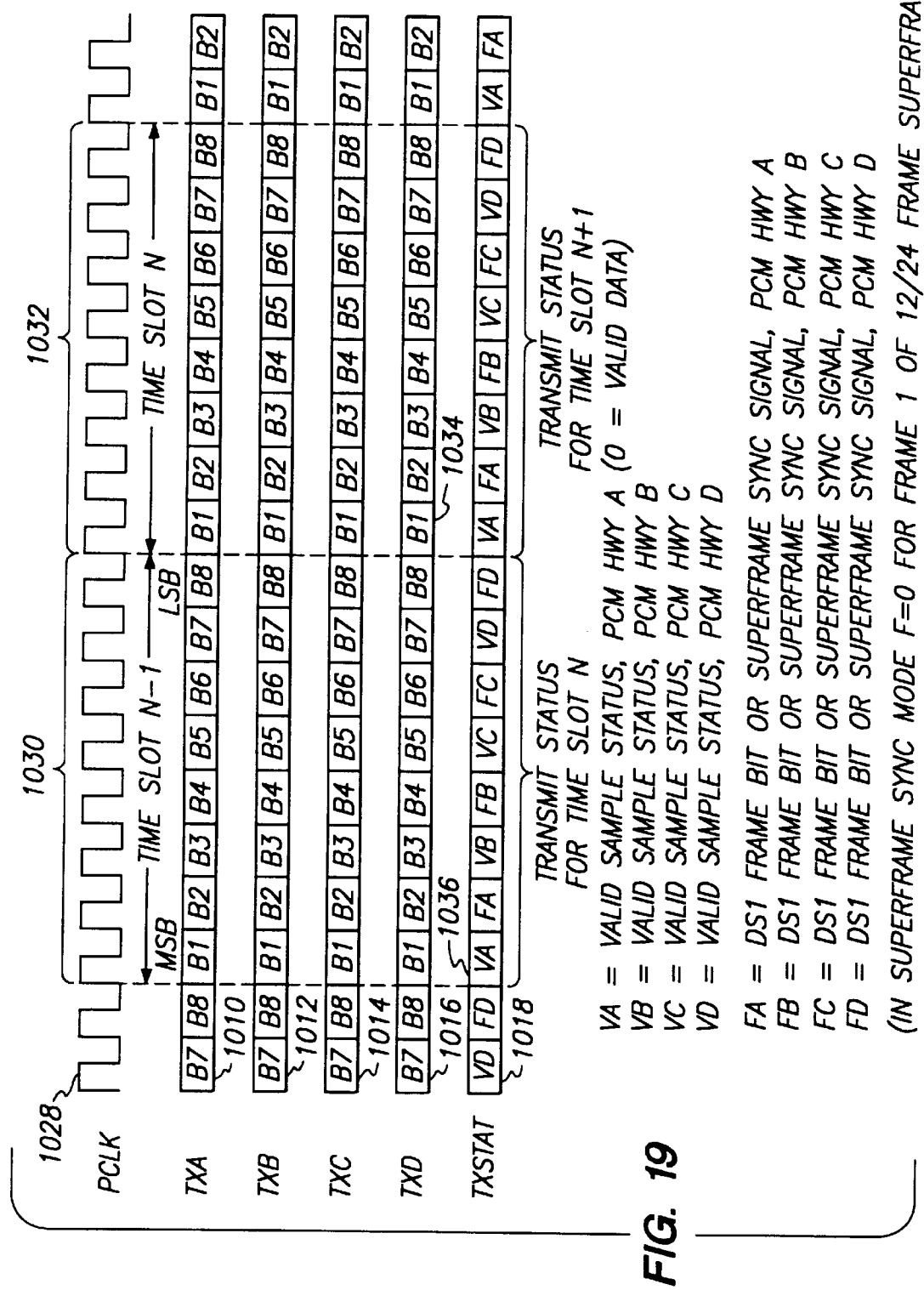
FIG. 19 is a timing/bit format diagram of the PCM Highway transmit status timing providing details of two time slots shown in FIG. 18.

The details of a specific time slot, including the shared PCM clock signal (PCLK), showing how the DS0 bits are mapped along with the transmit status signal 1018 are shown in FIG. 19. Note that the TXSTAT signal 1018 provides bit valid and frame codes in a time slot N–1 1030 prior to the time slot N 1032 containing the marked data bits. To stuff a byte such as the byte in time slot N 1032, the VA bit 1036 of TXSTAT 1018 in time slot N–1 1030 is set to "1", to indicate that the byte is not valid.

Figure 20:
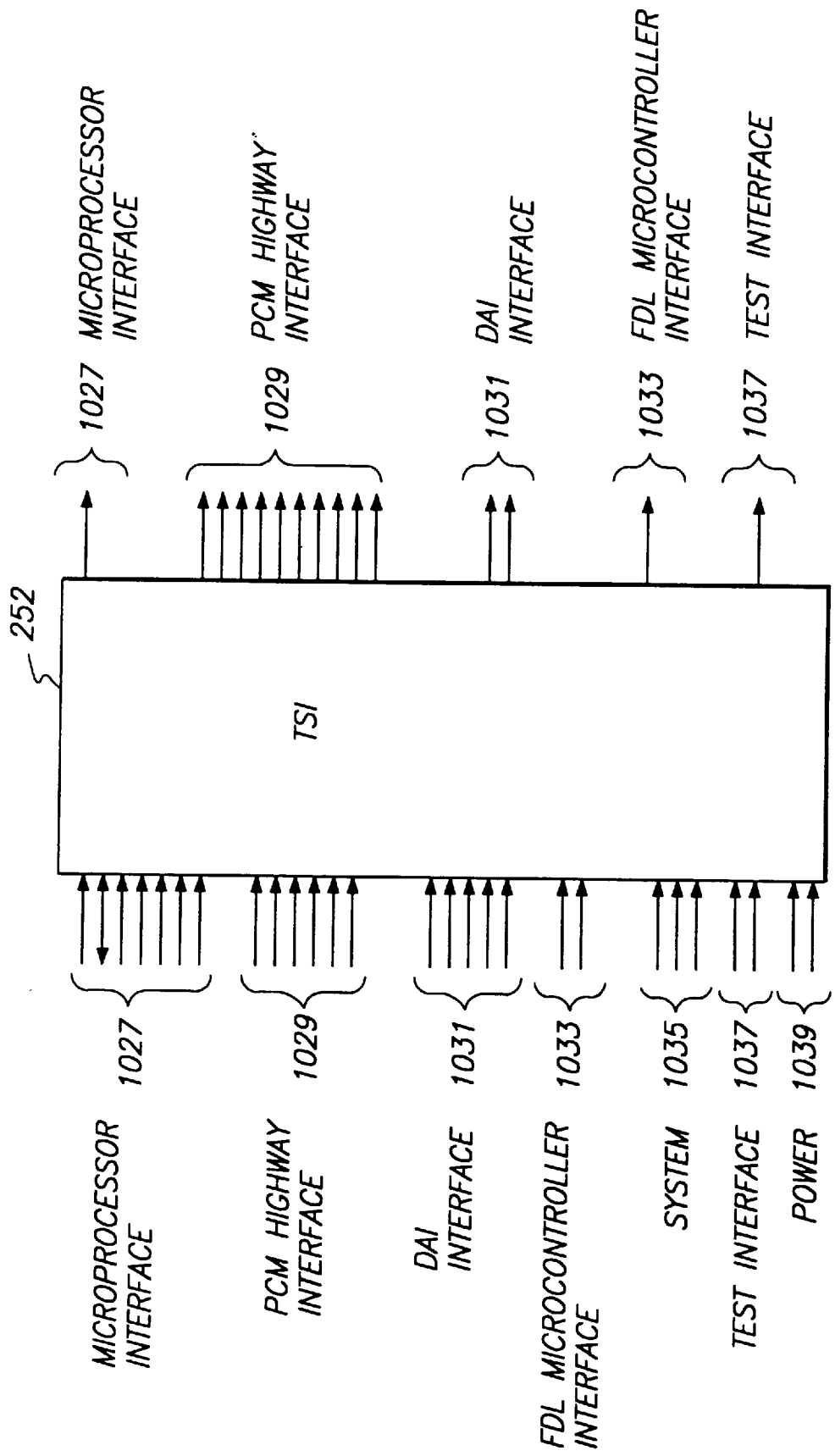
FIG. 20 is an input/output (I/O) diagram of the asynchronous Time Slot Interchange (TSI) circuit shown in FIG. 6.

The interfaces to the TSI 252 are shown in the I/O diagram of FIG. 20. The TSI 252 provides the DS0 switching function in the presently preferred access system 170, interfacing to 672 DS0 channels on the DS3 side and 128 time slots on the PCM Highway 220 so as to provide a time slot interchange function between the DS3 signal and the PCM Highway 220. The TSI contains additional functions beyond DS0 switching including relative frequency counter, DS0 subrate handler, CRC generation, Facilities Data Link (FDL) handler, support for secondary channel, and support for DS1 superframe alignment.

Microprocessor Interface

A microprocessor interface 1027 is used for passing control and status information between the TSI 252 and the microprocessor in the CPU complex 256 (FIG. 6). The microprocessor interface 1027 includes an 8 bit address bus, an 8 bit bi-directional data bus, a chip select, a read/write control signal, and an address latch enable signal. The TSI 252 asserts a data transfer acknowledge signal to notify the microprocessor that the read/write cycle can be completed. In addition, there are two mode control pins to allow for "secure" write operations and to allow for interfacing to a wide variety of standard microprocessors.

PCM Highway Interface

A PCM Highway interface 1029 is used to connect the TSI 252 to the PCM Highway 220 (FIG. 17). There are four lines for received data and four lines for transmit data; each pair of Tx/Rx signals connects to one of the four 32 time slot PCM Highway lines 220. The transmit status line indicates when valid data is being output. Each transmit line has an associated transmit enable signal that indicates when the PCM Highway 220 is being driven. In addition, clock and frame sync signals are sent to the TSI 252 to synchronize all TSIs 252 and DS0 test resources 186 (FIG. 17) on the PCM Highway 220.

DAI Circuit Interface

A Pseudo DS2 (PDS2) Bus interface 1031 is used to interface the TSI 252 to the DAI 250 (FIG. 6). The DAI 250 sends seven DS2 data streams to the TSI 252 along with the associated clocks and DS1 sync status to allow for identification of bits at the DS1 level. The TSI 252 passes DS2 data along with overwrite control back to the DAI 250. The overwrite control is used by the DAI 250 to determine which bits in the DS3 should be overwritten.

FDL Microcontroller Interface

A Facilities Data Link (FDL) interface 1033 is used to connect the TSI 252 to an external microcontroller 256 (FIG. 6) for processing the FDL data. The microcontroller 256 drives the strobe and clock lines, while the TSI 252 shifts out FDL data bits from each of 28 ESF formatted DS1's.

System Interface

A System interface 1035 includes miscellaneous TSI 252 signals including a reference clock for DS1 frequency counter measurements, a reset signal for TSI initialization, and a clock for overall TSI operation.

Test Interface

A Test interface 1037 provides controllability and observability for fault coverage. In addition, a control signal is available that can be used to disable all TSI outputs to facilitate board level testing.

Power

A Power interface 1039 includes pins that are used for power and ground.

Figure 21A:
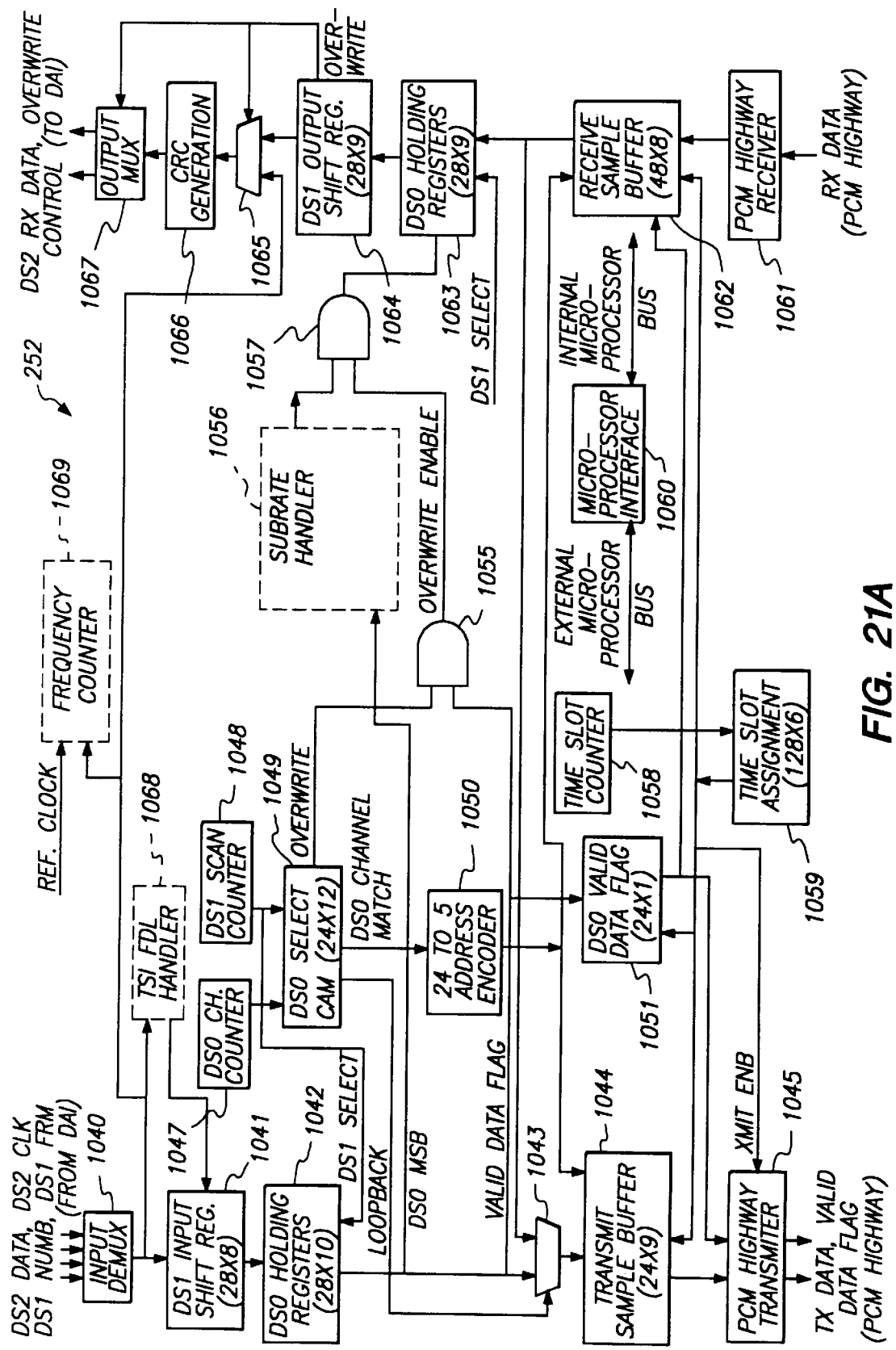
FIG. 21a is a top level block diagram of the asynchronous TSI circuit shown in FIG. 20.

FIG. 21a is a block diagram of the asynchronous TSI circuit 252. In the transmit direction the TSI 252 receives DS0 data from the DAI circuit 250 over the Pseudo-DS2 (PDS2) interface, at an input demux 1040, and sends DS0 data out onto the PCM Highway 220 (FIG. 17), at a PCM Highway transmitter 1045. In the transmit direction, the overall function of the TSI 252 is to load the incoming DS0 data into the transmit sample buffer 1044 whenever it arrives, extract the DS0 data out of the transmit sample buffer 1044, and place it onto the PCM Highway 220 at a previously assigned time slot.

Figure 22:
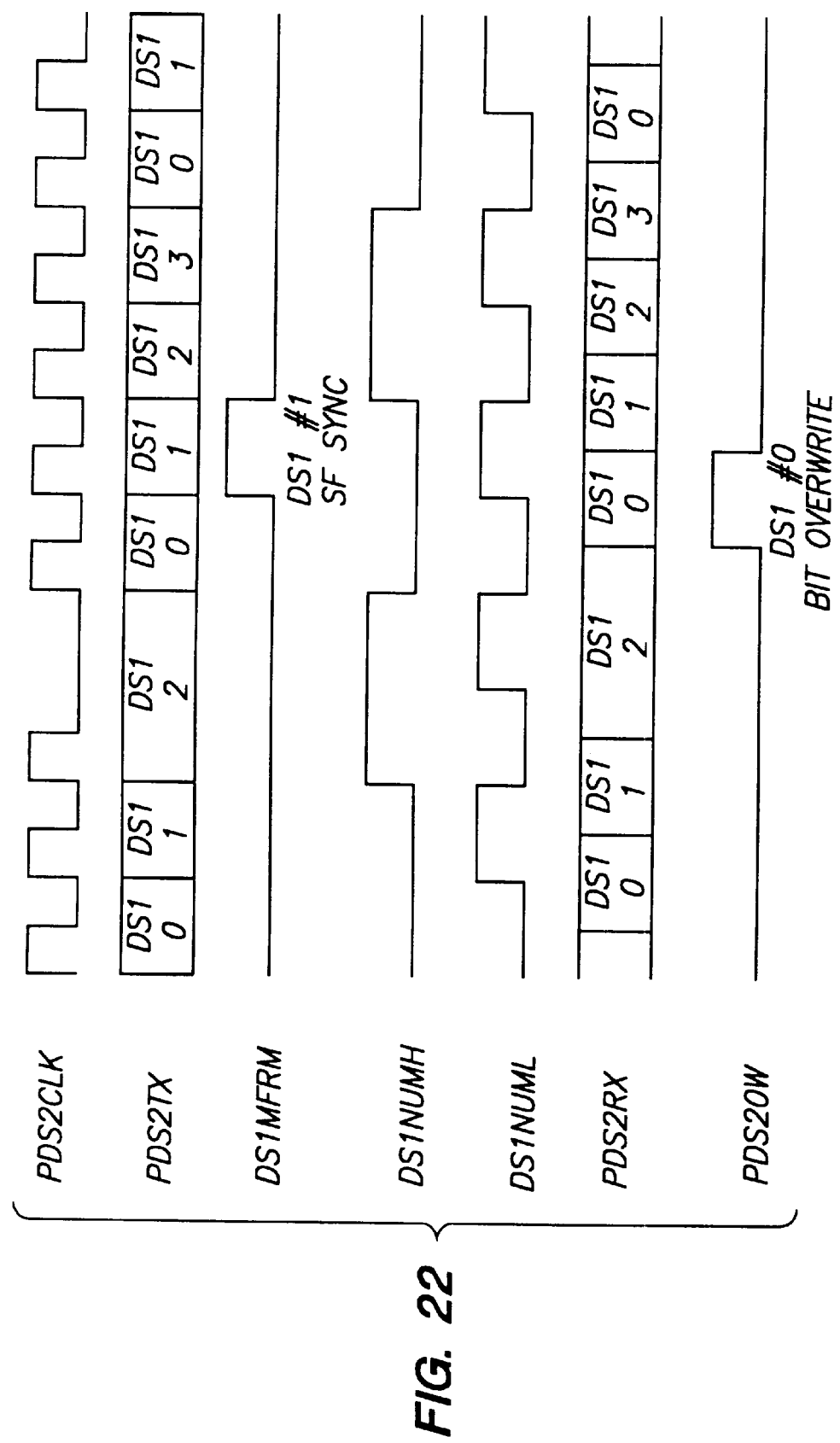
FIG. 22 is a timing diagram of the interface between the TSI and DAI.

DS2 data from the DAI 250 (FIG. 6) enters into the TSI 252 through the input demux 1040. FIG. 22 is a timing diagram showing details of the TSI/DAI PDS2 interface. In FIG. 21a, the input demux extracts the 28 DS1 data streams from the seven DS2 data and clock lines, which are part of interface 1031 (FIG. 20). Two DS1 NUM signals (interface 1031, FIG. 20) form a two bit binary number that specifies which of the four DS1's currently has active data on the DS2 line. The TSI 252 uses these signals to demultiplex the active DS2 into individual DS1 lines and feeds each of the incoming DS1 signals (28) serially into a DS1 input shift register 1041.

Once the 8 bits of a DS0 channel byte have been shifted in for a given DS1, the DS0 byte is loaded into a DS0 holding register 1042. There are 28 holding registers 1042, one for each DS1 channel. The holding registers 1042 are 10 bits wide: 8 bits for the DS0 byte, 1 bit for the multi-frame sync status associated with the "parent" DS1 channel, and 1 bit that is used as a valid data flag to indicate that a new DS0 byte has come in and has not yet been processed.

The TSI 252 has 24 internal "channel slots" available for processing DS0 channels. The channel slots provide the intermediary mechanism for establishing a connection between an incoming DS0 channel and a time slot on the PCM Highway 220. The external microprocessor (uP) interface 1060 is shown in FIG. 21a, controls how the 24 channel slots are allocated. The uP sets up a switched connection by making two assignments to a given channel slot. The first assignment ties a channel slot to a PCM Highway time slot; the second assignment ties a channel slot to a specific DS0 channel within a specific DS1 channel of a DS3 signal.

The PCM Highway time slot assignment is made by a uP "write" to the time slot assignment dual port memory (128×8) 1059. The DS0 assignment is made by two uP writes to the DS0 select content addressable memory (CAM) 1049; one write for the DS1 number (1-28) and one write for the DS0 number (1-24). Once the proper assignments have been made to the DS0 select CAM 1049 and the time slot assignment memory 1059, no further uP action is required; the DS0 channels are continually processed and the connection is maintained until the configuration is changed by the uP.

After the DS0 bytes are loaded into the holding registers 1042, they are scanned to determine whether they should be transferred to the transmit sample buffer 1044. The TSI 252 contains a 5 bit DS1 scan counter 1048 that is used to scan each of the 28 holding registers 1042 in sequence. Associated with each of the holding registers 1042 is a DS0 channel counter 1047 that stores the DS0 number of the DS0 channel that is currently in the holding register 1042. If there is a match between the DS1 scan counter 1048/DS0 scan counter 1047 and the contents of the DS0 select CAM 1049, one of the CAM's 24 DS0 channel slot "match" signals activates. The match signal is encoded into a 5 bit transmit sample buffer address at the address encoder 1050. While the match is active, the DS0 byte is transferred from the holding register 1042 into the transmit sample buffer 1044. If the DS0 byte in the addressed holding register 1042 had already been processed, the valid data flag, provided through the multiplexer 1043, would indicate "null" data and the transfer from the holding register 1042 to the transmit sample buffer 1044 does not take place.

On the PCM Highway side, the time slot counter 1058 keeps track of which time slot is currently active on the PCM Highway 220. The contents of the time slot counter 1058 are used as an address into the time slot assignment (TSA) memory 1059 which contains a location for each of the 128 time slots. If a channel slot has been assigned to a time slot, the TSA memory 1059 will output the channel slot number when that time slot comes up. The channel slot number is then used as an address into the PCM Highway side of the transmit sample buffer 1044 for retrieval of the selected DS0 byte. If the associated valid data flag in the transmit sample buffer 1044 indicates valid data, the DS0 byte is serially sent out onto the PCM Highway 220 through the PCM Highway transmitter registers 1045. The valid data flag itself is also sent out onto the PCM Highway 220 via a transmit status line (interface 1029, FIG. 20).

Still referring to FIG. 21*a*, the DS0 data flow in the receive direction is driven by the timing derived in the transmit direction. This is due to the in-line drop and insert architecture of the access system 170. A specific TSI 252 handles transmit and receive data both of which are associated with the same DS3 signal. This architecture dictates that the receive side timing be identical to the transmit side timing since the insert takes place into the same DS3 signal that the drop was derived from. It is not possible to insert a DS0 byte with different timing since there is no way to modify the associated DS1 timing when only the DS0 bits are being inserted into the DS3 with all other DS3 bits passing through transparently.

In the receive direction, the TSI 252 receives DS0 data from the PCM Highway 220 (FIG. 17) and sends DS0 data out to the DAI 250 (FIG. 6) over the PDS2 interface. The overall function of the TSI 252 in the receive direction is to load the incoming DS0 byte into the receive sample buffer 1062 during its assigned time slot, extract the DS0 byte from the receive sample buffer 1062, and send it to the DAI 250 at the same time that the associated transmit DS0 byte is being loaded into the TSI 252. In addition, the TSI 252 generates an overwrite signal (interface 1031, FIG. 20) if so configured by the external microprocessor (not shown). The overwrite signal is used to signal the DAI 250 that the associated data bit on the PDS2 line should be overwritten into the DS3 signal.

Data flow on the receive side starts with a serial-to-parallel conversion of the data coming from the PCM Highway and going into the PCM Highway receiver registers 1061. The data is taken off the PCM Highway at the same time that data is placed onto the PCM Highway on the transmit side. From the PCM Highway receiver registers the data is loaded into the receive sample buffer 1062 at the location specified by the TSA memory 1059 when addressed by the time slot counter 1058.

The DS0 data then gets loaded into the receive side DS0 holding registers 1063. From the holding registers 1063 the DS0 bytes are fed into the DS1 output shift registers 1064 where they are passed through the output multiplexer 1067 and sent on to the DAI 250 over a set of PDS2 receive data lines (interface 1031, FIG. 20).

Figure 21B:
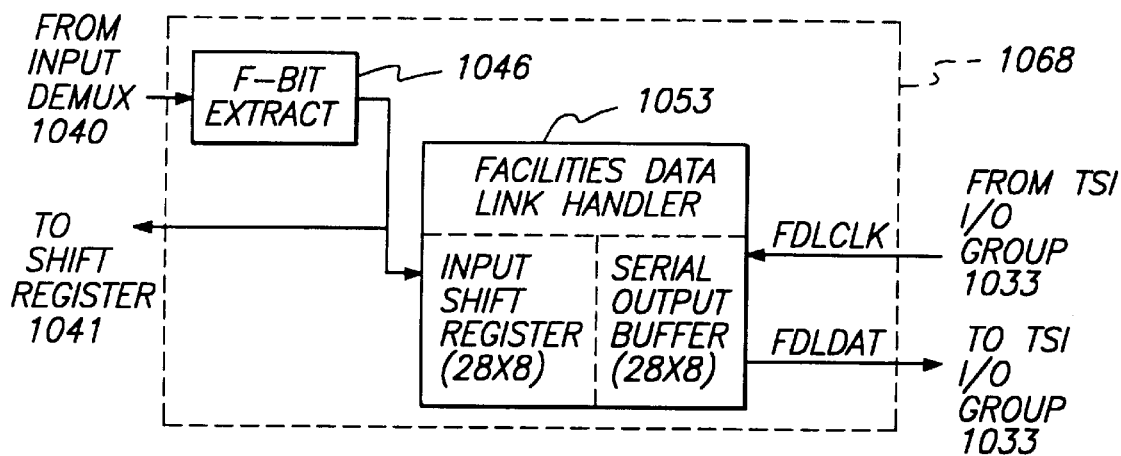
Figure 21C:
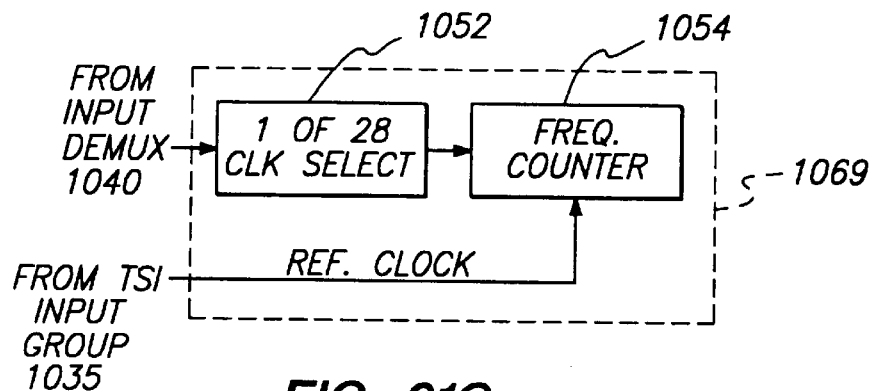
Figure 21D:
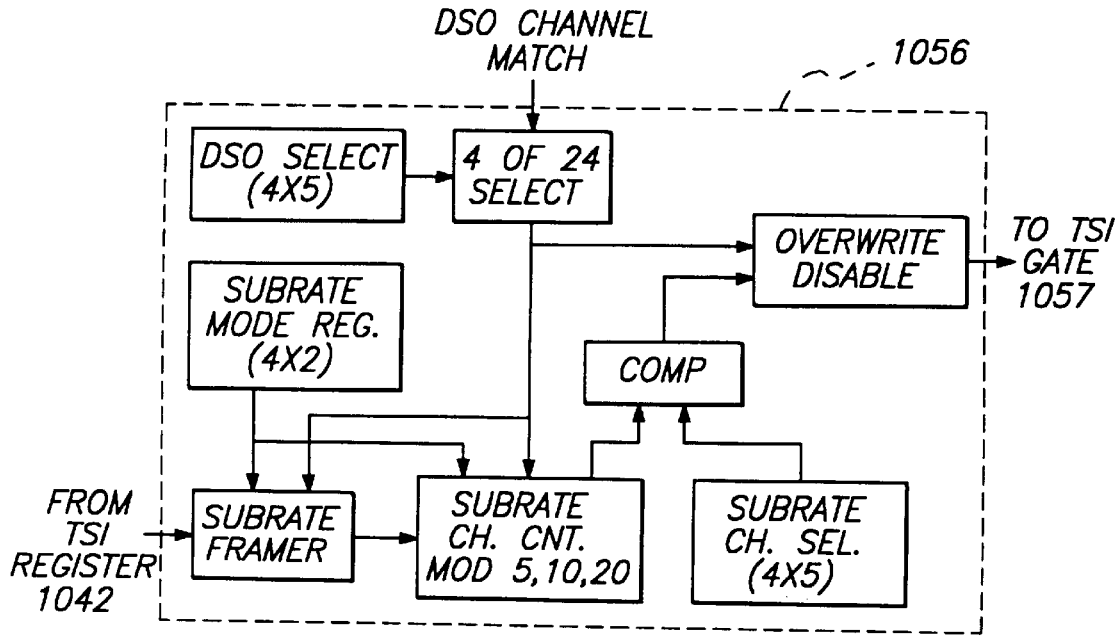

The TSI 252 also includes three additional subcircuits: a TSI FDL handler 1068 (FIG. 21*b*), a frequency counter 1069 (FIG. 21*c*), and a subrate handler 1056 (FIG. 21*d*). The TSI FDL handler 1068 obtains its input from the output of the TSI demultiplexer 1040 and a clock signal from the external FDL microcontroller 254. Data is output to microcontroller 254 and to TSI shift register 1041. The frequency counter subcircuit 1069 obtains its input from the output of the TSI demultiplexer 1040 and from the TSI system interface 1035 reference clock. The subrate handler 1056 obtains its input from TSI DS0 holding register 1042 and the DS0 channel match signal. The output of subrate handler 1056 drives one of the inputs to AND gate 1057.

DS1 Facilities Data Link (FDL) Handler

Figure 23:
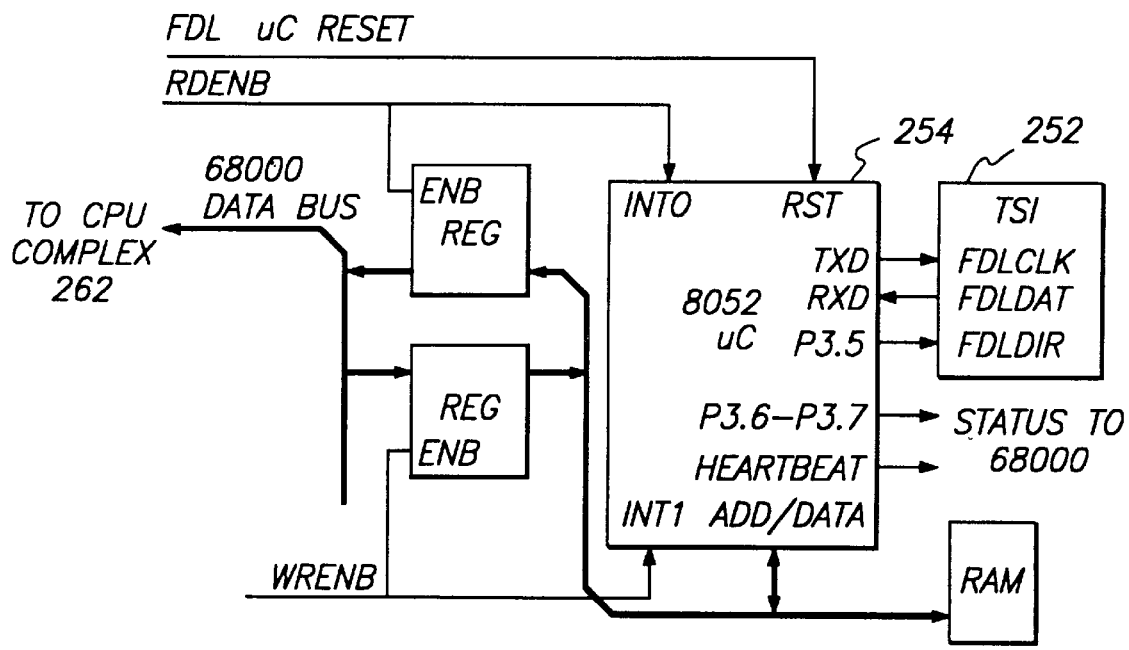
FIG. 23 is a block diagram of the Facilities Data Link (FDL) microcontroller interface shown in FIG. 6.

FIG. 23 is a block diagram of the Facilities Data Link (FDL) interface between the FDL handler subcircuit 1068 of asynchronous Time Slot Interchange (TSI) circuit 252 and the FDL microcontroller (uC) 254 in the presently preferred access system 170. The three I/O pins of the TSI interface 1033 (FIG. 20) that interconnect to the microcontroller 254 are FDLDIR, FDLCLK and FDLDAT. The FDL is a 4 Kbit/s data link that is embedded in Extended Super Frame (ESF) formatted DS1 signals. In the access system 170, the DS3 Interface Module 171 (FIG. 5) provides performance monitoring of the DS3 signal as well as all embedded DS2 and DS1 signals. A portion of the performance monitoring of ESF formatted DS1 channels involves interpreting messages that are being sent into the access system 170 on the FDL. On a given DS3 Interface module 171 there can be as many as 28 DS1 channels passing through; each one of which can contain an independent 4 Kbit/sec FDL channel.

Conventional techniques for handling FDL-like data links (e.g. HDLC) involve the use of off-the-shelf integrated circuits (ICs) that provide an interface between a microprocessor and one or two data links (e.g., USART chips, DLC chips, and the like). In the presently preferred access system 170, this technique is not practical since the required number of ICs would not fit on a single board and the cost would be prohibitive.

The present invention includes a novel approach to handling multiple asynchronous data links in the access system 170 so as to accommodate 28 4 Kbit/sec data links on a single DS3 Interface Module 171 without introducing excessive cost. The approach involves a sampling/packing subcircuit (the FDL handler 1068) in the TSI 252 that operates in conjunction with the external microcontroller (uC) 254 to provide a high level message interface to the board microprocessor (uP) in the CPU complex 262 (FIG. 6).

Figure 24:
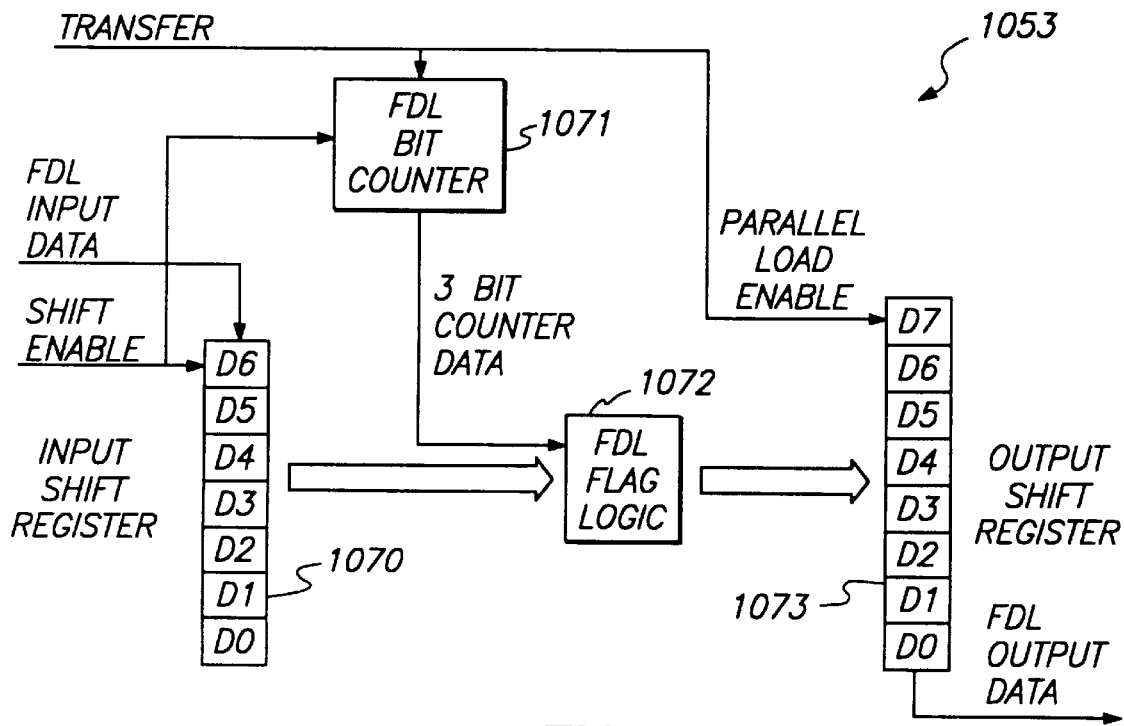
FIG. 24 is a block diagram of the TSI FDL Handler logic shown in FIG. 23.

Referring now to FIGS. 21*c* and 24, the FDL handler subcircuit 1068 of TSI 252 continuously extracts FDL bits from each of the 28 DS1 channels and stores them in an internal buffer referred to as the Input Shift Register (ISR)

1070. The ISR 1070 can hold up to 7 FDL bits for each DS1 channel. As each new bit is shifted in, an FDL Bit Counter 1071 is incremented. When the external uC 254 asserts the TRANSFER signal (derived from FDLDIR, FIG. 23), the FDL Flag Logic 1072 samples the FDL Bit Counter 1071 and passes the valid FDL data bits from the Input Shift Register 1070 to an Output Shift Register 1073 (only 1 of 28 shown). The Flag Logic 1072 then determines the state of the unused bits in the Output Shift Register 1073 as described below.

Since all FDL channels can be running at slightly different rates the 28 FDL bytes may not have the same number of valid FDL bits. The size of the Output Shift Register 1073 is 8 bits, however, the number of valid FDL data bits is 7 or fewer. Based on the FDL Bit Counter 1071, the Flag Logic determines the number of valid FDL bits in the output shift register 1073 and sets the next bit to a "0" and if there are any remaining unused bits they are all set to "1".

The external FDL uC 254 (FIG. 23) can then determine the number of valid FDL bits contained in each byte by starting at the least significant bit (LSB—Bit 0) and looking for the first bit position containing a zero. All remaining bits in the byte are valid. For example, if there are 7 valid data bits, the LSB (Bit 0) will be zero and the remaining 7 bits are interpreted as valid FDL data bits. If the least significant bit is a one, and the next bit (Bit 1) is a zero, then there are 6 valid FDL bits. The order of arrival of the FDL data bits is from least significant bit to most significant bit. This implies that the most significant bit (Bit 7) is the most recent bit to have been loaded into the TSI 252.

Figure 25:
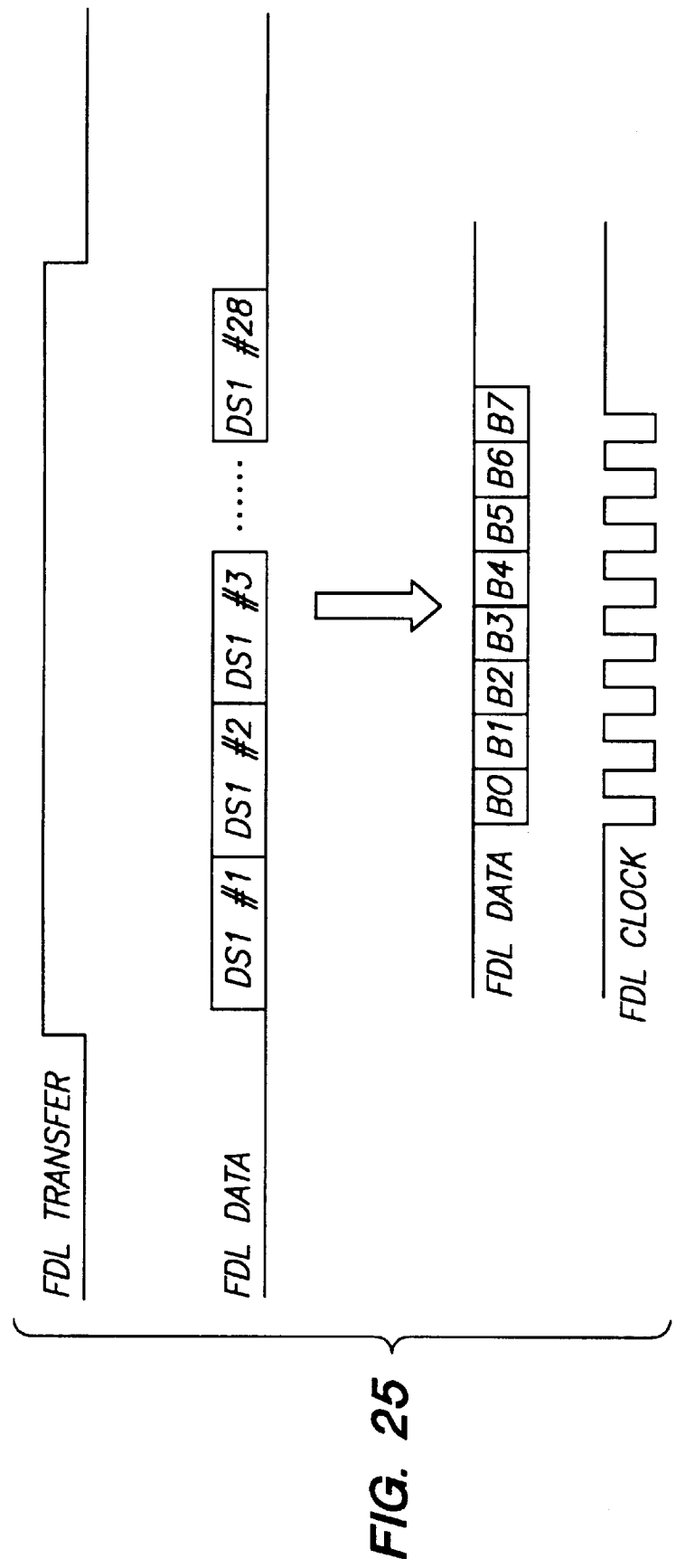
FIG. 25 is a timing diagram of the FDL interface timing in reference to FIGS. 23 and 24.

The 28 Output Shift Registers 1073 are connected together inside the FDL handler subcircuit 1068 of TSI 252 to form a shift register 224 bits long (28×8). This allows the FDL data for all 28 DS1 channels to be extracted from the TSI 252 over a serial interface. FIG. 25 shows the format of the FDL data as it is shifted out of the TSI 252 and into the external uC 254 (FIG. 23).

To avoid buffer overflow, the FDL uC 254 must poll the TSI 252 at a frequency such that a maximum of 7 FDL bits are stored between polling cycles. This can be accomplished using a nominal polling cycle of 1.7 ms since a worst case fast DS1 will produce 7 FDL bits in 1.7498 ms.

IV. THE PROTECT PATH

Figure 26:
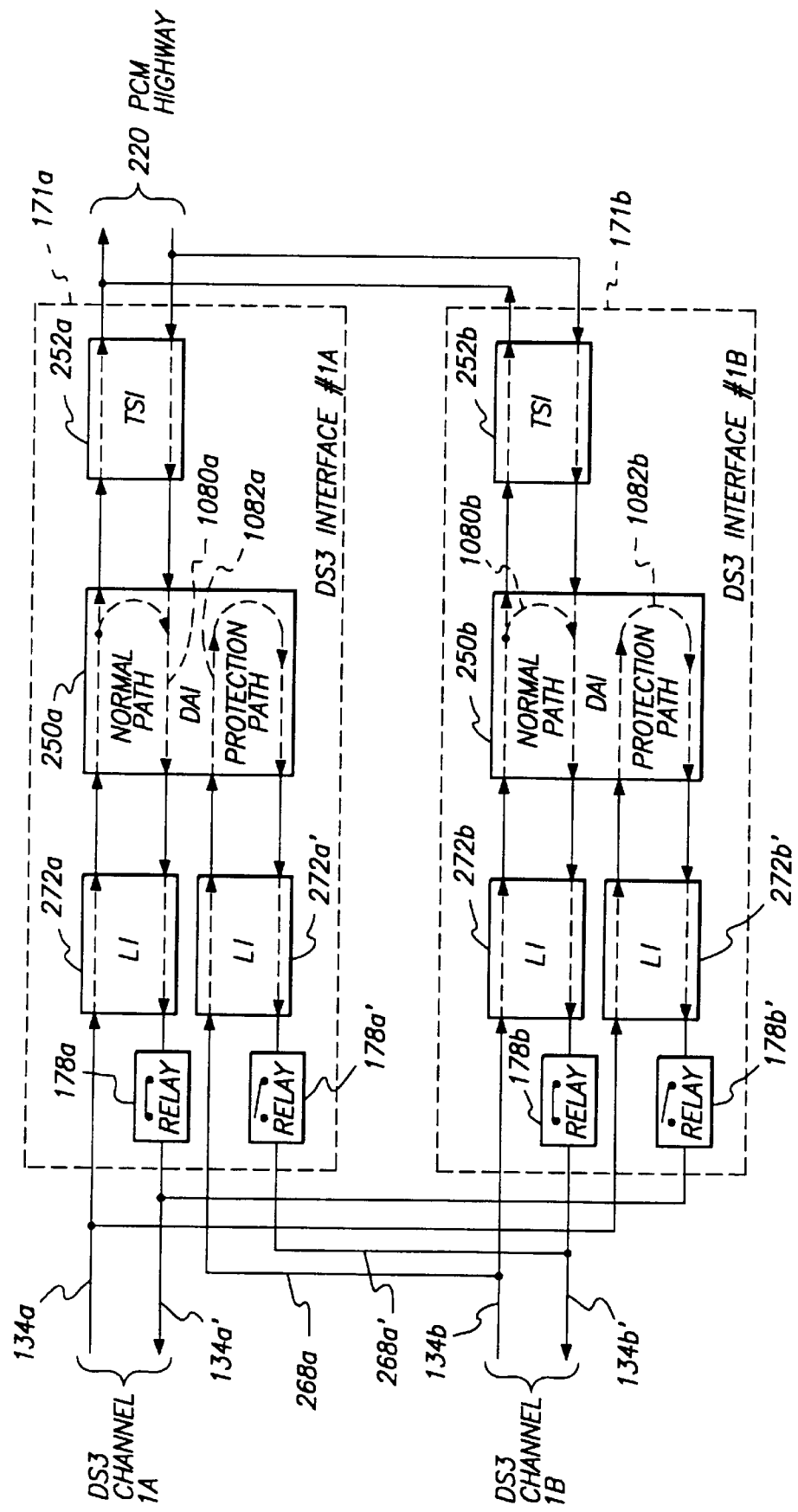
FIG. 26 is a block diagram of the DS3 data paths for a pair of DS3 interface modules shown in FIG. 5.

FIG. 26 illustrates a normal DS3 signal path and a protect DS3 signal path in the access system 170. The DS3 channel has two primary requirements for protection. The first involves the failure of the access system 170 of the path and the second involves a craftsperson requested switch. In the first case, the DS3 path must be moved from the failed unit to a secondary protection path. Since the equipment has failed, it is assumed that a major hit on the DS3 channel will occur.

The second requirement involves a protection switch due to a craftsperson request. This switch request could be required to correct some non-service affecting fault (such as an LED has burned out) on the DS3 interface module. Under this circumstance, a major hit of the DS3 channel is not allowed. It is assumed that a few bit errors, but no loss of synchronization, will occur on the down stream equipment.

Both of these scenarios deal with protection of the DS3 signal that pass through the access system 170. The DS3 signal input 134 is wired to both the normal and protection path modules 171*a*,171*b*. When the DS3 signal is transmitted from the DS3 module 171, relays 178, 178' are used in both the normal and protection output paths to guarantee that only one DS3 module 171*a,b* drives the line 134' at any given time. Special turn on/off sequencing is required to meet the hitless requirements. Given these requirements, the protection scheme for the access system 170 is discussed hereinbelow.

The protection of a DS3 path is accomplished using a next card protection approach. As FIG. 26 shows, the DS3 Interface modules 171*a,b* are tightly coupled into functional pairs. Each module 171 has a normal path 1080*a*, 1080*b* for a DS3 channel. In addition, the modules 171 have a second path 1082*a*, 1082*b* available that is used to protect its companion module. In other words, the "1A" module 171*a* has a normal path 1080*a* for DS3 channel IA and a protection path 1082*a* for DS3 channel 1B. In the same way, the "1B" module 171*b* has a normal path 1080*b* for DS3 channel 1B and a protection path 1082*b* for DS3 channel 1A. The same coupling occurs for each of the other five pairs of DS3 modules 171 in a shelf. Thus, an alternate path is available for all DS3 channels. The difference in the two paths 1080, 1082 fall into two categories: channel statistics and overwrite capability.

The normal path 1080 gathers full statistical information about the DS3 channel. A full range of DS3, DS2, and DS1 statistics are taken. In addition, entire DS1 and DS0 channels can be extracted from the incoming DS3 channel and replaced in the outgoing channel.

On the other hand, the protect path 1082 is basically a channel repeater. The DS3 signal is received, delays are matched with the normal path 1080, and the signal is retransmitted. Only a very minimum of statistics, such as loss of signal (LOS), are detected and reported on the protection path 1082. No insertion of any kind is done. The primary purpose of the protection path 1082 is to protect the DS3 channel in the event of a failure in the module of the normal path.

Figure 27:
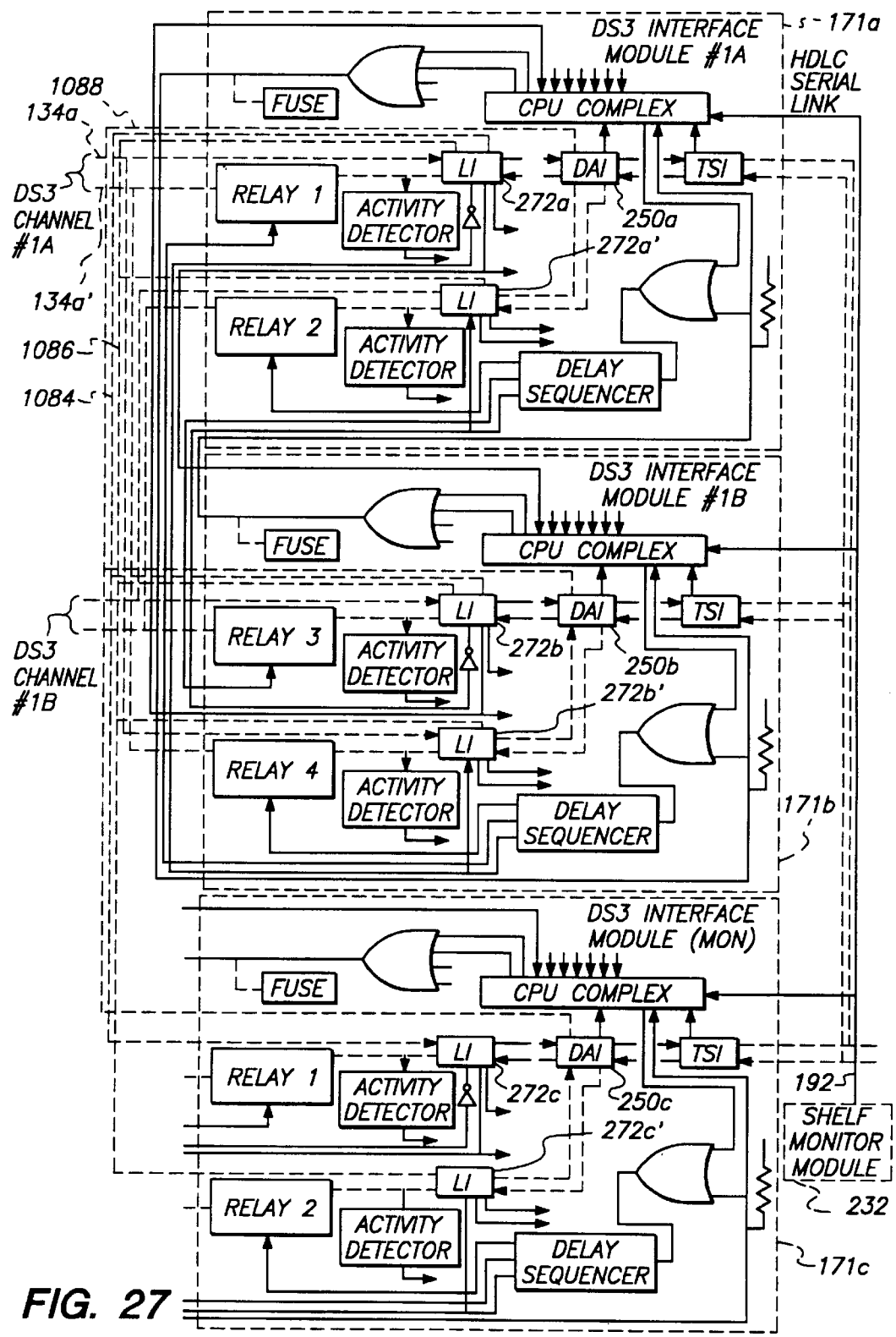
FIG. 27 is a block diagram of the DS3 protection of the access system, including the DS3 monitor module shown in FIG. 5.

Referring now to FIG. 27, another DS3 interface module 171*c* is used as a monitor of the other modules 171*a,b* on the DS3 shelf 202 (FIG. 5). Signals are routed from the monitor ports of the DS3 LI circuits 272*a*, 272*a'*, 272*b*, 272*b'* into the DS3. LI circuits 272*c*, 272*c'* on the monitor module 171*c*. The monitor outputs of the LI circuits 272 are tied to one of two wires that interface to the DS3 monitor module 171*c*. The DS3 RCV MON line 1084 from the LI circuits 272*a*, 272*b* on the normal path 1080*a,b* (FIG. 26) is used as the input to the normal path of the DS3 monitor module. Two comparisons are performed as follows using module 171*a* as an example:

1. The input signal on the line 134*a* against the normal data path output on the line 134*a'*;
2. The input signal on the line 134*a* against the protection path output on the line 1082*b* (FIG. 26).

The sequence of events, using the DS3 "1A" module 171*a* as an example shows how the comparisons take place. Note that the setup and control of this test will be accomplished by the shelf monitor module 232.

Sequence for Comparing the Normal Path Output to the Monitor Path

1. The shelf monitor module 232 first passes the DS0/DS1 insertion parameters of the DS3 Interface Module 171*a* to the DS3 Monitor module 171*c*.
2. The shelf monitor module 232 then commands the DS3 interface module #1A 171*a* to turn on its output driver for the DS3 RCV MON OUT signal on a line 1084, from the normal path LI 272*a*. This puts an amplified image of the DS3 1A input signal out on the line 1084. This line is wired to the normal path LI 272*c* on the DS3 monitor module 171*c*. The shelf monitor 232 also commands all other modules, e.g., 171*b*, to disable their drivers to the line 1084.

3. Next, the shelf monitor 232 commands DS3 interface module #1A 171a to turn on its output driver for the DS3 XMT MON OUT signal on a line 1086, from the normal path LI 272a. This puts an image of the DS3 IA output signal out on the line 1086. The line 1086 is wired to the protection path LI 272c' on the DS3 monitor module 171c. The shelf monitor 232 also commands all other modules, e.g., 171b, to disable their drivers to the line 1086.

4. Finally, the shelf monitor 232 commands DS3 interface module #1A 171a to turn on its output driver for the FEBE MON OUT signal on a line 1088. As seen from FIG. 27, this signal originates from a DAI circuit 250a to the FEBE input of a DAI 250c on the DS3 monitor module 171c. The shelf monitor 232 also commands all other modules, e.g., 171b, to disable their drivers to the line 1088.

5. Now that the physical link has been established to the monitor module, the test can begin. The signal coming into the normal path LI 272c on the DS3 monitor module 171c is effectively the same input 134a that is seen by the #1A module 171a. All performance data is gathered by the DAI 250c and compared to that found on the #1A module 171a. This comparison is performed by the shelf monitor 232. If a major difference is found (i.e. frame loss, etc.), then a failure may have been detected.

6. The DS3 monitor module 171c must first be validated to guarantee prior function by doing the same test on another module, e.g., 171b. If no problem is found with the DS3 monitor module 171c, then the shelf monitor 232 must decide whether a fault has been found and then command the #1A module 171a or #1B module 171b to perform a protection switch of the #1A module normal DS3 path 1080a (FIG. 26).

7. During DS3 processing, a Far End Bit Error (FEBE) signal is generated by the DAI 250c. This FEBE signal must be compared to the one received on the line 1088 from the #1A module 171a. If a mismatch occurs then the same procedures shown in step 6 are followed to determine if a switch is necessary.

8. The next step is to perform the same insertion of DS0/DS1 data that occurs on the #1A module 171a. Once this has been accomplished, the data signal in the DAI 250c on the normal path 1080 is the same as what is coming in on the protection path 1082.

9. Remember that the protection path 1082 of the DS3 monitor module 171c has an image of the output of the #1A module 171a on it. When the signal arrives in the DAI 250c, it has been delayed by a known number of clock cycles. An adjustment is made in the normal path 1080 of the DAI 250c on this module to match these cycles. With variations from DAI to DAI, addition clock cycles may be needed. The DAI 250c has up to 3 bits of variance allowed.

10. Once the delay variance has been compensated, a bit for bit comparison of the two signals (#1A output from line 1086 and DS3 monitor output) is done in the DAI 250c.

11. Assuming that the module #1A 171a is not in alarm, no performance failure was detected by the DS3 monitor module 171c, and the comparison fails, then one of two things is possible. Either module #1A 171a has failed or the DS3 monitor module 171c has failed. To determine if it is the monitor module 171c, the same test is run against another DS3 interface module, e.g., 171b.

12. If no failure is found in the DS3 monitor module 171c, then a failure has been detected and the shelf monitor 232 issues a command to module #1A 171a or #1B 171b to perform a protection switch of the #1A DS3 path 134a. In addition, the #1A DS3 module 171a turns on its unit failure lamp.

Sequence for Comparing the Protection Path Output to the Monitor Path

1. The shelf monitor 232 commands the DS3 interface module #1A 171a to turn on its output drive of the DS3 RCV MON OUT signal on the line 1084, from the normal path LI 272a. As described previously, this puts an amplified image of the DS3 1A input signal out on the line 1084. The line 1084 is wired to the normal path LI 272c on the DS3 monitor module 171c. The shelf monitor 232 also commands all other modules, e.g., 171b, to disable their drivers to the line 1084.

2. Next, the shelf monitor 232 commands the DS3 interface module #1B 171b to turn on its output drive of the DS3 XMT MON OUT signal 1086, from the protection path LI 272b'. This puts an image of the DS3 IA protection output signal out on the line 1086. The line 1086 is wired to the protection path LI 272c' on the DS3 monitor module 171c. The shelf monitor 232 also commands all other modules, e.g., 171a, to disable their drivers to this line 1086.

3. Now that the physical link is established to the monitor module 171c, the test can begin. As in the previous test, the signal coming into the normal path LI 272c on the DS3 monitor module 171c is effectively the same input 134a that is seen by the #1A module 171a. All performance data is gathered by the DAI 250c and compared to that found on the #1A module 171a. This comparison is done by the shelf monitor 232. If a major difference is found (i.e. frame loss, etc), then a failure may have been detected.

4. The DS3 monitor module 171c must first be validated to guarantee proper function by doing the same test on another module, e.g., 171b. If no problem is found with the DS3 monitor module 171c, then the shelf monitor 232 decides whether a fault has been found and then commands the #1B module 171b to perform a protection switch of the #1A DS3 normal path 1080a (FIG. 26).

5. Since the protection path 1082b (FIG. 26) does not allow any insertion of DS0/DS1 data, no insertion is needed for this test. Remember also that the protection path 1082 of the DS3 monitor module 171c has an image of the output of the #1B DS3 protection path 1082b on it. This signal is a regenerated #1A DS3 signal. When the signal arrives in the DAI 250c, it has been delayed by a known number of clock cycles. The same cycle adjustment described earlier is done again.

6. Once the delay variance has been compensated, a bit for bit comparison of the two signals (#1B protection output from line 1086 and DS3 monitor output) is done in the DAI 250c.

7. Assuming that #1B protection path is not in alarm, no performance failure was detected by the DS3 monitor module 171c, and the comparison fails, then one of two things is possible. Either module #1B 171b has failed or the DS3 monitor module 171c has failed. To determine if it is the monitor module 171c, the same test is run against another DS3 interface module, e.g., 171a.

8. If no failure is found in the DS3 monitor module 171c, then a failure has been detected in the protection path on the #1B DS3 module 171b and the shelf monitor 232 issues a command to module #1A 171a to perform a protection switch of the #1B DS3 normal path 1080b. This is required in order to isolate the #1B module 171b for removal. In addition, the #1B DS3 module 171b turns on its unit failure lamp.

Figure 28:
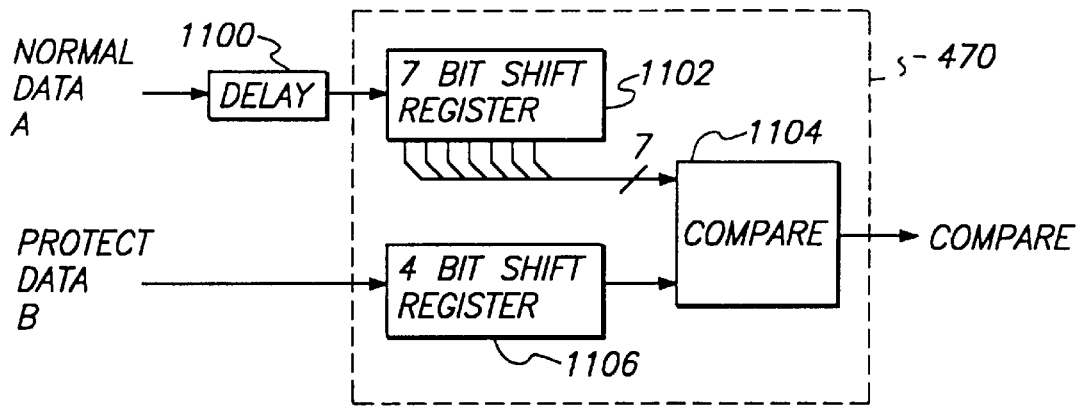

FIG. 28 is the block diagram of the Bit for Bit Compare circuit 470 shown in the DAI block diagram (FIG. 10a) and discussed above in step 10 of the Normal Path output test and step 6 of the Protection Path output test. A normal data input (input A) connects to a delay 1100 which further connects to a seven bit shift register 1102. The output of the shift register 1102 connects to a compare block 1104. A protect data input (input B) connects to a four bit shift register 1106 which then connects to the compare block 1104. The compare block 1104 then appropriately generates a compare signal which is the output of the circuit 470.

The Bit for Bit Compare circuit 470 provides the capability to verify the functionality of the DAI 250 while in service and to verify the alignment of the normal and protect paths prior to making a "hitless" switch.

In order to verify the functionality of the DAI 250 (FIG. 26), two identically configured DAIs are required with identical inputs on the normal input (input A). The normal output of a first DAI 250a (after insertion) is fed into the protect input (input B) of a second DAI 250b. This input is internally compared to the normal output. The circuit can detect a comparison even if there is up to 3 cycles of latency between the two streams.

To check the functionality and relative alignment between the normal path of one DAI 250a and the protect path of the second DAI 250b, a third DAI 250c is required as shown in FIG. 27. Note that since insert capability does not exist on the protect path, the DAI 250a whose normal path is being checked is configured such that overwrite is not allowed. The normal output of the first DAI 250a connects into the protect path of the third DAI 250c, while the protect output of the second DAI 250b connects into the normal input of the third DAI 250c. The first and second DAI 250a,b must have the same input signal on the normal inputs. The Bit for Bit Compare circuit 470 in the third DAI 250c then compares the two streams and reports the relative alignment within 3 bits.

V. SUMMARY

The embodiments disclosed herein for the DS3 signal access system 170 can be extended to other telephone and communications networks.

Although the invention has been described with reference to specific embodiments, the description is intended to be illustrative of the invention and is not intended to be limiting. Various modifications and applications may occur to those skilled in the art without departing from the true spirit and scope of the invention as defined in the appended claims.

What is claimed is:

1. In a telephone network, a method of DS3 signal access, comprising:
   identifying a bit in the DS3 signal;
   generating a selected bit; and
   substituting the identified bit with the selected bit in the DS3 signal.

2. The system defined in claim 1, additionally comprising:
   providing a regenerated DS3 signal before the substituting step; and a DS3 transmitter providing a regenerated DS3 signal after the substituting step.

3. The method defined in claim 1, wherein the generating step includes routing the selected bit to be substituted.

4. The method defined in claim 3, wherein the generating step includes receiving the identified bit providing the selected bit to the routing step.

5. The method defined in claim 1, wherein the substituting step is synchronous to the DS3 signal.

6. A method of accessing a plurality of embedded channels in a DS3 signal, the method comprising;
   extracting at least one of the DS2 channels in the DS3 signal;
   communicating at least one of the DS0 channels in the DS2 channel into an asynchronous time slot on a bus; and
   selectively inserting data from the bus into the DS3 signal.

7. The method defined in claim 6, wherein the selectively inserting step includes overwriting at least one bit in the DS3 signal.

8. The method defined in claim 6, wherein the bus is clocked at a rate higher than any one DS0 channel.

9. The method defined in claim 6, wherein each of the asynchronous time slots is selectively assigned to any DS0 channel in any DS1 channel.

10. The method defined in claim 6, wherein a DS1 channel is inserted into the DS3 signal.

11. The method defined in claim 6, wherein a DS0 channel is inserted into the DS3 signal.

12. The method defined in claim 1, wherein a subrate channel is inserted into the DS3 signal.

13. In a telephone network, a method of DS3 signal access, comprising:
   a first circuit capable of identifying a bit in the DS3 signal;
   a second circuit capable of generating a selected bit; and
   a combiner capable of substituting the identified bit with the selected bit in the DS3 signal.

14. The system defined in claim 13, additionally comprising:
   a DS3 receiver providing a regenerated DS3 signal to the combiner; and
   a DS3 transmitter providing a regenerated DS3 signal from the combiner.

15. The system defined in claim 13, wherein the second circuit includes a DS1 signal router for routing the selected bit to the combiner.

16. The system defined in claim 15, wherein the second circuit includes a DS1 test system for receiving the identified bit and providing the selected bit to the DS1 router.

17. The system defined in claim 13, wherein the second circuit includes a DS0 signal router for routing the selected bit to the combiner.

18. The system defined in claim 17, wherein the second circuit includes a DS0 test system for receiving the identified bit and providing the selected bit to the DS0 router.

19. The system defined in claim 13, wherein the system is an integrated assembly.

20. The system defined in claim 13, wherein the combiner is synchronous to the DS3 signal.

21. A system for accessing a plurality of embedded channels in a DS3 signal, the system comprising:
   a demultiplexer capable of extracting at least one of the DS2 channels in the DS3 signal;
   an asynchronous time slot interchange capable of communicating at least one of the DS0 channels in the DS2 channel into an asynchronous time slot on a bus; and
   an insertion circuit capable of selectively inserting data from the bus into the DS3 signal.

22. The system defined in claim 21, wherein the insertion circuit includes a circuit capable of overwriting at least one bit in the DS3 signal.

23. The system defined in claim 21, wherein the bus is clocked at a rate higher than any one DS0 channel.

24. The system defined in claim 21, wherein each of the asynchronous time slots are selectively assigned to any DS0 channel in any DS1 channel.

25. The system defined in claim 21, wherein a DS1 channel is inserted into the DS3 signal.

26. The system defined in claim 21, wherein a DS0 channel is inserted into the DS3 signal.

27. The system defined in claim 21, wherein a subrate channel is inserted into the DS3 signal.

28. The system defined in claim 21, wherein the bus includes a bit stuffing circuit capable of bit stuffing.

29. The system defined in claim 28, wherein the bit stuffing circuit includes a line for carrying valid bit data.

* * * * *